US012202601B2

(12) United States Patent
Grip et al.

(10) Patent No.: US 12,202,601 B2
(45) Date of Patent: Jan. 21, 2025

(54) EXTENDABLE COMPRESSION CHAIN SYSTEM AND METHOD OF USING THE SAME

(71) Applicant: The Boeing Company, Arlington, VA (US)

(72) Inventors: Robert E. Grip, Rancho Palos Verdes, CA (US); John J. Brown, Costa Mesa, CA (US)

(73) Assignee: The Boeing Company, Arlington, VA (US)

( * ) Notice: Subject to any disclaimer, the term of this patent is extended or adjusted under 35 U.S.C. 154(b) by 53 days.

(21) Appl. No.: 18/171,347

(22) Filed: Feb. 18, 2023

(65) Prior Publication Data

US 2024/0278903 A1     Aug. 22, 2024

(51) Int. Cl.
    *B64C 3/48*     (2006.01)
    *B64C 3/18*     (2006.01)
    *F16G 13/20*     (2006.01)

(52) U.S. Cl.
    CPC .................. *B64C 3/48* (2013.01); *B64C 3/18* (2013.01); *F16G 13/20* (2013.01)

(58) Field of Classification Search
    CPC ....... B64C 3/18; B64C 3/48; B64C 2003/445; B65G 21/14
    See application file for complete search history.

(56) References Cited

U.S. PATENT DOCUMENTS

| 904,966 | A | * | 11/1908 | Knock | ...................... F41A 9/43 89/47 |
| 3,645,146 | A | * | 2/1972 | Nagin | ..................... F16G 13/06 254/133 R |
| 5,186,420 | A | * | 2/1993 | Beauchamp | ............ F03G 7/065 114/144 RE |
| 6,138,956 | A | * | 10/2000 | Monner | .................. B64C 13/24 244/215 |

(Continued)

FOREIGN PATENT DOCUMENTS

GB     2477568 A   *   8/2011  ............. B65G 13/12

OTHER PUBLICATIONS

Wikipedia contributors. (Aug. 21, 2022). Rigid chain actuator. Wikipedia. https://en.wikipedia.org/w/index.php?title=Rigid_chain_actuator&oldid=1105696720.*

*Primary Examiner* — Joseph W Sanderson

(57) ABSTRACT

There is provided an extendable compression chain system for extending a structure. The system includes a track assembly, a curved guide assembly, an extendable compression chain assembly, an actuation mechanism, and a mechanical power apparatus. The extendable compression chain assembly is configured to travel along the track assembly and to follow the curved portion of the track assembly, to move from a retracted position to an extended position, to extend the structure coupled to the extendable compression chain assembly. The extendable compression chain assembly includes a compression chain structure having a first end, a second end, and modules. The modules are (Continued)

movable between a rigid position and a collapsed position, as the compression chain structure follows the curved portion of the track assembly, and wraps around the curved guide assembly. The extendable compression chain assembly includes an actuation end fitting and a structure interface end fitting.

20 Claims, 40 Drawing Sheets

(56) References Cited

U.S. PATENT DOCUMENTS

| | | | |
|---|---|---|---|
| 7,431,150 B2 * | 10/2008 | Ranger | B65G 21/10 198/840 |
| 7,530,533 B2 * | 5/2009 | Perez-Sanchez | B64C 3/48 244/219 |
| 7,837,144 B2 * | 11/2010 | Kothera | B64C 9/00 92/92 |
| 8,235,329 B1 * | 8/2012 | Darling | B64C 23/005 244/203 |
| 9,598,167 B2 | 3/2017 | Grip et al. | |
| 10,773,786 B2 | 9/2020 | Sclafani et al. | |
| 11,377,196 B2 * | 7/2022 | Shields | B64C 3/44 |
| 11,787,524 B2 * | 10/2023 | Grip | B64C 3/16 244/129.1 |
| 11,919,718 B1 * | 3/2024 | Arora | B65G 21/14 |
| 2006/0144677 A1 * | 7/2006 | Ranger | B65G 21/10 198/839 |
| 2006/0237596 A1 * | 10/2006 | Perez-Sanchez | B64C 3/48 244/219 |
| 2007/0152106 A9 * | 7/2007 | Perez-Sanchez | B64C 3/48 244/219 |
| 2008/0035798 A1 * | 2/2008 | Kothera | B63H 25/382 244/212 |
| 2015/0023797 A1 * | 1/2015 | Egbert | B64C 1/34 416/223 R |
| 2021/0245862 A1 * | 8/2021 | Shields | B64C 3/52 |
| 2023/0140102 A1 * | 5/2023 | Grip | B64C 39/068 244/129.1 |
| 2024/0150007 A1 * | 5/2024 | Grip | B64C 3/16 |
| 2024/0278901 A1 * | 8/2024 | Grip | B64C 3/48 |
| 2024/0278902 A1 * | 8/2024 | Grip | B64C 3/18 |

* cited by examiner

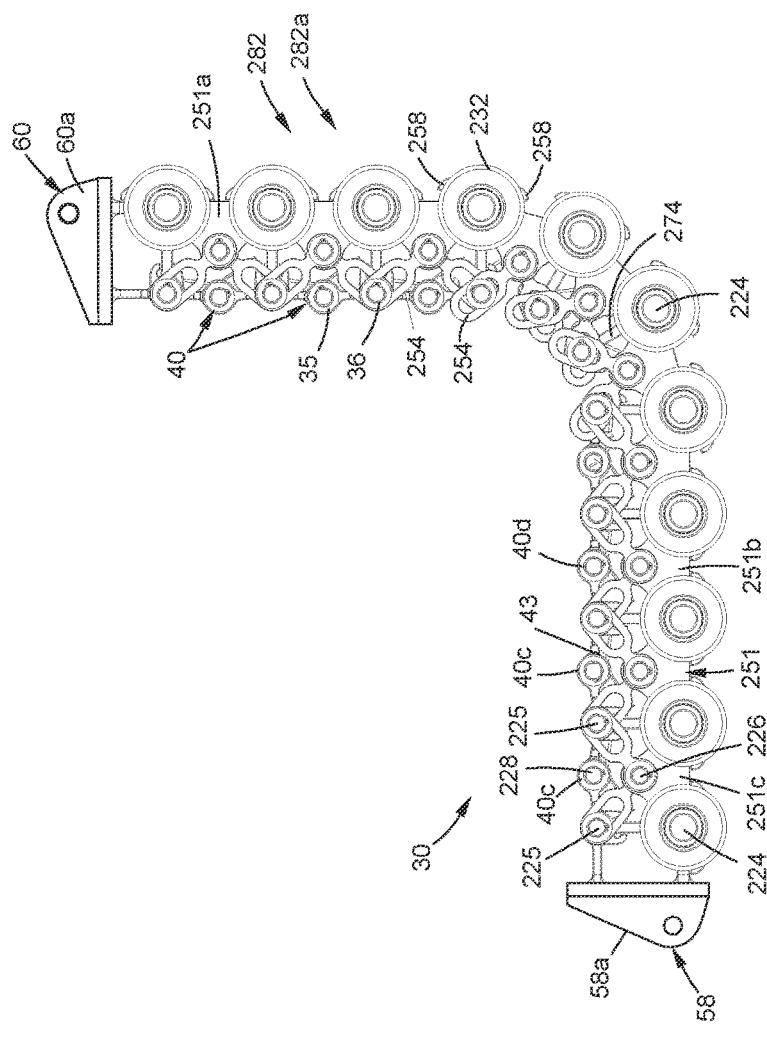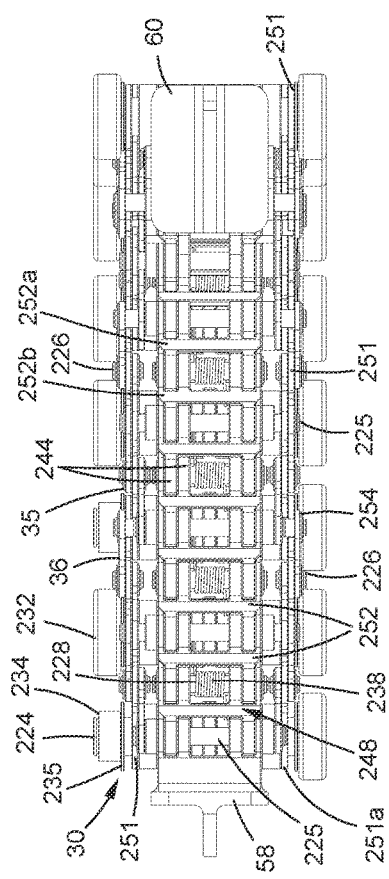
FIG. 2D
FIG. 2E

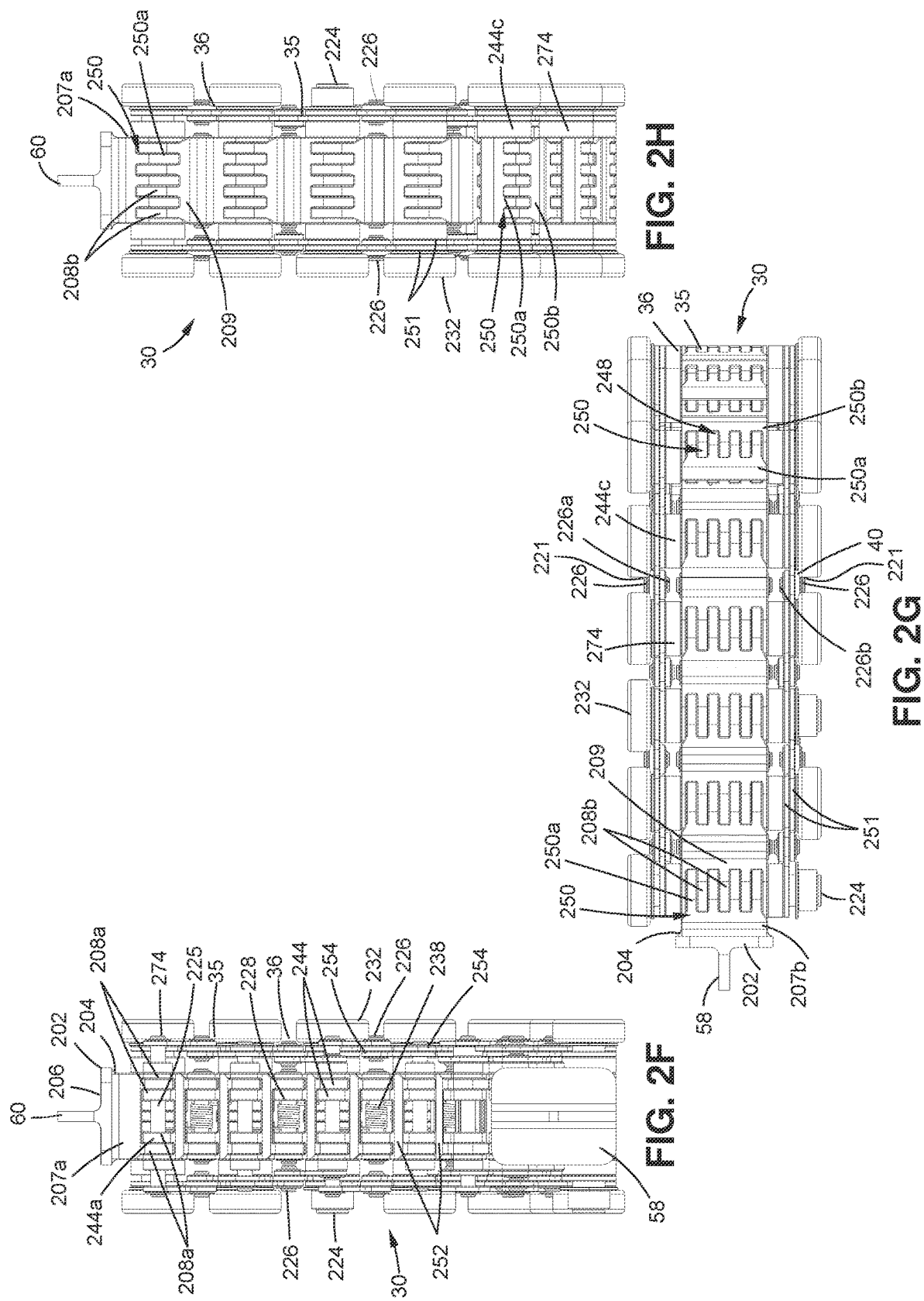

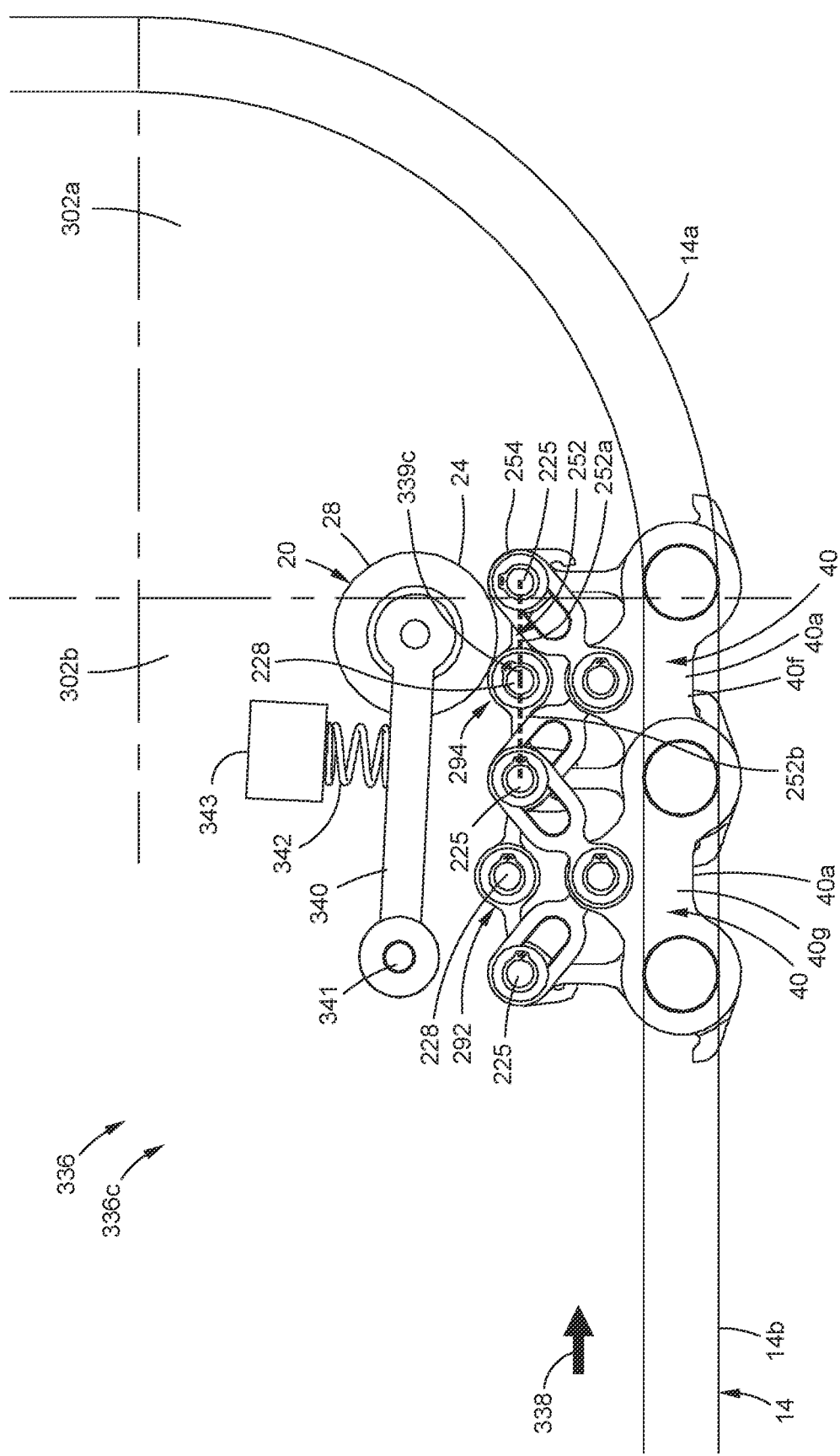

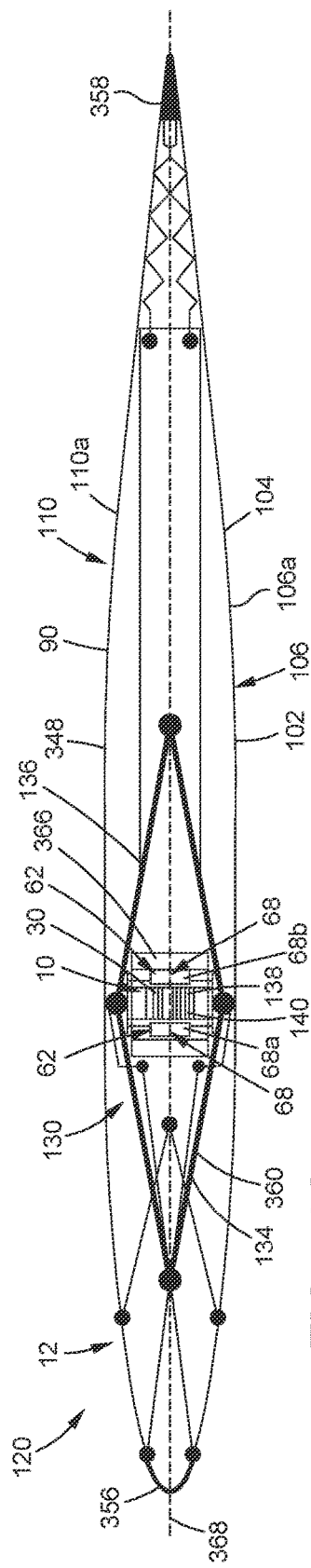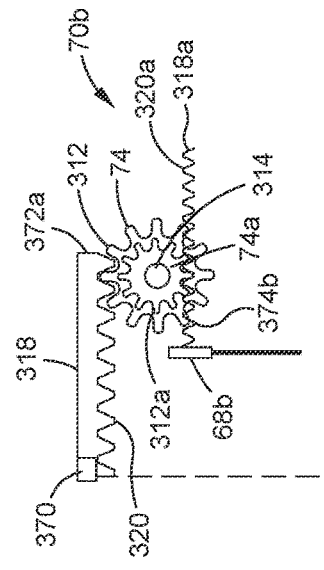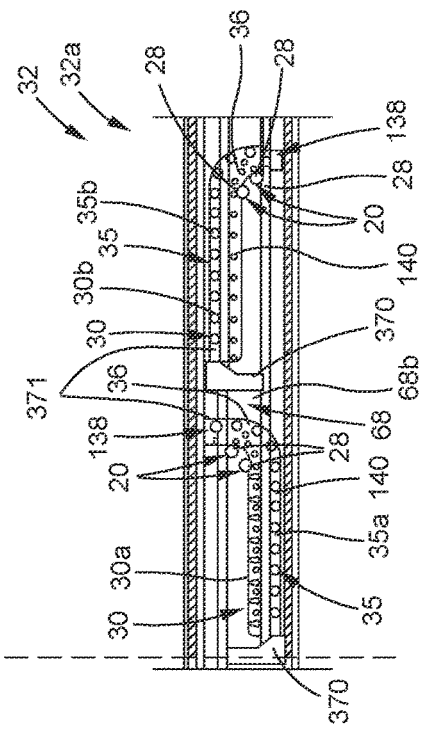
FIG. 10A
FIG. 10B

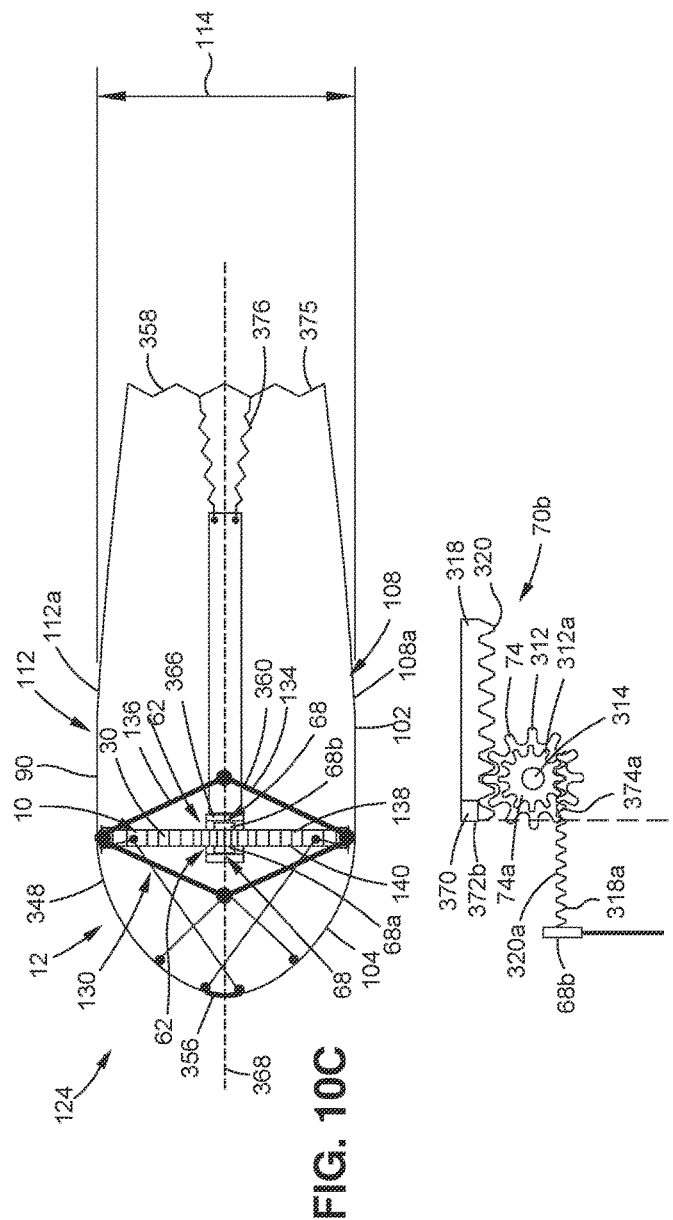
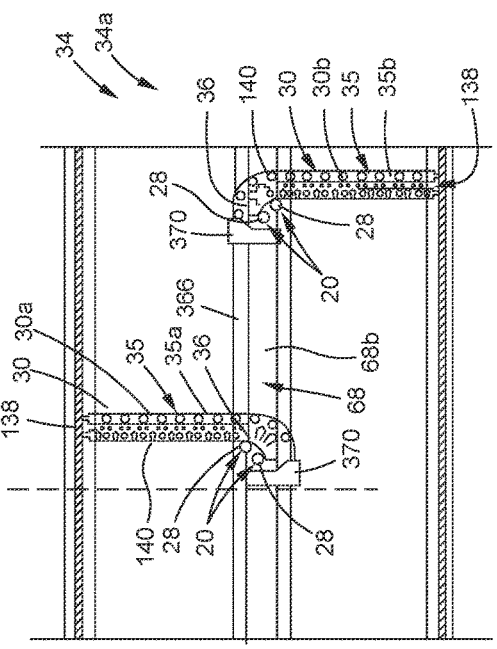
FIG. 10C
FIG. 10D

EXTENDABLE COMPRESSION CHAIN SYSTEM AND METHOD OF USING THE SAME

CROSS-REFERENCE TO RELATED APPLICATIONS

This nonprovisional patent application is related to contemporaneously filed U.S. nonprovisional patent application Ser. No. 18/171,345, titled EXPANDABLE STRUT ASSEMBLY FOR A WING OF AN AIRCRAFT AND METHOD OF USING THE SAME, filed on Feb. 18, 2023, the contents of which are hereby incorporated by reference in their entirety. By mention in this CROSS-REFERENCE TO RELATED APPLICATIONS section, the application having Ser. No. 18/171,345 is not admitted to be prior art with respect to this application having Ser. No. 18/171,347.

This nonprovisional patent application is also related to contemporaneously filed U.S. nonprovisional patent application Ser. No. 18/171,346, titled VARIABLE RADIUS ASSEMBLY AND METHOD OF USING THE SAME, filed on Feb. 18, 2023, the contents of which are hereby incorporated by reference in their entirety. By mention in this CROSS-REFERENCE TO RELATED APPLICATIONS section, the application having Ser. No. 18/171,346 is not admitted to be prior art with respect to this application having Ser. No. 18/171,347.

FIELD

The disclosure relates generally to a compression chain system attached to a structure, and more particularly, to an extendable compression chain system attached to a structure, such as a wing strut of an aircraft, or another structure, and designed to extend the structure from a retracted position to an extended position.

BACKGROUND

Wings of an aircraft having strut support, i.e., strut-braced wings, reduce the overall weight of the wing and reduce the bending moment in the inboard wing, where the wing attaches to the fuselage, as compared to wings that do not have strut support, i.e., cantilever wings. With the aircraft in flight, a wing strut connected to the fuselage of the aircraft and connected to the underside of the wing generally experiences a load condition, such as a tension load, and with the aircraft on the ground the strut experiences a load condition, such as compression load under 1 g (gravitational force) conditions. A wing strut must also be designed for a −1 g (minus one g) pushover flight condition for the aircraft, which places the strut in axial compression. The amount of axial material in the strut is sized by the tension condition, while the thickness the strut is sized is typically by Euler buckling under the −1 g pushover flight condition.

Known designs of wing struts exist to address the −1 g pushover flight condition. One known wing strut design includes a full-span wing strut that spans and connects between the fuselage of the aircraft and the underside of the wing and that generally has a low aerodynamic drag. However, such full-span wing struts may be thick and heavy because the buckling length is longer.

Another known wing strut design includes the addition of one or more jury struts, or auxiliary struts, fastened along a length of a primary strut and substantially normal to an axis of the primary strut, where the primary strut is typically thinner than a full-span strut. Jury struts, or auxiliary struts, break up the buckling length of the primary strut into smaller segments along the length of the primary strut, and save weight because the buckling length is shorter. However, the addition of one or more jury struts, or auxiliary struts, may increase aerodynamic drag of the aircraft.

Yet another known wing strut member design includes a cable strut that is very thin and light and is connected between the fuselage of the aircraft and the underside of the wing. Although the aerodynamic drag is low with this design, the wing must be sized for the −1 g pushover flight condition as a cantilever wing, and the wing may be heavier to take the −1 g pushover flight condition as a cantilever wing. Under 1 g gravity conditions sitting on the ground, a downward deflection of the wing may cause the cable to droop. In an intermediate loading range, i.e., from 1 g on the ground to 1 g in flight, drooping cables on the wings may vibrate in an uncontrolled manner. Pre-stressing the cables to reduce or eliminate droop under the −1 g pushover flight condition may require larger connection hardware, increased bending in the wing, and increased compression in the wing box, which may result in unwanted weight.

Another challenge is configuring a structure that is able to fit within a thin strut and is able to expand and contract, or morph, within the strut during flight. An issue with morphing structures that morph from a thin cross section to a thick cross section is a "scissor jack phenomenon", which when collapsed may have a poor mechanical advantage, and when expanded may require large diagonal linkages to take a load substantially perpendicular to those linkages in the collapsed position.

In addition, structural chains, including power transmission structural chains to transmit power through tension, have been used in various vehicles, including automobiles and motorcycles, and in other applications. However, such structural chains are in tension and do not carry compression without buckling.

Accordingly, there is a need in the art for an extendable compression chain system for a structure, such as for a wing strut of an aircraft, that extends a thickness of a strut cross section the wing strut from a retracted position to an extended position, that enables a more efficient thin or small cross section for cruise portions of a flight, that allows for a light strut to carry compressive loads for wing down bending conditions and a −1 g pushover flight condition, while preserving a weight-savings aspect for the wing, that allows for compression chain structures that carry compression without buckling; that avoids the "scissor jack phenomenon", that eliminates cable drooping without adding unwanted weight, that avoids excessive tension to the wing to prevent bending stresses, that has a low aerodynamic drag, that can be used with other structures to extend the structures from a retracted position to an extended position, and that provides advantages over known chain assemblies.

SUMMARY

Example implementations of the present disclosure provide an extendable compression chain system and method of using the same. As discussed in the below detailed description, versions of the extendable compression chain system and method may provide significant advantages over known chain systems, assemblies, and methods.

In a version of the disclosure, there is provided an extendable compression chain system for extending a structure. The extendable compression chain system comprises a track assembly having a curved portion and a straight portion, a curved guide assembly coupled to the track assembly, and an extendable compression chain assembly configured to travel along the track assembly and configured to follow the curved portion of the track assembly, to move from a retracted position to an extended position, to extend the structure coupled to the extendable compression chain assembly.

The extendable compression chain assembly comprises a compression chain structure having a first end, a second end, and a plurality of modules connected together in a series configuration between the first end and the second end. The plurality of modules are movable between a rigid position and a collapsed position, as the compression chain structure follows the curved portion of the track assembly, and wraps around the curved guide assembly. The compression chain structure carries an axial compression load in a first portion of the compression chain structure where the plurality of modules are in the rigid position.

The extendable compression chain assembly further comprises an actuation end fitting attached to the first end of the compression chain structure. The extendable compression chain assembly further comprises a structure interface end fitting attached to the second end of the compression chain structure.

The extendable compression chain system further comprises an actuation mechanism coupled to the extendable compression chain assembly, to move the extendable compression chain assembly along the track assembly toward the curved portion of the track assembly. The extendable compression chain system further comprises a mechanical power apparatus coupled to the actuation mechanism, to power the actuation mechanism to move the extendable compression chain assembly.

In another version of the disclosure, there is provided an aircraft having a wing strut with an extendable compression chain system. The aircraft comprises a fuselage, and two wings coupled to the fuselage and extending from the fuselage opposite each other. The aircraft further comprises the wing strut attached to each of the two wings. The wing strut has a strut cross section with an airfoil shape.

The aircraft further comprises the extendable compression chain system coupled to an interior of each wing strut. The extendable compression chain system comprises a track assembly having a curved portion and a straight portion, and comprises a curved guide assembly coupled to the track assembly.

The extendable compression chain system further comprises an extendable compression chain assembly configured to travel along the track assembly and follow the curved portion of the track assembly. The extendable compression chain assembly is configured to move from a retracted position to an extended position, to extend the strut cross section between a contracted airfoil shape and an extended airfoil shape.

The extendable compression chain assembly comprises a compression chain structure having a first end, a second end, and a plurality of modules connected together in a series configuration between the first end and the second end. The plurality of modules are movable between a rigid position and a collapsed position, as the compression chain surface of the curved guide assembly. The compression chain structure carries an axial compression load in a first portion of the compression chain structure where the plurality of modules are in the rigid position.

The extendable compression chain assembly further comprises an actuation end fitting attached to the first end of the compression chain structure. The extendable compression chain assembly further comprise a structure interface end fitting attached to the second end of the compression chain structure.

The extendable compression chain system further comprises an actuation mechanism coupled to the extendable compression chain assembly, to move the extendable compression chain assembly along the track assembly and around the curved guide assembly. The extendable compression chain system further comprises a mechanical power apparatus coupled to the actuation mechanism, to power the actuation mechanism to move the extendable compression chain assembly.

In another version of the disclosure, there is provided a method of extending a structure using an extendable compression chain system. The method comprises the step of coupling the extendable compression chain system to the structure.

The extendable compression chain system comprises a track assembly having a curved portion and a straight portion, a curved guide assembly coupled to the track assembly, and an extendable compression chain assembly. The extendable compression chain assembly comprises a compression chain structure having a first end, a second end, and a plurality of modules connected together in a series configuration between the first end and the second end. The plurality of modules are movable between a rigid position and a collapsed position, as the compression chain structure follows the curved portion of the track assembly, and the compression chain structure carries an axial compression load in a first portion of the compression chain structure.

The extendable compression chain assembly further comprises an actuation end fitting attached to the first end of the compression chain structure. The extendable compression chain assembly further comprises a structure interface end fitting attached to the second end of the compression chain structure.

The extendable compression chain system further comprises an actuation mechanism coupled to the extendable compression chain assembly. The extendable compression chain system further comprises a mechanical power apparatus coupled to the actuation mechanism.

The method further comprises the step of moving the extendable compression chain assembly, using the actuation mechanism powered by the mechanical power apparatus, along the track assembly, to move a second portion of the compression chain structure toward the curved portion of the track assembly. The method further comprises the step of moving the extendable compression chain assembly, using the actuation mechanism powered by the mechanical power apparatus, around the curved guide assembly, to move one or more of the plurality of modules between the rigid position and the collapsed position, as the compression chain structure follows the curved portion of the track assembly, and wraps around the curved guide assembly, and to move the first portion of the compression chain structure toward the structure.

The method further comprises the step of extending the structure, using the extendable compression chain system, by pushing the structure with the first portion of the compression chain structure. The compression chain structure carries the axial compression load in the first portion, and the first portion comprises the plurality of modules in the rigid position.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

FIG. 2D is an illustration of a front view of the extendable compression chain assembly of FIG. 2B;

FIG. 2E is an illustration of a top view of the extendable compression chain assembly of FIG. 2D;

FIG. 2F is an illustration of a right side view of the extendable compression chain assembly of FIG. 2D;

FIG. 2G is an illustration of a bottom view of the extendable compression chain assembly of FIG. 2D;

FIG. 2H is an illustration of a left side view of the extendable compression chain assembly of FIG. 2D;

FIG. 2I is an illustration of a front right side perspective view of a first portion of the extendable compression chain assembly of FIG. 2B;

FIG. 7C is an illustration of a front view of the pair of modules of FIG. 7A, in a third position of the module sequence;

FIG. 10A is an illustration of a left outboard side view of a schematic diagram of a wing strut with a shape transition assembly having exemplary extendable compression chain assemblies of the disclosure, where the wing strut is in a fully contracted position;

FIG. 10B is an illustration of a front view of a schematic diagram of the extendable compression chain assemblies used with the shape transition assembly of FIG. 10A, where the extendable compression chain assemblies are in a fully retracted position;

FIG. 10C is an illustration of a left outboard side view of a schematic diagram of the wing strut and shape transition assembly with exemplary extendable compression chain assemblies of FIG. 10A, where the wing strut is in a fully extended position;

FIG. 10D is an illustration of a front view of a schematic diagram of the extendable compression chain assemblies used with the shape transition assembly of FIG. 10C, where the extendable compression chain assemblies are in a fully extended position;

Figure 1:
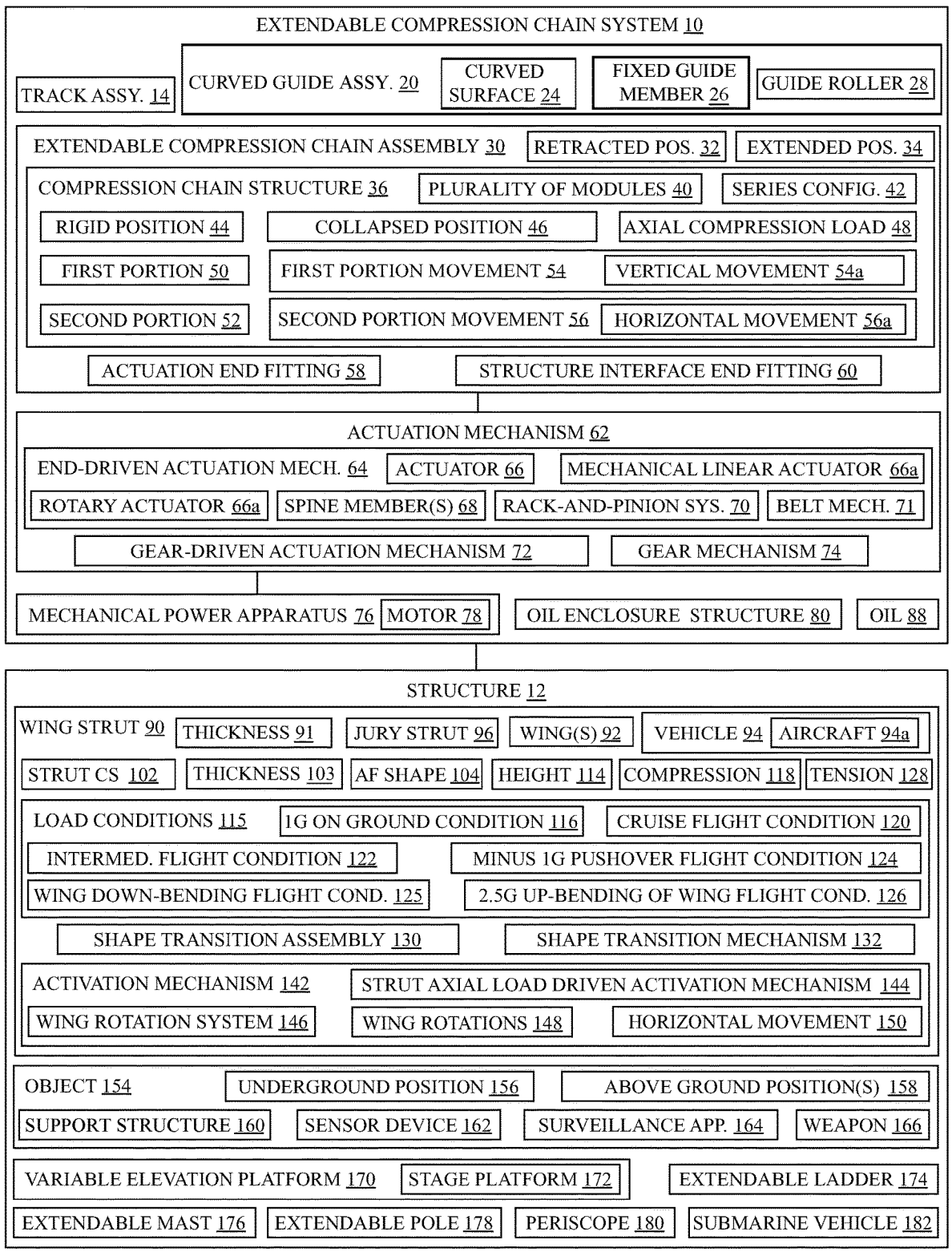
FIG. 1 is an illustration of a block diagram of an exemplary extendable compression chain system of the disclosure, coupled to an exemplary structure.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Now referring to FIG. 1, FIG. 1 is an illustration of a block diagram of an exemplary extendable compression chain system 10 of the disclosure, that is configured for coupling, and is coupled, to an exemplary structure 12 to extend the structure 12 and to retract the structure 12. The blocks in FIG. 1 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustrations of the extendable compression chain system 10 in FIG. 1 are not meant to imply physical or architectural limitations to the manner in which an illustrative example may be implemented. Other components in addition to, or in place of, the ones illustrated may be used. Some components may be unnecessary.

Figure 2A:
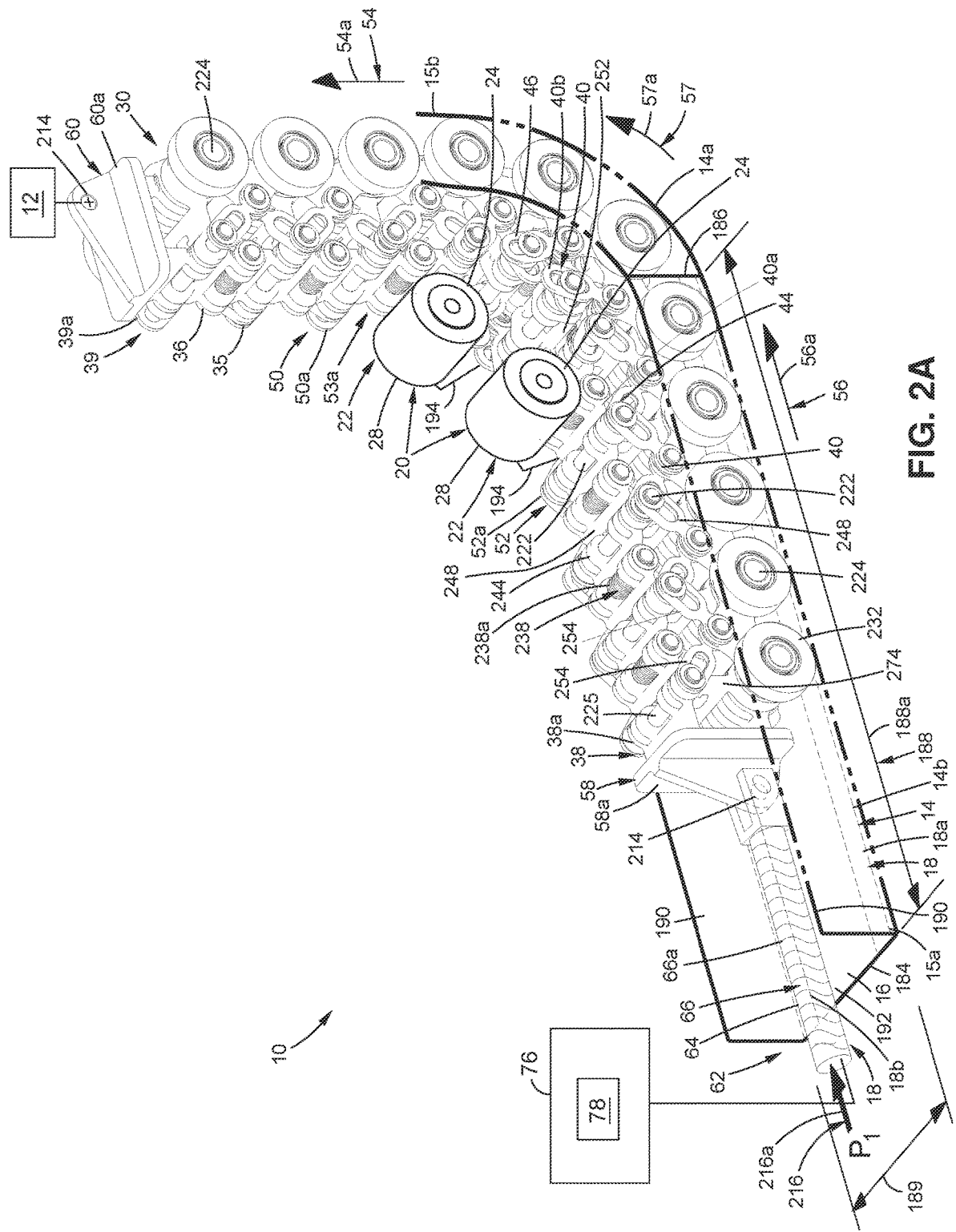
FIG. 2A is an illustration of a front perspective view of an exemplary version of an extendable compression chain system of the disclosure, with an extendable compression chain assembly of the disclosure.

As shown in FIG. 1, the extendable compression chain system 10 (see also FIG. 2A) comprises a track assembly (ASSY.) 14. As shown in FIG. 2A, the track assembly 14 has a curved portion 14a and a straight portion 14b, and has a first end 15a and a second end 15b. In one version, the track assembly 14 comprises a base structure 16 (see FIG. 2A) and rails 18 (see FIG. 2A), such as a first rail 18a (see FIG. 2A) and a second rail 18b (see FIG. 2A). The track assembly 14 is discussed in further detail below with respect to FIG. 2A.

Figure 7A:
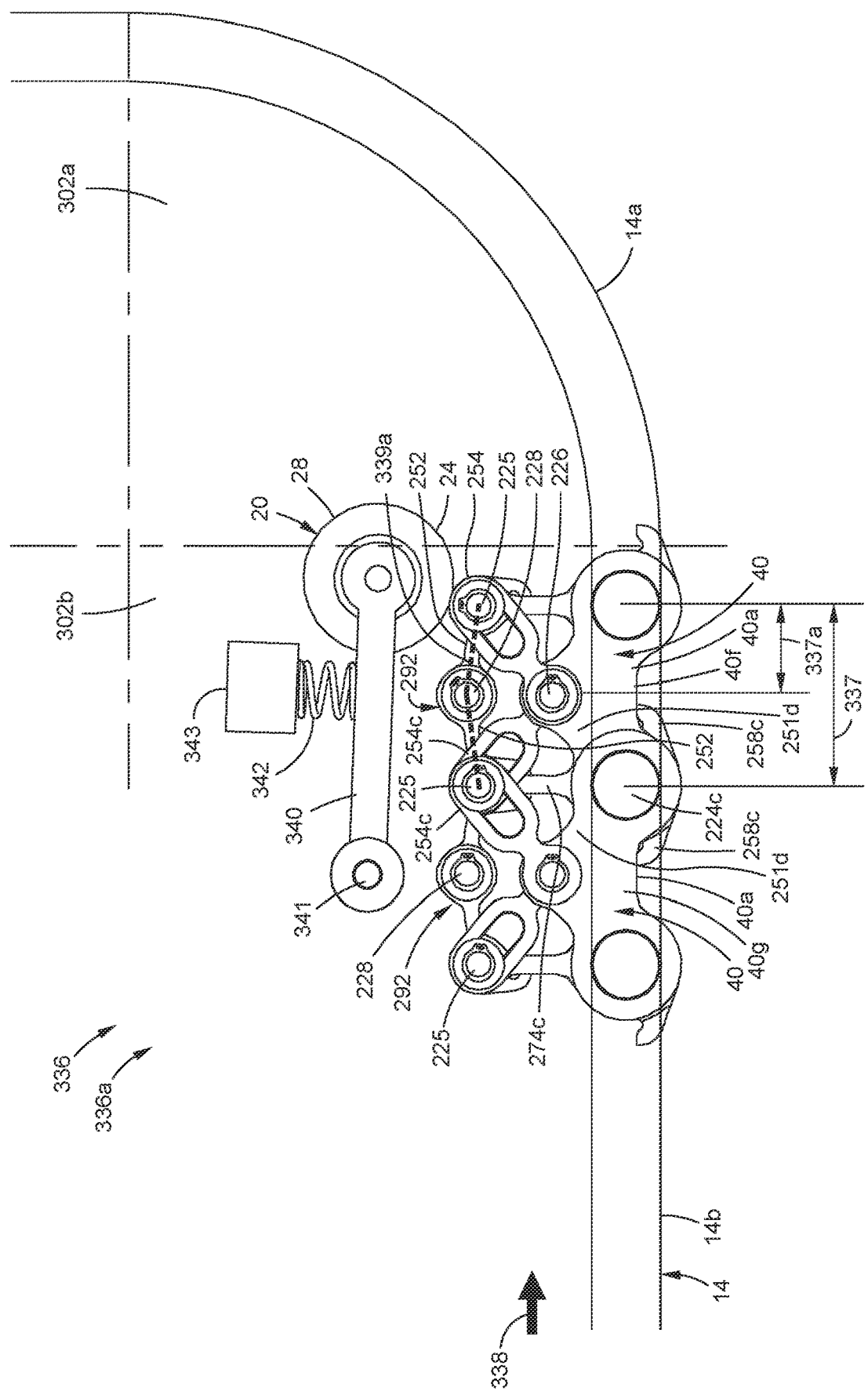
FIG. 7A is an illustration of a front view of a pair of modules of a compression chain structure in a first position of a module sequence.

As shown in FIG. 1, the extendable compression chain system 10 further comprises a curved guide assembly (ASSY.) 20 coupled to the track assembly 14. As shown in FIG. 1, the curved guide assembly 20 has one or more curved guide members 22 each with a curved surface 24. Each curved guide member 22 may be in the form of a fixed guide member 26 (see FIG. 1), a guide roller 28 (see FIGS. 1, 5A, 7A), or another suitable curved guide member. The curved guide member 22, such as the fixed guide member 26, does not need to rotate but it can rotate in certain versions, such as the guide roller 28. If the fixed guide member 26 is used, inner links 252 (see FIGS. 2B, 3A) may include a protrusion configured to encounter the fixed guide member 26, and the inner links 252 may be scalloped to allow the adjacent inner link 252 to rotate relative to each other without the protrusions causing a geometrical interference. In one version, as shown in FIG. 7A, the curved guide assembly 20 comprises the guide roller 28, a roller arm 340, a roller pivot pin 341, a roller spring 342, and a roller spring support 343. The curved guide assembly 20 is discussed in further detail below with respect to FIGS. 2A and 7A. The curved guide assembly 20, including one or more guide rollers 28 or the fixed guide member 26, applies a force 295 (see FIGS. 4C-4D) to a joint 288 (see FIGS. 4C-4D) of a rectangular prism 285 (see FIGS. 4A-4D). However, the force 295 may also be applied by another suitable structure.

As shown in FIG. 1, the extendable compression chain system 10 further comprises an extendable compression chain assembly 30 coupled, or attached, to the structure 12. The extendable compression chain assembly 30 comprises a compression chain 35 (see FIGS. 2A-2C, 9B, 10B, 10D), having a compression chain structure 36 (see FIGS. 1, 2A-2C, 9B, 10B, 10D), configured to travel along, and traveling along, the track assembly 14, and configured to follow, and following, the curved portion 14a (see FIG. 2A) of the track assembly 14 (see FIG. 2A), and configured to wrap around, and wrapping around, the curved guide assembly 20, for example, the curved surface 24 (see FIGS. 1, 2A) of the curved guide member 22 (see FIGS. 1, 2A) of the curved guide assembly 20, that is in contact with inner links 252 (see FIG. 2A) of the compression chain structure 36 (see FIG. 2A) of the compression chain 35 (see FIG. 2A), to move from a retracted position 32 (POS.) (see FIG. 1) to an extended position (POS.) 34 (see FIG. 1), and to extend the structure 12 coupled to the extendable compression chain assembly 30, and to retract the structure 12. The compression chain 35 with the compression chain structure 36 of the extendable compression chain assembly 30 is able to follow the curved portion 14a of the track assembly 14, and is able to wrap around the curved guide assembly 20, for example, the curved surface 24 of the curved guide member 22 of the curved guide assembly 20, similar to how a cable wraps around, or wraps past, a pulley.

The extendable compression chain assembly 30 comprises the compression chain 35 with the compression chain structure 36 (see FIGS. 1, 2A) having a first end 38 (see FIGS. 2A-2B), a second end 39 (see FIGS. 2A-2B), and a plurality of modules 40 (see FIGS. 1, 2A, 2B) connected together in series, such as in a series configuration (CONFIG.) 42 (see FIGS. 1, 2B), between the first end 38 and the second end 39. As shown in FIG. 2A, the first end 38 comprises an actuation end 38a, or drive end, that has a load ($P_1$) 216, such as an actuation load 216a, applied to it from an actuation mechanism 62. As further shown in FIG. 2A, the second end 39 comprises a push-pull end 39a that moves away from the curved portion 14a of the track assembly 14 and the curved guide assembly 20 location to push the structure 12 (see FIGS. 9A-9B, 11C) away from the curved portion 14a of the track assembly 14 and the curved guide assembly 20 and extend the structure 12, or to pull the structure 12 back toward the curved portion 14a of the track assembly 14 and the curved guide assembly 20 and retract the structure 12. The structural components of the compression chain structure 36 of the compression chain 35, and the structural components of each module 40 are discussed in more detail below with respect to FIGS. 2A-2K and FIGS. 3A-3C.

The plurality of modules 40 are movable between a rigid position 44 (see FIGS. 1, 2A) and a collapsed position 46 (see FIGS. 1, 2A), as the compression chain structure 36 of the compression chain 35 follows the curved portion 14a (see FIG. 2A) of the track assembly 14 (see FIG. 2A), and wraps around the curved guide assembly 20, for example, the curved surface 24 of the curved guide member 22 of the curved guide assembly 20. The curved portion 14a of the track assembly 14 causes the modules 40 to bend around the corner, and the curved guide assembly 20 pushes in on inner links 252 (see FIGS. 2A, 3A) at the articulated edge pin 228 (see FIGS. 2A, 3A) location to their over-center reversed position 296 (see FIG. 4D), so that the module 40 is then able to collapse and follow the path defined by the curved portion 14a of the track assembly 14. One or more modules 40 (see FIGS. 1, 2A) of the compression chain structure 36 of the compression chain 35 collapse, as the compression chain structure 36 moves between the curved guide assembly 20 and the curved portion 14a of the track assembly 14.

The compression chain structure 36 of the compression chain 35 may carry an axial compression load 48 (see FIG. 1) in a first portion 50 (see FIGS. 1, 2A) of the compression chain structure 36 (see FIGS. 1, 2A), where the plurality of modules 40 (see FIGS. 1, 2A) are in the rigid position 44 (see FIGS. 1, 2A). In one version, the first portion 50 (see FIG. 1) comprises a vertical portion 50a (see FIG. 2A) of the compression chain structure 36. As shown in FIG. 1, the compression chain structure 36 further comprises a second portion 52, such as a horizontal portion 52a (see FIG. 2A), of the compression chain structure 36. The first portion 50, for example, the vertical portion 50a, is configured to move, and moves, in a first portion movement 54 (see FIGS. 1, 2A), for example, a vertical movement 54a (see FIGS. 1, 2A), such as a vertical upward movement. The second portion 52, such as the horizontal portion 52a, is configured to move, and moves, in a second portion movement 56 (see FIGS. 1, 2A), for example, a horizontal movement 56a (see FIGS. 1, 2A), such as a horizontal sideways movement.

As shown in FIG. 1, the extendable compression chain assembly 30 further comprises in one version, an actuation end fitting 58, or drive end fitting, such as an actuation end fitting 58a (see FIG. 2A), attached to the first end 38 of the compression chain structure 36, and further comprises in one version, a structure interface end fitting 60, such as a structure interface end fitting 60a (see FIG. 2A), attached to the second end 39 of the compression chain structure 36. The actuation end fitting 58 and the structure interface end fitting 60 are discussed in further detail below with respect to FIGS. 2B-2C.

As shown in FIG. 1, the extendable compression chain system 10 further comprises an actuation mechanism 62 coupled to the extendable compression chain assembly 30, to move, actuate, advance, or drive, the extendable compression chain assembly 30, including the compression chain 35, along the track assembly 14 toward the curved portion 14a of the track assembly 14, and toward the curved surface 24 of the curved guide member 22 of the curved guide assembly 20. As shown in FIG. 1, in one version, the actuation mechanism 62 comprises an end-driven actuation mechanism (MECH.) 64 comprising one or more of, an actuator 66, including a mechanical linear actuator 66a, or a rotary actuator 66b, or another suitable actuator, one or more spine members 68, a rack-and-pinion system (SYS.) 70, a belt mechanism (MECH.) 71, or another suitable end-driven actuation mechanism. The actuation mechanism 62, such as the end-driven actuation mechanism 64, applies the load ($P_1$) 216 (see FIG. 2A), such as the actuation load 216a (see FIG. 2A), to the first end 38, such as the actuation end 38a, or drive end, of the compression chain structure 36, in order to move, actuate, advance, or drive the compression chain structure 36 toward the curved portion 14a of the track assembly 14, and toward the curved guide assembly 20 and toward the structure 12.

As shown in FIG. 1, in another version, the actuation mechanism 62 comprises a gear-driven actuation mechanism 72 comprising one or more gear mechanisms 74 (see also FIGS. 5E, 10B) and one or more racks 318 (see FIGS. 5E, 10B) coupled to one or more outer links 250 (see FIG. 2C) of the compression chain structure 36, to cause the first portion movement 54 (see FIG. 5E), such as the vertical movement 54a (see FIG. 5E), or vertical upward movement, of the first portion 50 (see FIG. 5E), for example, the vertical portion 50a (see FIG. 5E), of the compression chain structure 36. In one version, the gear-driven actuation mechanism 72 comprises a rack-and-pinion system 70a (see FIG. 5E). In another version, the gear-driven actuation mechanism 72 comprises a rack-and-pinion system 70b (see FIGS. 9B, 10B).

As shown in FIG. 1, the extendable compression chain system 10 further comprises a mechanical power apparatus 76 coupled to the actuation mechanism 62, to power the actuation mechanism 62 to move, actuate, or drive the extendable compression chain assembly 30. The mechanical power apparatus 76 preferably comprises a motor 78 (see FIG. 1) or another suitable mechanical power apparatus. The mechanical power apparatus 76, such as the motor 78, may comprise an electric motor powered by electricity, a battery operated motor powered by a battery, a pneumatic operated motor powered by a pneumatic system, or another suitable type of mechanical power apparatus powered by a power source. The mechanical power apparatus 76 may further comprises a hydraulic actuated mechanical power apparatus.

Figure 6A:
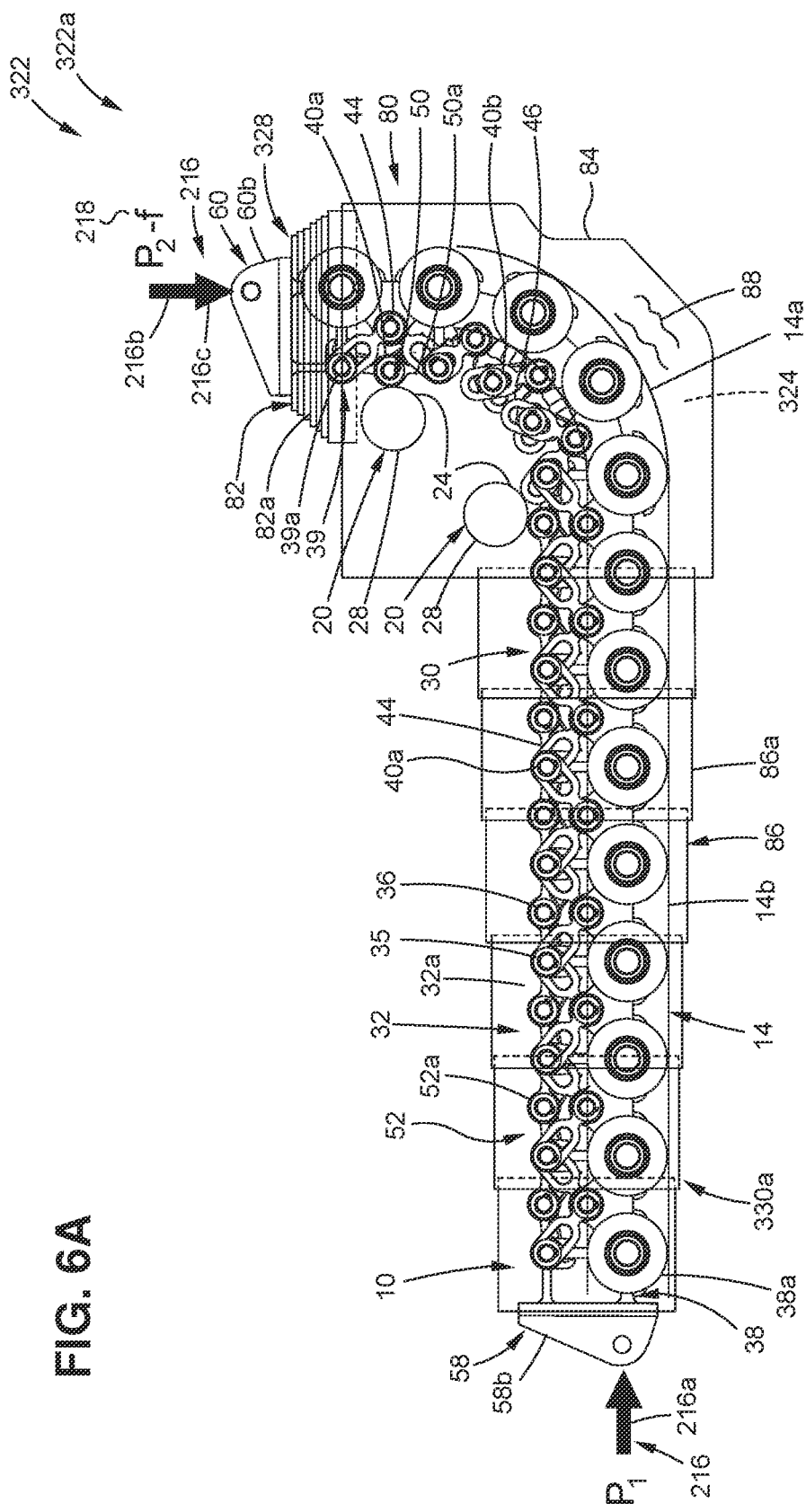
FIG. 6A is an illustration of a front view of an exemplary extendable compression chain assembly of the disclosure, attached within an oil enclosure structure, in a fully retracted position.
Figure 6B:
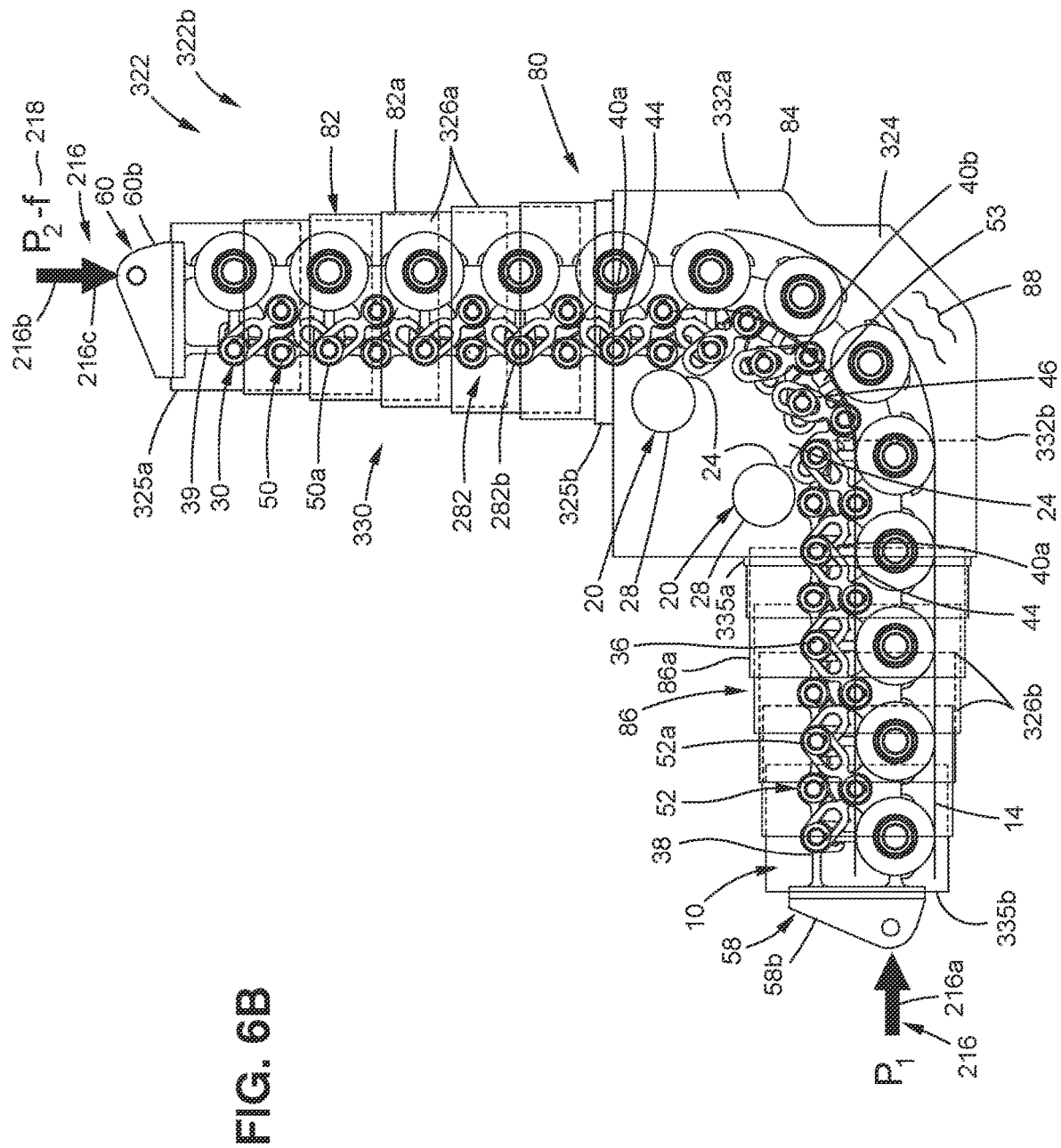
FIG. 6B is an illustration of a front view of the extendable compression chain assembly within the oil enclosure structure of FIG. 6A, in an intermediate extended position.
Figure 6C:
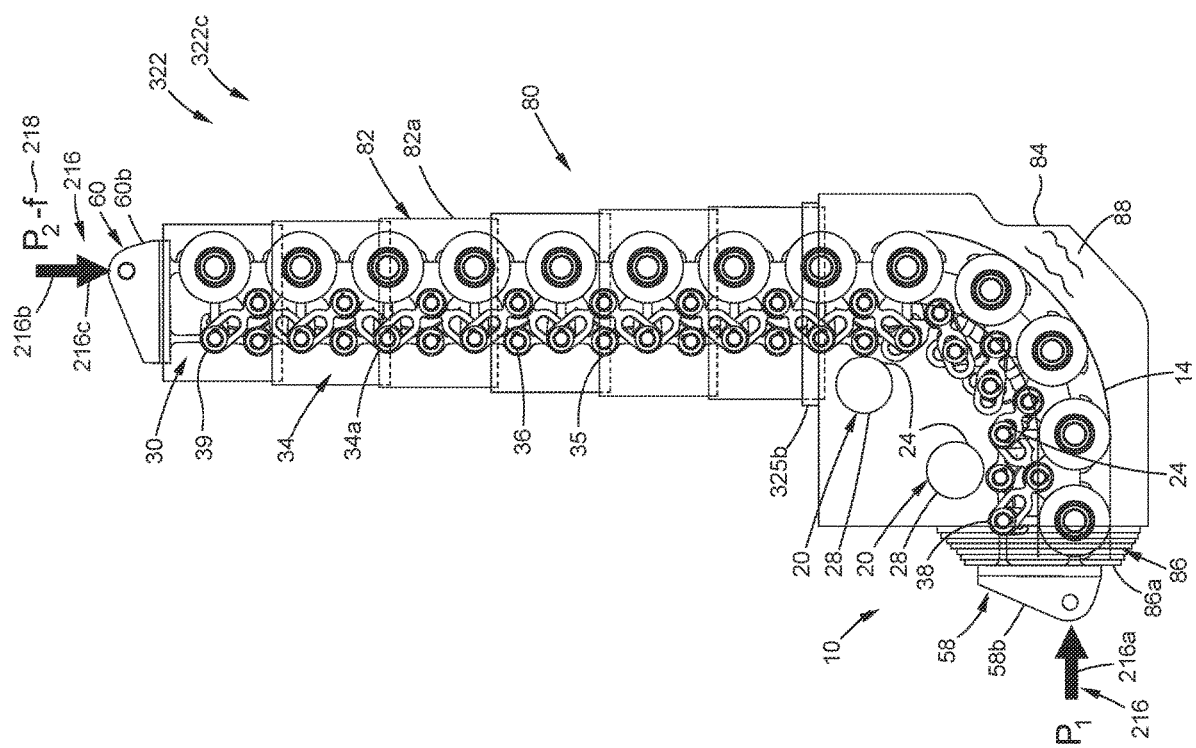
FIG. 6C is an illustration of a front view of the extendable compression chain assembly within the oil enclosure structure of FIG. 6A, in a fully extended position.

As shown in FIG. 1, in one version, the extendable compression chain system 10 or the extendable compression chain assembly 30 is coupled within an oil enclosure structure 80 (see also FIGS. 6A-6C). As shown in FIGS. 6A-6C, the oil enclosure structure 80 comprises a first telescoping oil enclosure portion 82, for example, a vertical telescoping oil enclosure portion 82a, a fixed oil enclosure portion 84, and a second telescoping oil enclosure portion 86, such as a horizontal telescoping oil enclosure portion 86a. The oil enclosure structure 80 is filled with oil 88, or another suitable fluid to lubricate the parts of the extendable compression chain system 10. The oil enclosure structure 80 is discussed in more detail below with respect to FIGS. 6A-6C.

As shown in FIG. 1, the extendable compression chain system 10 with the extendable compression chain assembly 30 is coupled, or attached, to, the structure 12, which is extended by the extendable compression chain system 10 and the extendable compression chain assembly 30, and which is retracted by the extendable compression chain system 10 and the extendable compression chain assembly 30. As shown in FIG. 1, in one version, the structure 12 comprises a wing strut 90 for a wing 92 of a vehicle 94, such as an aircraft 94a. In one version, the wing strut 90 may further include a jury strut 96 (see FIGS. 1, 8B) positioned between the wing 92 and the wing strut 90. The wing strut 90 has an interior 98 (see FIGS. 8A-8B) and an exterior 100 (see FIGS. 8A-8B) and a thickness 91 (see FIG. 1). As shown in FIG. 1, the wing strut 90 further has a strut cross section (CS) 102 with a thickness 103 and an airfoil (AF) shape 104. The extendable compression chain assembly 30 of the extendable compression chain system 10 is configured to move, and moves, from the retracted position 32 (see FIG. 1) to the extended position 34 (see FIG. 1), to extend, or expand, the thickness 103 of the strut cross section 102 from a contracted airfoil shape 106 (see FIG. 10A), such as a fully contracted airfoil shape 106a (see FIG. 10A), to an extended airfoil shape 108 (see FIG. 10C), such as a fully extended airfoil shape 108a (see FIG. 10C), and to extend, or expand, the thickness 91 of the wing strut 90 from a contracted position 110 (see FIG. 10A), such as a fully contracted position 110a (see FIG. 10A), to an extended position 112 (see FIG. 10C), such as a fully extended position 112a (see FIG. 10C).

As used herein, with respect to the wing strut 90 and the strut cross section 102, "contract" or "retract" means to cause a height 114 (see FIGS. 1, 1C) or thickness 91 (see FIG. 1) of the wing strut 90 and the thickness 103 (see FIG. 1) of the strut cross section 102 with the airfoil shape 104 to become thinner or smaller. The fully contracted position 110a (see FIG. 10A), or fully retracted position, is the strut cross section 102 (see FIG. 10A) and the thickness 91 of the wing strut 90 (see FIG. 10A) at the thinnest or smallest height 114 (see FIG. 1). As used herein, "extend" or "expand" means to cause the height 114 (see FIGS. 1, 1C) or thickness 91 of the wing strut 90 and the thickness 103 of the strut cross section 102 with the airfoil shape 104 to get thicker or larger. The fully extended position 112a (see FIG. 10C), or fully expanded position, is the thickness 103 of the strut cross section 102 (see FIG. 10C) and the thickness 91 of the wing strut 90 at the thickest or largest height 114 (see FIG. 10C).

The vehicle 94, such as the aircraft 94a, experiences load conditions 115 (see FIG. 1) when on the ground and when in flight. When the aircraft 94a is on the ground, the aircraft 94a is in, or at, a 1 g on ground condition 116 (see FIG. 1). As used herein "g" means gravitational force. The gravitational force is attractive and a downward force toward the center of the earth, and forces on the landing gear of the aircraft 94a are upward forces and are a reaction against the downward force. The 1 g on ground condition 116 results in compression 118 (see FIG. 1) in the wing strut 90 (see FIG. 1) because the dead weight of the wing 92 (see FIG. 1) from the downward force of gravity makes the wing 92 tend to sag or deflect downward, and thus the length of the wing strut 90 tends to shorten. The downward load is reacted upward by the landing gear.

When the aircraft 94a is in flight, the aircraft 94a, can be in a cruise flight condition 120 (see FIG. 1). The cruise flight condition 120 is typically a steady 1.0 g condition flight with a small amount of turbulence. Further, when the aircraft 94a is in flight, the aircraft 94a may be in an intermediate (INTERMED.) flight condition 122 (see FIG. 1). The intermediate flight condition 122 may be a 0.5 g condition, where a lower load threshold is a 0.3 g condition and an upper load threshold is a 0.7 g condition. In the intermediate flight condition 122, the aircraft 94a may be on its way to a minus 1 g (−1 g) pushover flight condition 124 (see FIG. 1).

In the minus 1 g pushover flight condition 124 (see FIG. 1), the wing 92 is bending down, such as in a wing down-bending flight condition (COND.) 125 and the direction of weight-force is opposite to the direction of g-force acceleration. The wing strut 90 (see FIG. 1) is designed for the minus 1 g pushover flight condition 124, as the minus 1 g pushover flight condition 124 puts the wing strut 90 into compression 118 (see FIG. 1), such as axial compression. In the minus 1 g pushover flight condition 124, an upward acceleration on the vehicle 94 is balanced by a downward force on the wing 92 from the air load pressures on the wing 92. This tends to bend the wing 92 downward and shorten a length of the wing strut 90.

Further, when the aircraft 94a is in flight, the aircraft 94a may be in, or at, for example, a 2.5 g up-bending of wing flight condition (COND.) 126 (see FIG. 1), when the wing 92 is bending up. For up-bending of the wing flight conditions, a vertical acceleration of the aircraft 94a is a factor. In the 2.5 g up-bending of wing flight condition 126, the air load on the wing 92 is in the upward direction. It is balanced by the weight of the aircraft 94a in the downward direction. The 2.5 g up-bending of wing flight condition 126 is a flight maneuver that imparts 2.5 times the force of gravity as a downward acceleration on the vehicle 94, which is reacted by the upward force on the wing 92. This tends to lengthen the wing strut 90, which puts it in tension 128 (see FIG. 1).

The strut cross section 102 of the wing strut 90 becomes thick or large, when the wing strut 90 is in compression 118 (see FIG. 1), when the aircraft 94a is in the 1 g on ground condition 116 (see FIG. 1), or in the minus 1 g pushover flight condition 124 (see FIG. 1). The wing strut 90 having the strut cross section 102 that becomes thick or large has a larger buckling load, which is sufficient to withstand the axial compression load 48 (see FIG. 1) from the minus 1 g pushover flight condition 124 (see FIG. 1).

The strut cross section 102 of the wing strut 90 becomes thin or small, when the aircraft 94a is in the cruise flight condition 120 (see FIGS. 1, 10A). As shown in FIG. 10A, the wing strut 90 is in the contracted position 110, such as a fully contracted position 110a, and the strut cross section 102 is in the contracted airfoil shape 106, such as a fully contracted airfoil shape 106a, during the cruise flight condition 120 of the aircraft 94a. The wing strut 90 that is thin or small enables lower drag.

During the cruise flight condition 120 (see FIG. 10A), for example, in a load condition range of greater than 0.7 g condition to 1.3 g condition, the wing strut 90 (see FIGS. 1, 8A, 10A) for the wing 92 (see FIGS. 1, 8A) is in tension 128 (see FIG. 1). The thickness 91 (see FIG. 1) of the wing strut 90 and the thickness 103 (see FIG. 1) of the strut cross section 102 (see FIGS. 1, 9A, 10A) are preferably extended, or expanded, between the 0.7 g condition and the 0.3 g condition, so that the wing strut 90 is prepared to take axial compression load 48 (see FIG. 1) by the time the axial compression load 48 is applied, when the wing strut 90 is in compression 118 (see FIG. 1). The expandable compression chain system 10 disclosed herein helps to avoid a wing strut 90 and strut cross section 102 that are thick during the cruise flight condition 120, and helps to avoid a wing strut 90 and a strut cross section 102 that are thin during the minus 1 g pushover flight condition 124.

As shown in FIG. 10C, the wing strut 90 is in the extended position 112, such as the fully extended position 112a, and the strut cross section 102 has the extended airfoil shape 108, such as the fully extended airfoil shape 108a, for example, when the wing strut 90 is in compression 118 (see FIG. 1), or under a strut compression load, during the minus 1 g pushover flight condition 124 (see FIG. 10C) or the wing down-bending flight condition 125 (see FIG. 1) of the aircraft 94a. Further, the wing strut 90 may be in the extended position 112, and the strut cross section 102 may be in the extended airfoil shape 108, in a range of tension 128 (see FIG. 1), so that they are expanded by the time the wing strut 90 goes into compression 118.

The thickness 103 (see FIG. 1) of the strut cross section 102 (see FIG. 1) of the wing strut 90 is configured to transition in shape between the contracted airfoil shape 106 (see FIG. 10A), such as the fully contracted airfoil shape 106a (see FIG. 10A), and the extended airfoil shape 108 (see FIG. 10C), such as the fully extended airfoil shape 108a (see FIG. 10C). Thus, the strut cross section 102 extends or expands from the strut cross section 102 (see FIG. 1) that is thin or small to the strut cross section 102 that is thick or large, and retracts or contracts from the strut cross section 102 that is thick or large to the strut cross section 102 that is thin or small. The expansion of the strut cross section 102 is driven by axial load in the wing strut 90, such as strut axial load, in tension 128 (see FIG. 1) and compression 118 (see FIG. 1). This allows for a wing strut 90 that is lightweight to carry the required axial compression loads 48 (see FIG. 1) for wing down-bending flight conditions 125 (see FIG. 1), but enables a more aerodynamically efficient small strut cross section 102 for the cruise flight condition 120 (see FIG. 1) portions of the flight. The wing strut 90 is able to carry compression 118, and the wing strut 90, such as the wing strut 90 that is thin or small, has the capability to become thick or large to withstand axial compression loads 48 (see FIG. 1).

Figure 9A:
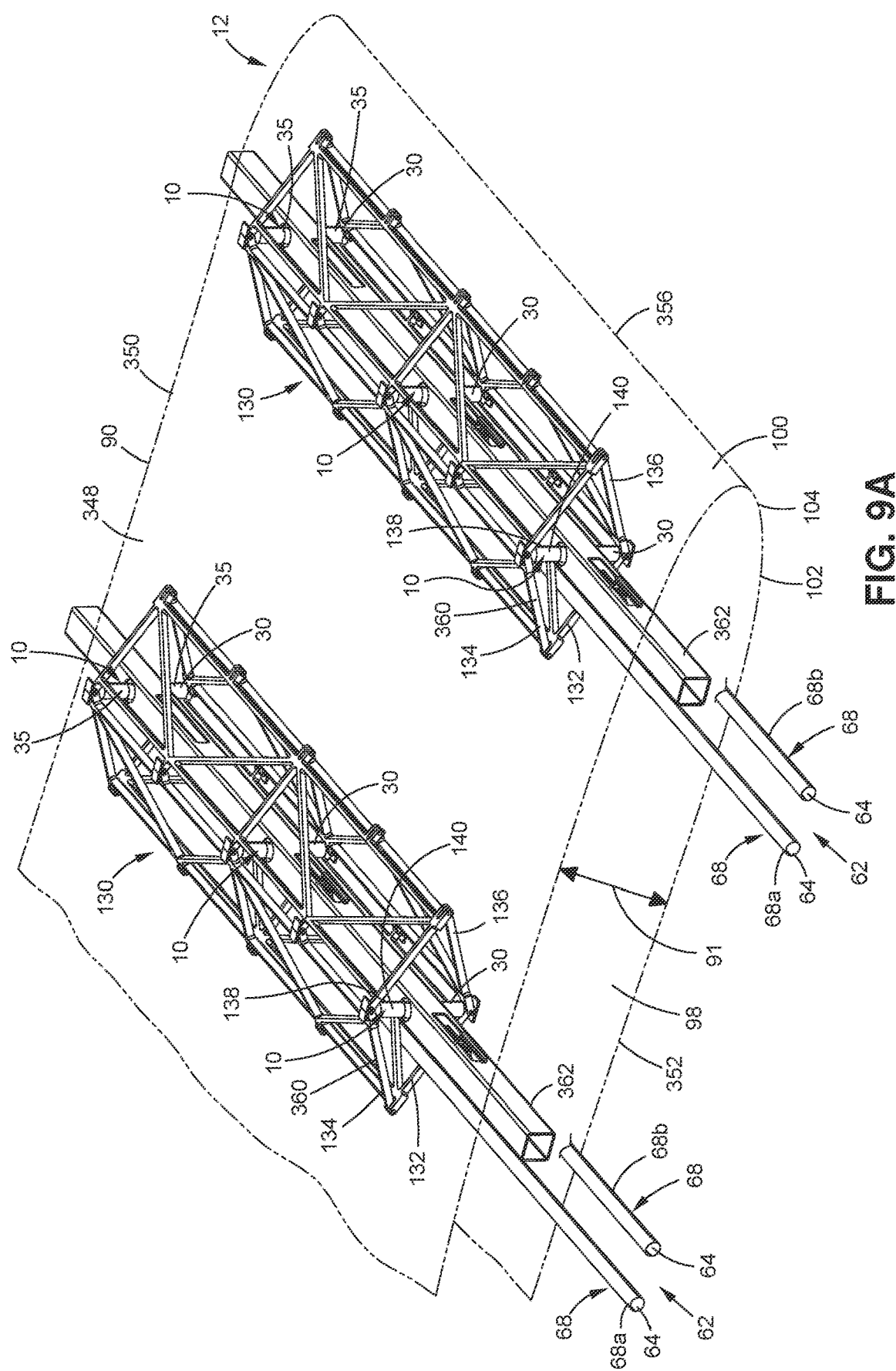
FIG. 9A is an illustration of a top perspective view of a wing strut with two shape transition assemblies, each having exemplary extendable compression chain systems of the disclosure.
Figure 9B:
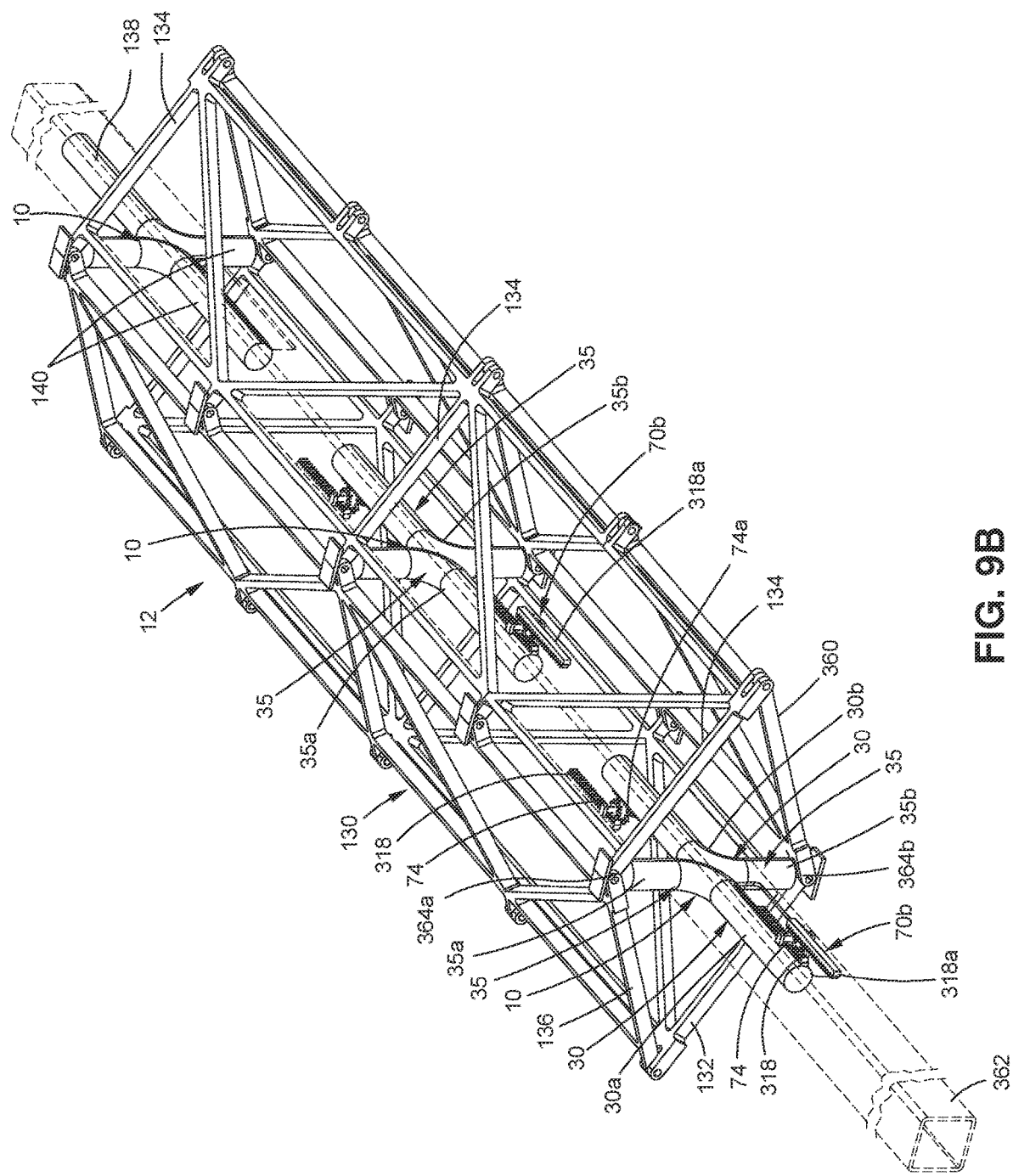
FIG. 9B is an illustration of a top perspective view of one of the shape transition assemblies of FIG. 9A, showing a cut-away view of exemplary extendable compression chain systems of the disclosure.

In one version, as shown in FIGS. 9A-9B, the extendable compression chain system 10 is part of a shape transition assembly 130 (see also FIG. 1) coupled to the interior 98 of the wing strut 90. As shown in FIGS. 1, 9B, 10A, the shape transition assembly 130 comprises a shape transition mechanism 132 with an expandable structure 134 (see FIG. 9B). The expandable structure 134 (see FIGS. 9B, 10C) is comprised of fixed length structural members 136 (see FIGS. 9B, 10A) and a drive mechanism 138 (see FIGS. 9B, 10A) comprised of variable length structural members 140 (see FIGS. 9B, 10A), such as in the form of the extendable compression chain assemblies 30 (see FIGS. 1, 9A, 10B). As shown in FIGS. 9A, 10A, the shape transition assembly 130 further comprises the actuation mechanism 62 (see also FIG. 1) in the form of spine members 68, including a first spine member 68a and a second spine member 68b.

As shown in FIG. 1, the shape transition assembly 130 further comprises an activation mechanism 142. In the version of the shape transition assembly 130 with the extendable compression chain assemblies 30, the activation mechanism 142 may comprise a strut axial load driven activation mechanism 144 (see FIG. 1), or a wing rotation system 146 (see FIG. 1). The wing rotation system 146 converts wing rotations 148 (see FIG. 1) of the wing 92 (see FIGS. 1, 8A-8B) to horizontal movement 150 (see FIG. 1) at a strut root 152 (see FIG. 8A) of the wing strut 90 (see FIGS. 1, 8A), to activate the actuation mechanism 62, for example, the spine members 68 (see FIGS. 9A, 10A), to move, drive, advance, or actuate the drive mechanism 138 in the form of the extendable compression chain assemblies 30.

The extendable compression chain assemblies 30 enable the wing strut 90 to increase the thickness 91 (see FIGS. 1, 9A) of the wing strut 90 during flight, thus allowing the wing strut 90 to be thin and have lower drag during the cruise flight condition 120 (see FIGS. 1, 10A), but enable the wing strut 90 to carry axial compression loads 48 (see FIG. 1) during the minus 1 g pushover flight condition 124 (see FIGS. 1, 10C).

Figure 11A:
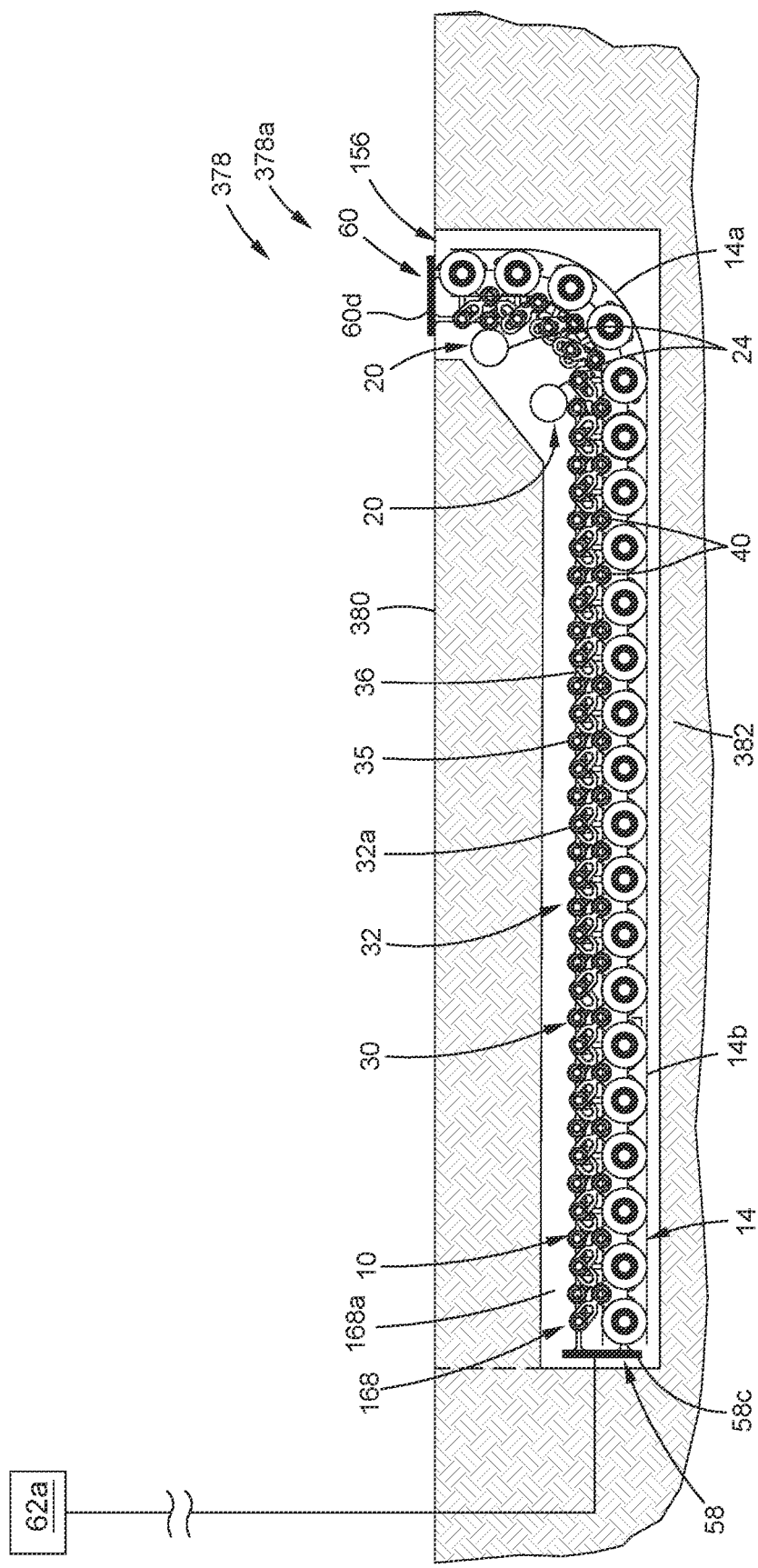
FIG. 11A is an illustration of a front view of an exemplary extendable compression chain system of the disclosure, positioned within an underground structure, where an extendable compression chain assembly is in a fully retracted position.
Figure 11B:
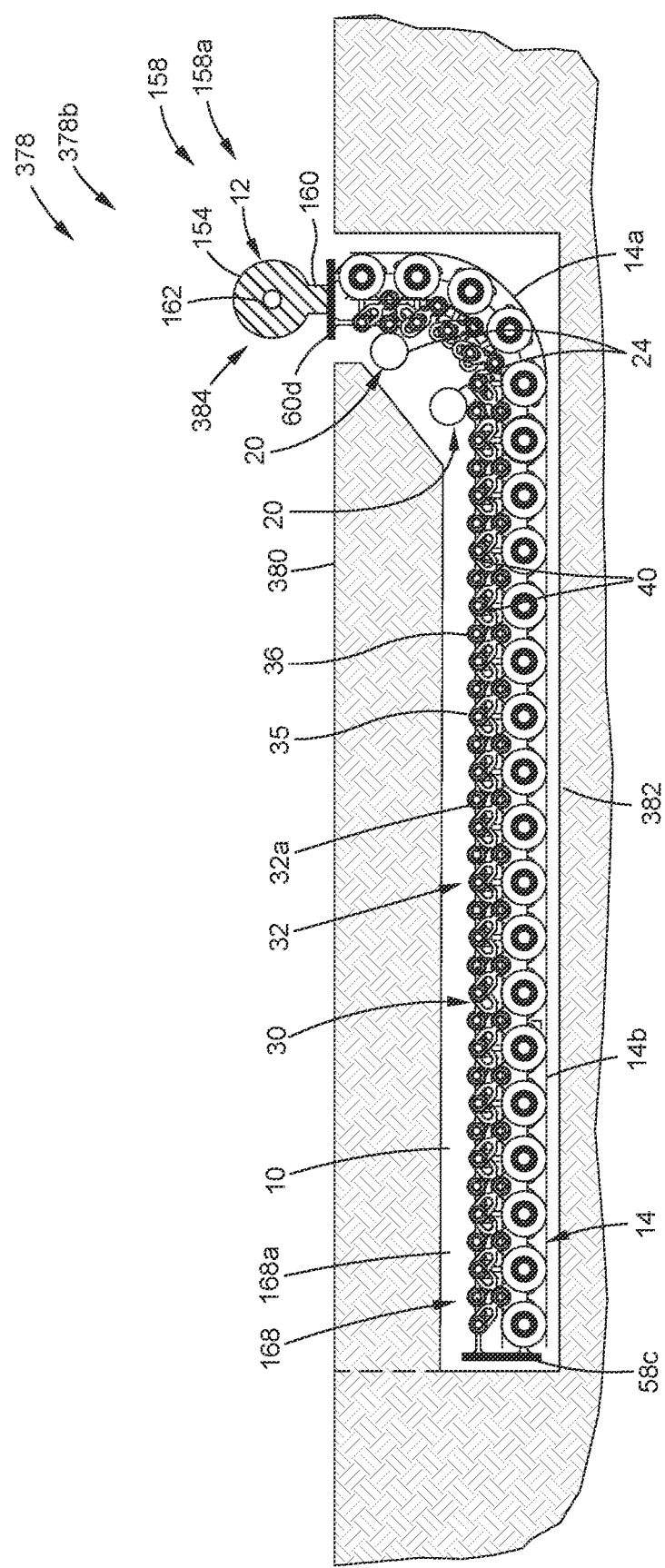
FIG. 11B is an illustration of a front view of the extendable compression chain system of FIG. 11A, where the extendable compression chain assembly is in the fully retracted position and is attached to an object that is deployed and extended above a ground surface.
Figure 11C:
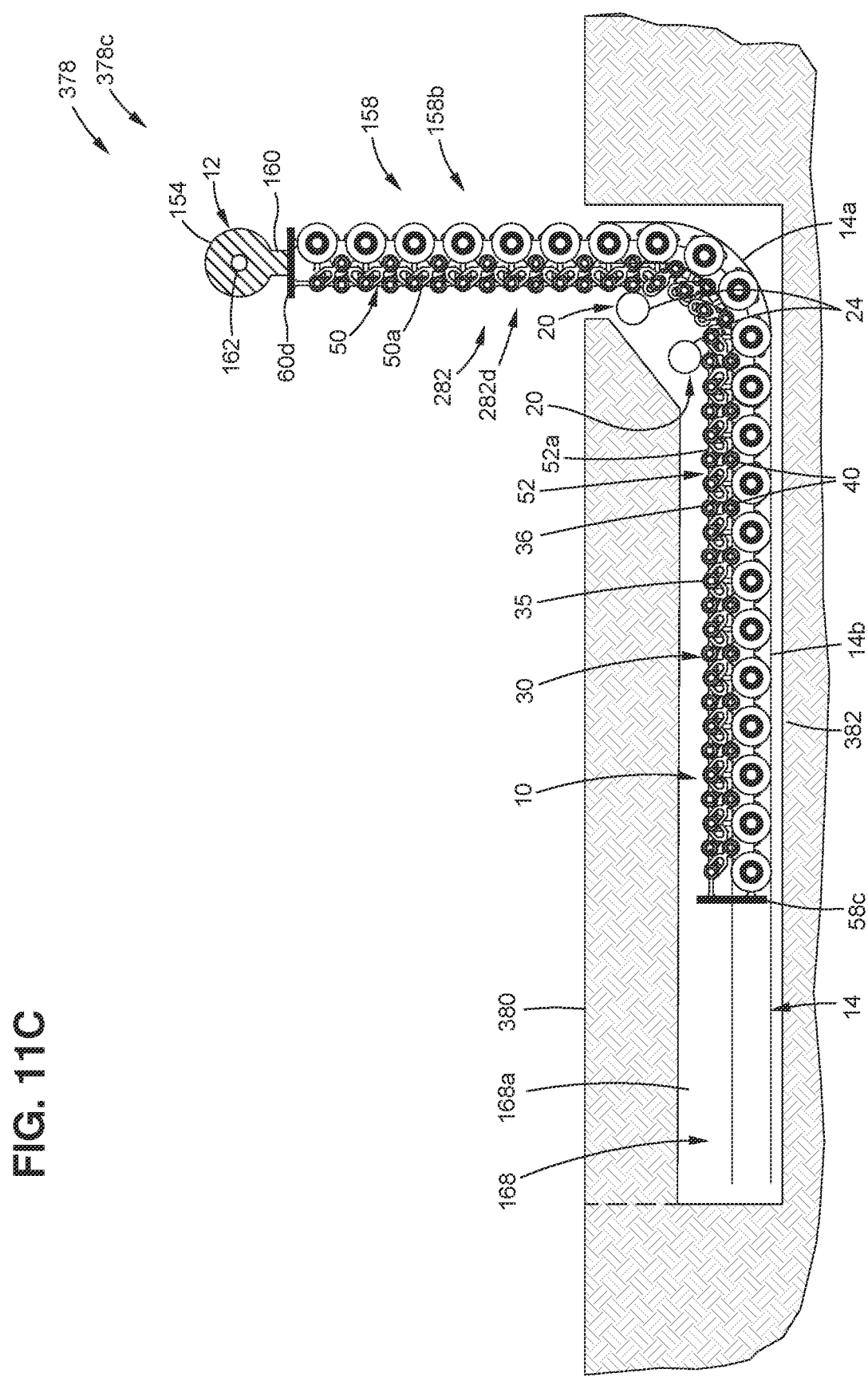
FIG. 11C is an illustration of a front view of the extendable compression chain system of FIG. 11B, where the extendable compression chain assembly with attached object is in an intermediate extended position.
Figure 11D:
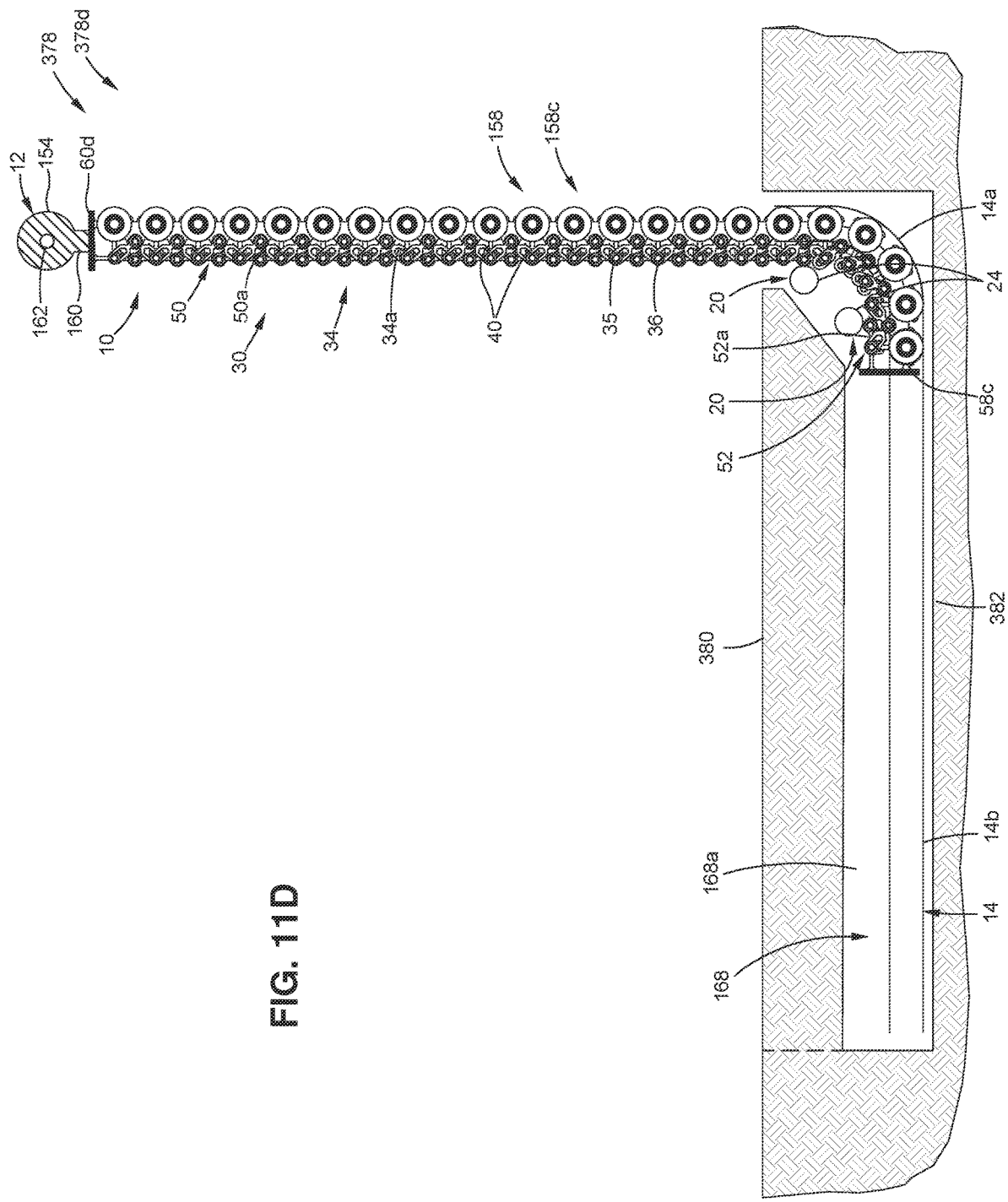
FIG. 11D is an illustration of a front view of the extendable compression chain system of FIG. 11B, where the extendable compression chain assembly with attached object is in a fully extended position.

As shown in FIG. 1, in another version, the structure 12 comprises an object 154 (see also FIG. 11B) movable from, and between, an underground position 156 (see also FIG. 11A), to one or more above ground positions 158 (see also FIGS. 11B-11D). The extendable compression chain system 10 and the extendable compression chain assembly 30 are coupled to the structure 12 comprising the object 154 (see also FIG. 11B). As shown in FIGS. 1, 11B, the object 154 comprises a support structure 160 (see FIG. 11B) with a sensor device 162, a surveillance apparatus (APP.) 164 (see FIG. 1), a weapon 166 (see FIG. 1), or another suitable object. As shown in FIGS. 11B-11D, the object 154, such as the support structure 160, can be hidden in an underground structure 168, such as an underground compartment 168a, or in underground trench, and when desired, the object 154 can be extended from the underground position 156 to the one or more above ground positions 158, with the extendable compression chain system 10, to operate the sensor device 162 (see FIGS. 11B-11D), or the surveillance apparatus 164 (see FIG. 1), or the weapon 166 (see FIG. 1). Once the sensor device 162 (see FIGS. 11B-11D), or the surveillance apparatus 164 (see FIG. 1), or the weapon 166 (see FIG. 1), has been used, the extendable compression chain system 10 can retract the support structure 160 back into the underground structure 168, such as the underground compartment 168a, or an underground trench, to disappear out of sight.

As further shown in FIG. 1, in another version, the structure 12 comprises a variable elevation platform 170, including in the form of a stage platform 172. Variable elevation platforms 170 that can quickly vary their height may be advantageously extended and retracted using the extendable compression chain system 10 and the extendable compression chain assembly 30 disclosed herein. The variable elevation platforms 170, including in the form of stage platforms 172, may be used for concerts, stage plays, and other entertainment events, and the compression chains 35 with the compression chain structures 36 used to extend and retract the variable elevation platforms 170 may have roller wheels 232 (see FIG. 2A), such as rubber-coated roller wheels, configured to roll along the rails 18 (see FIG. 2A) of the track assembly 14, so that their operation is quiet.

As shown in FIG. 1, in other versions, the structure 12 comprises an extendable ladder 174, an extendable mast 176, an extendable pole 178, a periscope 180 for a submarine vehicle 182, or another suitable structure that may be extended and retracted using the extendable compression chain system 10 and the extendable compression chain assembly 30 disclosed herein. For example, the extendable ladder 174 may be extended and retracted with the extendable compression chain system 10 and used to access tall buildings and other tall structures. Further, the extendable mast 176 may be extended and retracted with the extendable compression chain system 10 and used to raise and lower masts on sailboats, yachts, or other water vessels, and to facilitate storage, maintenance, repair, and transport under bridges and other low structures, of such sailboats, yachts, and water vessels. Further, the extendable pole 178 may be extended and retracted with the extendable compression chain system 10 and used to access utility poles or other types of poles for maintenance and repair of such utility poles and other types of poles. Further, the periscope 180 for the submarine vehicle 182 may be extended and retracted with the extendable compression chain system 10.

Figure 2B:
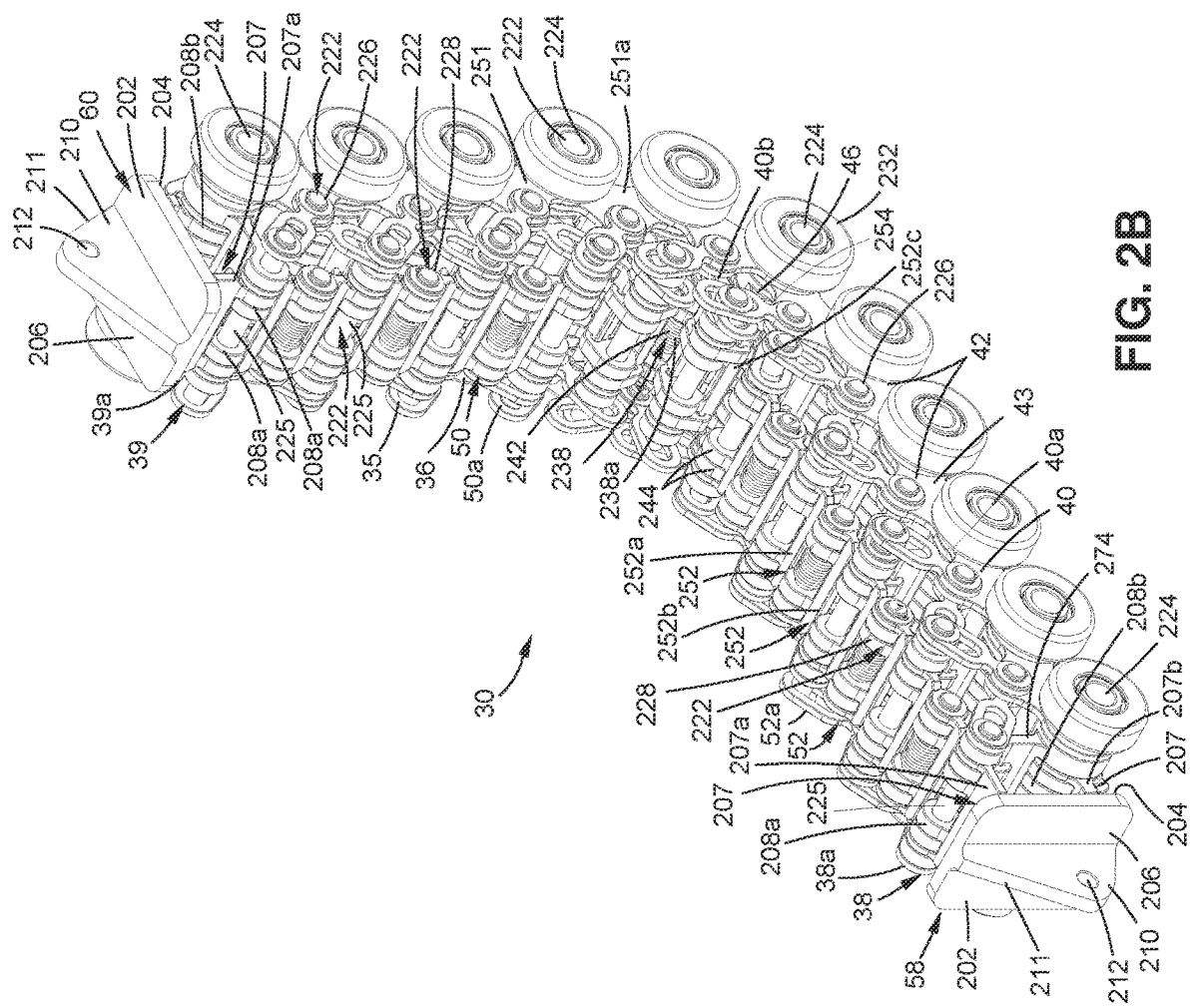
FIG. 2B is an illustration of a front right side perspective view of an exemplary version of the extendable compression chain assembly of FIG. 2A.
Figure 2C:
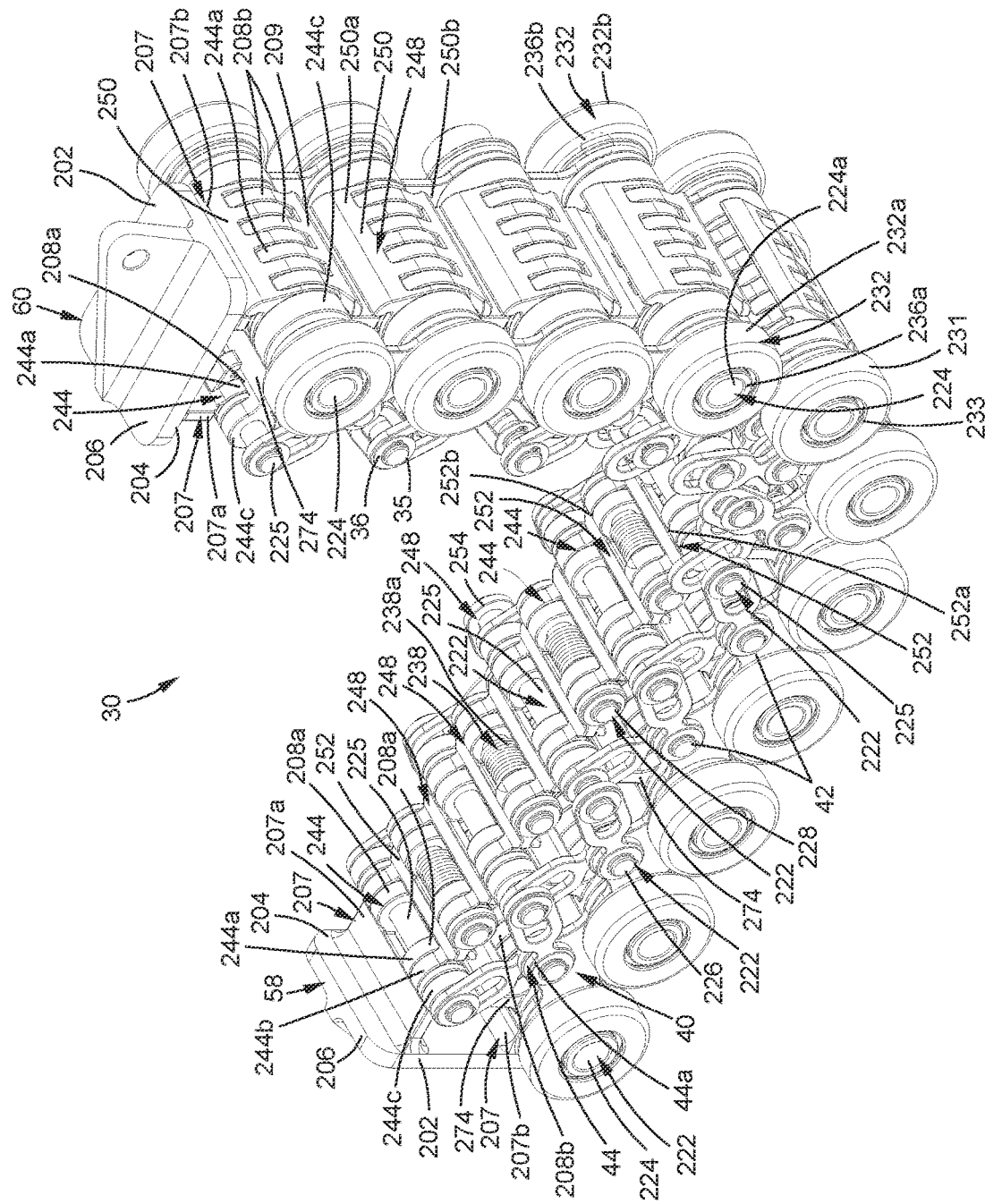
FIG. 2C is an illustration of a front left side perspective view of the extendable compression chain assembly of FIG. 2B.
Figure 21:
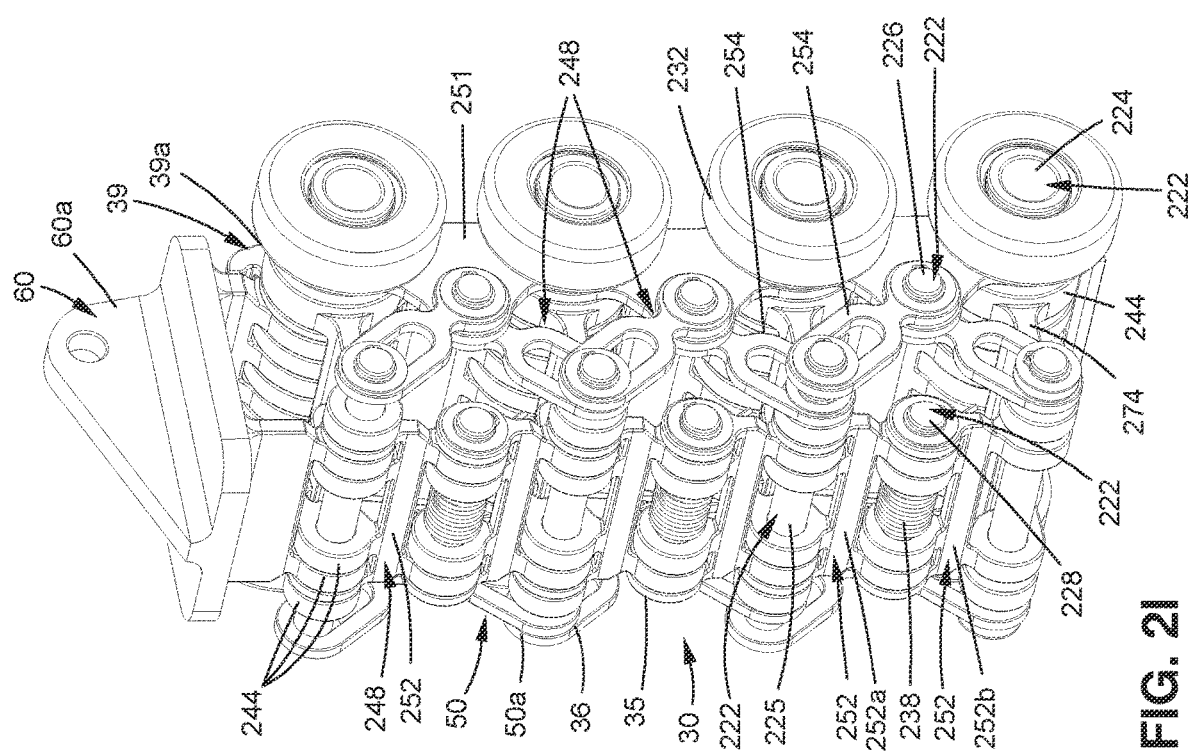
Figure 2K:
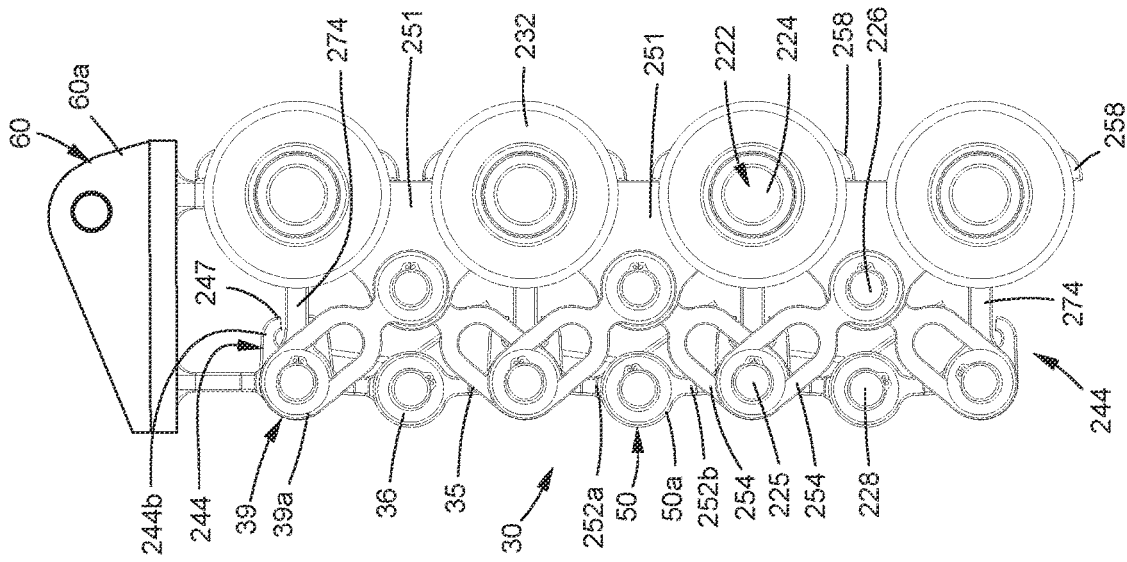
FIG. 2K is an illustration of a front view of the first portion of FIG. 2I.
Figure 2J:
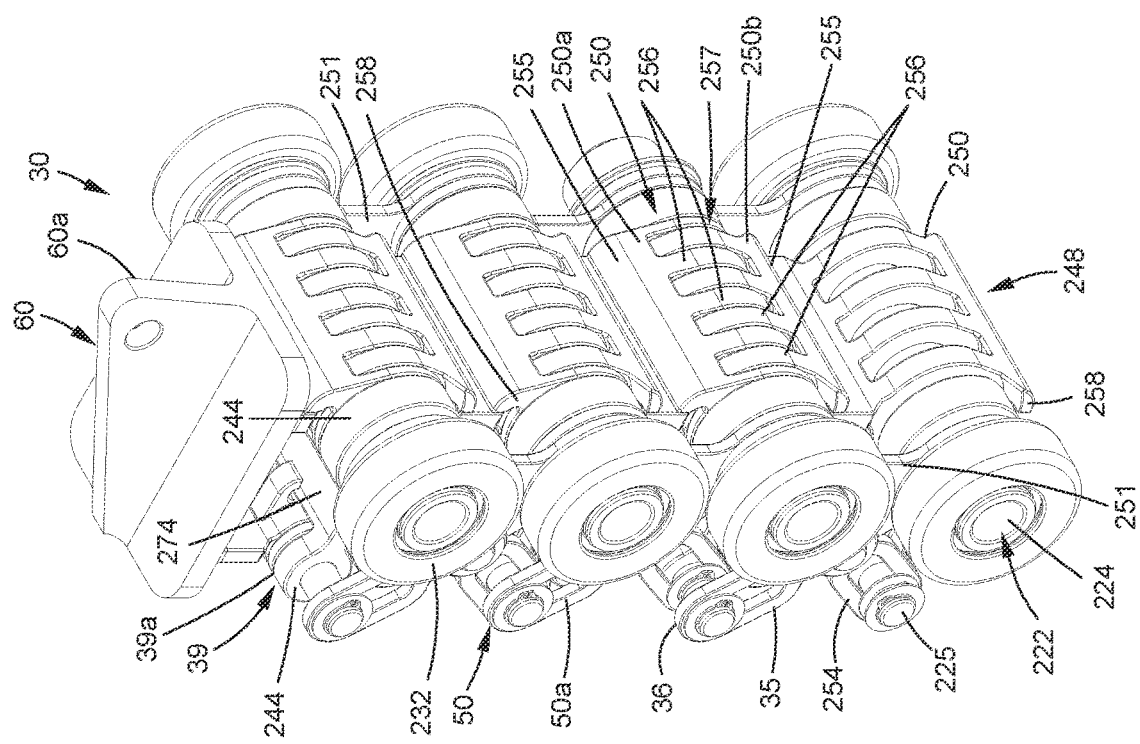
FIG. 2J is an illustration of a front left side perspective view of the first portion of FIG. 2I.

Now referring to FIGS. 2A-2K, FIGS. 2A-2K show components of an exemplary version of an extendable compression chain system 10 (see FIG. 2A) with an exemplary version of an extendable compression chain assembly 30 (see FIGS. 2A-2B) of the disclosure. FIG. 2A is an illustration of a front perspective view of an exemplary version of the extendable compression chain system 10 of the disclosure, with the extendable compression chain assembly 30 of the disclosure. FIG. 2B is an illustration of a front right side perspective view of the exemplary version of the extendable compression chain assembly 30 of FIG. 2A. FIG. 2C is an illustration of a front left side perspective view of the extendable compression chain assembly 30 of FIG. 2B. FIG. 2D is an illustration of a front view of the extendable compression chain assembly 30 of FIG. 2B. FIG. 2E is an illustration of a top view of the extendable compression chain assembly 30 of FIG. 2D. FIG. 2F is an illustration of a right side view of the extendable compression chain assembly 30 of FIG. 2D. FIG. 2G is an illustration of a bottom view of the extendable compression chain assembly 30 of FIG. 2D. FIG. 2H is an illustration of a left side view of the extendable compression chain assembly 30 of FIG. 2D. FIG. 2I is an illustration of a front right side perspective view of a first portion 50 of the extendable compression chain assembly 30 of FIG. 2B. FIG. 2J is an illustration of a front left side perspective view of the first portion 50 of FIG. 2I. FIG. 2K is an illustration of a front view of the first portion 50 of FIG. 2I.

As shown in FIG. 2A, the extendable compression chain system 10 comprises, in one version, the track assembly 14 with the base structure 16 and rails 18, such as a first rail 18a and a second rail 18b. As shown in FIG. 2A, the track assembly 14 has a first end 184, a second end 186, a length 188, and a width 189. The first end 184 and the second end 186 are open to allow the extendable compression chain assembly 30 to travel and move along the track assembly 14, such as to travel and move horizontally along the track assembly 14, and/or to travel and move vertically along the track assembly 14 (see FIG. 6C), and/or to travel linearly or non-linearly along the track assembly 14. In one version, as shown in FIG. 2A, the base structure 16 and the rails 18 of the track assembly 14 extend horizontally. In other versions, such as shown in FIG. 6C, all, or portions of, the base structure 16 and the rails 18 of the track assembly 14 may extend vertically or upward. As shown in FIG. 2A, the length 188 of the track assembly 14 is a horizontal length 188a, where the second end 186 ends at the curved guide assembly 20. However, the track assembly 14 may have another suitable length. As shown in FIG. 2A, the base structure 16 has sides 190 and a base plate 192, where the sides 190 are perpendicular, or substantially perpendicular to the base plate 192, and the rails 18 are coupled to the base plate 192. As shown in FIG. 2A, the lengths of the rails 18, the sides 190, and the base plate 192 are preferably equal, or substantially equal, to the length 188 of the track assembly 14. The track assembly 14 may be made of a sturdy and strong metal material such as steel, stainless steel, aluminum, or another sturdy and strong metal material. Alternatively, the track assembly 14 may be made of a sturdy and strong composite material, a sturdy and strong polymeric material, or another suitably sturdy and strong material.

As shown in FIG. 2A, the extendable compression chain system 10 further comprises the curved guide assembly 20 coupled to the track assembly 14, via one or more attachment members 194. As shown in FIG. 2A, the curved guide assembly 20 is directly attached to the track assembly 14 with the attachment member 194, such as a bracket 194a. In other versions, the one or more attachment members 194 may comprise bolts, screws, or other suitable attachment members. Alternatively, the curved guide assembly 20 may be attached to a separate structure (not shown), and the track assembly 14 may also be attached to the separate structure.

As shown in FIG. 2A, the curved guide assembly 20 comprises one or more curved guide members 22 each with a curved surface 24 facing the compression chain structure 36. As shown in FIG. 2A, in one version, the curved guide member 22 comprises guide rollers 28 each with a curved surface 24 facing the compression chain structure. The curved surface 24, for example, the convex side 196, of the curved guide member 22, such as the guide roller 28, interfaces with inner links 252 (see FIGS. 2A, 3A) of the modules 40 (see FIGS. 2A, 3A) of the compression chain 35 (see FIG. 2A) with the compression chain structure 36 (see FIG. 2A). A width 196 (see FIG. 2A) of the curved guide member 22, such as the guide roller 28, is substantially equal to, or slightly less than, a width 200 (see FIG. 3A) of the inner links 252 of the modules 40, so that the curved guide member 22, such as the guide roller 28, does not interface with outer links 250 (see FIG. 2C), diagonal links 254 (see FIG. 2A), or any other components of the modules 40 of the compression chain structure 36. In another version, the curved guide member 22 comprises a fixed guide member 26 (see FIG. 1), or another suitable curved guide member with a curved surface. The curved guide member 22 in the form of the guide roller 28 (see FIGS. 1, 5A), may comprise a cylindrical guide roller, or another suitable guide roller, with a curved surface 24. The curved guide member 22 may also comprise another suitable curved apparatus having a curved surface. The curved guide member 22, such as the fixed guide member 26, does not need to rotate but it can rotate in certain versions, such as the guide roller 28.

One or more of the inner links 252 (see FIG. 2A) of the modules 40 of the compression chain structure 36 of the extendable compression chain assembly 30 are configured to contact, and do contact, the curved surface 24 of each curved guide member 22, such as each guide roller 28, as the compression chain structure 36 of the extendable compression chain assembly 30 moves along the track assembly 14 and follows the curved portion 14a (see FIG. 2A) of the track assembly 14 (see FIG. 2A), and wraps around, or curves around, the curved surface 24 of each curved guide member 22, such as each guide roller 28, in a curved manner or curved direction.

As shown in FIG. 2A, the compression chain structure 36 of the compression chain 35 has the first portion 50, for example, the vertical portion 50a, and has the second portion 52, for example, the horizontal portion 52a. As shown in FIG. 2A, the first portion 50 of the compression chain structure 36 moves in the first portion movement 54, for example, a vertical movement 54a, such as a vertical upward movement, and the second portion 52 of the compression chain structure 36 moves along the track assembly 14 in the second portion movement 56, for example, a horizontal movement 56a. As further shown in FIG. 2A, the compression chain structure 36 has a third portion 53, for example, a curved portion 53a, positioned between the first portion 50 and the second portion 52. As shown in FIG. 2A, the third portion 53 of the compression chain structure 36 moves in a third portion movement 57, such as a curved movement 57a, when the compression chain structure 36 moves between the second portion movement 56 and the first portion movement 54. The description of vertical portion 50a and horizontal portion 52a are for a ground-based version, or a version where the vertical direction is up and down and the horizontal direction is substantially parallel to the ground surface. However, for other versions, the first portion 50 may be a horizontal direction, an angled direction, or another suitable direction, and the second portion 52 may be a vertical direction, an angled direction, or another suitable direction.

As shown in FIG. 2A, the modules 40 are rigid modules 40a in the rigid position 44 in the first portion 50 and the second portion 52, and the modules 40 are non-rigid modules 40b in the collapsed position 46 in the third portion 53. The modules 40 are movable between the rigid position 44 in the second portion 52 and the collapsed position 46 in the third portion 53, as the compression chain structure 36 follows the curved portion 14a of the track assembly 14, and wraps around, or curves around, the curved guide assembly 20, for example, the curved surface 24 of each curved guide member 22, of the curved guide assembly 20, and moves or travels from the second portion 52 to the third portion 53. Further, the modules 40 are movable between the collapsed position 46 in the third portion 53 and the rigid position 44 in the first portion 50, as the compression chain structure 36 follows the curved portion 14a of the track assembly 14, and wraps past the curved guide assembly 20, and moves or travels from the third portion 53 to the first portion 50. The compression chain 35 with the compression chain structure 36 carries an axial compression load 48 (see FIG. 1) in the first portion 50 and the second portion 52 of the compression chain structure 36 of the compression chain 35, where the plurality of modules 40 are in the rigid position 44.

As shown in FIG. 2B, the extendable compression chain assembly 30 comprises the compression chain 35 with the compression chain structure 36 having the first end 38, the second end 39, and the plurality of modules 40 connected together in series, such as in the series configuration 42, between the first end 38 and the second end 39. As further shown in FIG. 2B, the first end 38 comprises the actuation end 38a, or drive end, and the second end 39 comprises the push-pull end 39a that moves away from the curved guide assembly 20 (see FIG. 2A) location to push the structure 12 (see FIGS. 1, 9B, 11B) away from the curved guide assembly 20 (see FIG. 2A) and extend the structure 12, or to pull the structure 12 toward the curved guide assembly 20 and retract the structure 12.

As shown in FIGS. 2A-2B, the extendable compression chain assembly 30 comprises in one version, the actuation end fitting 58, or drive end fitting, such as the actuation end fitting 58a (see FIG. 2A), attached to the first end 38 of the compression chain structure 36, and further comprises in one version, the structure interface end fitting 60, such as the structure interface end fitting 60b (see FIG. 2A), attached to the second end 39 of the compression chain structure 36.

In one version, as shown in FIGS. 2B-2C, the actuation end fitting 58 and the structure interface end fitting 60 both comprise a base plate 202 having a first side 204, or bottom side, and a second side 206, or top side. As shown in FIGS. 2B-2C, the actuation end fitting 58 and the structure interface end fitting 60 both further comprise legs 207, including a first leg 207a, and a second leg 207b, coupled to, and extending from, the first side 204, or bottom side, of the base plate 202 to form a U-shaped configuration. In other versions, the actuation end fitting 58 and the structure interface end fitting 60 may have different shaped configurations.

As shown in FIGS. 2B-2C, 2F, 2G, the first leg 207a (see FIG. 2F) of both the actuation end fitting 58 (see FIG. 2G) and the structure interface end fitting 60 (see FIG. 2F) has first end attachment portions 208a configured for coupling, and coupled, or attached, to an inner pin 225, and the second leg 207b (see FIG. 2G) of both the actuation end fitting 58 and the structure interface end fitting 60 has second end attachment portions 208b configured for coupling, and coupled, or attached, to an outer pin 224. The first end attachment portions 208a may be in the form of first lugs 244a (see FIGS. 2C, 2F), circular clamps, locking members, or other suitable end attachment portions. FIGS. 2B-2C, 2F show the first leg 207a of both the actuation end fitting 58 (see FIGS. 2B-2C) and the structure interface end fitting 60 (see FIGS. 2B-2C, 2F) with the first end attachment portions 208a attached to the inner pin 225, and each first end attachment portion 208a is positioned adjacent to, and between, either second lugs 244b (see FIG. 2C) of an inner link 252 (see FIG. 2C) or third lugs 244c (see FIG. 2C) of an arm member 274 (see FIG. 2C). FIGS. 2C, 2H show the second leg 207b of the actuation end fitting 58 (see FIG. 2G) and the structure interface end fitting 60 (see FIG. 2C) extending from the first side 204, or bottom side, of the base plate 202, and show the second end attachment portions 208b extending from a spine support portion 209 attached to the outer pin 224 (see FIG. 2G), and each second end attachment portion 208b is positioned adjacent to, and between, an outer link 250. As shown in FIGS. 2C, 2G, 2H, the second end attachment portions 208b interlink with the outer link 250, such as outer link first portions 250a (see FIGS. 2G, 2H) of the outer link 250.

As shown in FIG. 2B, in one version, the actuation end fitting 58 and the structure interface end fitting 60 both further comprise an attachment point portion 210 coupled to, and extending outwardly, or upwardly, from the second side 206 of the base plate 202. As shown in FIG. 2B, the attachment point portion 210 has a through hole 212 configured to receive, and receiving, an attachment element 214 (see FIG. 2A), such as a screw, a bolt, a pin, or another suitable attachment element. As shown in FIG. 2B, the attachment point portion 210 of the actuation end fitting 58 and the structure interface end fitting 60 has a triangle shaped configuration 211 with a base of the triangle coupled, or attached, to the second side 206 of the base plate 202, and a triangular body projecting or protruding outwardly, or upwardly, from the second side 206, so that the through hole 212 is elevated above the second side 206. In other versions, the attachment point portion 210 may be different shaped configurations. As shown in FIG. 2A, the attachment point portion 210 of the actuation end fitting 58 is configured for coupling, and is coupled, or attached, to the actuation mechanism 62, via the attachment element 214. As shown in FIG. 2A, the attachment point portion 210 of the structure interface end fitting 60 is configured for coupling, and is coupled, or attached, to the structure 12 (see also FIGS. 1, 9B, 11B).

As shown in FIG. 2A, the extendable compression chain system 10 further comprises the actuation mechanism 62 coupled to the extendable compression chain assembly 30, to move, actuate, advance, or drive, the extendable compression chain assembly 30 along the rails 18 of the track assembly 14 and around the curved guide assembly 20. The extendable compression chain assembly 30 with the compression chain 35 having the compression chain structure 36 is driven in various ways.

As shown in FIG. 2A, in one version, the actuation mechanism 62 comprises an end-driven actuation mechanism 64 comprising an actuator 66, such as a mechanical linear actuator 66a coupled to the actuation end fitting 58, such as the drive end fitting, of the extendable compression chain assembly 30, to drive, or push, the first end 38, such as the actuation end 38a, or drive end, of the compression chain structure 36 along the rails 18 of the track assembly 14. In other versions, the actuation mechanism 62 comprises a rotary actuator 66b (see FIG. 1), one or more spine members 68 (see FIGS. 1, 9A), a rack-and-pinion system 70 (see FIG. 1), a belt mechanism 71 (see FIG. 1), or another suitable end-driven actuation mechanism. As shown in FIG. 2A, the actuation mechanism 62, such as the end-driven actuation mechanism 64, applies the load ($P_1$) 216, such as the actuation load 216a, to the first end 38, such as the actuation end 38a, or drive end, of the compression chain structure 36, in order to move, actuate, advance, or drive the compression chain structure 36, such as the second portion 52, for example, the horizontal portion 52a, toward the curved guide assembly 20 and toward the structure 12. As shown in FIG. 2A, one or more of a plurality of inner links 252 of the modules 40 of the compression chain structure 36 wrap around, or curve around, the curved guide assembly 20, and the curved guide assembly 20 pushes in on the inner links 252 at the articulated edge pin 228 location to their over-center reversed position 296 (see FIG. 4D), so that the module 40 is then able to collapse and follow the path defined by the curved portion 14a of the track assembly 14, and to force the first portion 50, for example, the vertical portion 50a, of the compression chain structure 36, upward in the first portion movement 54, such as the vertical movement 54a.

Figure 5A:
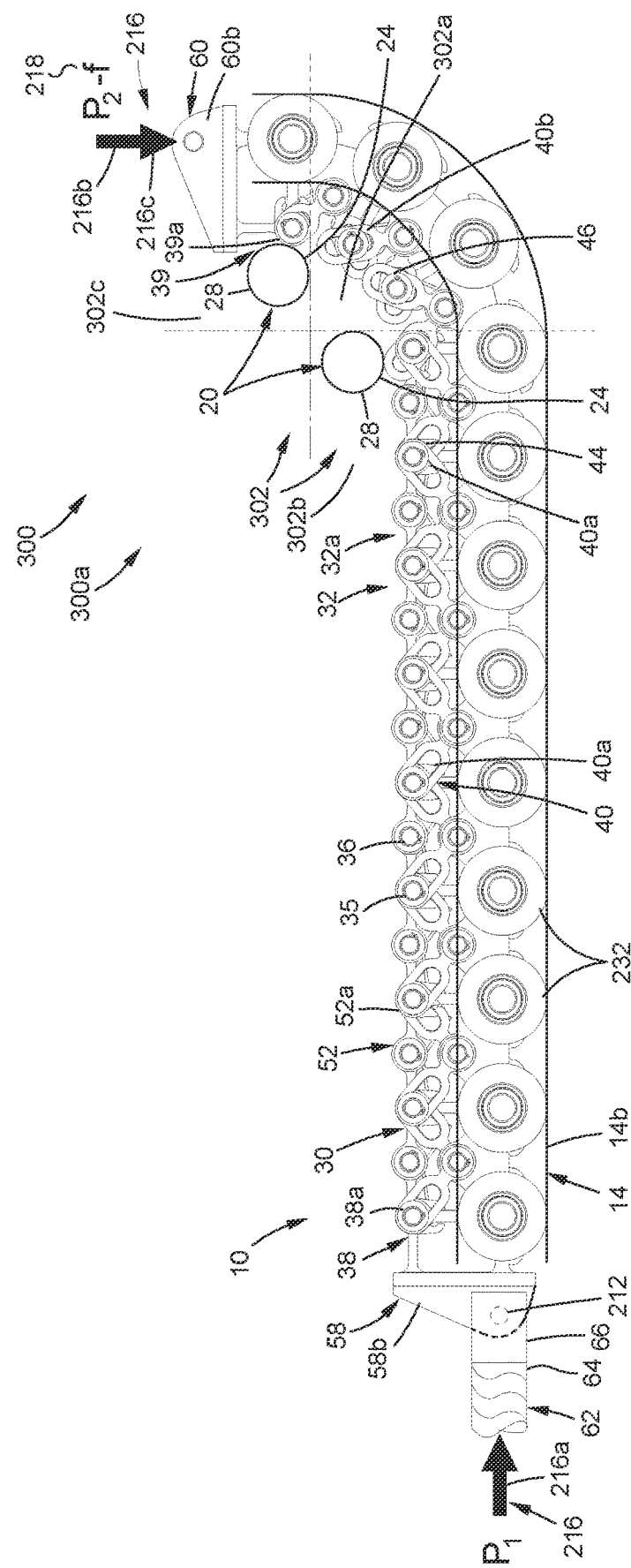
FIG. 5A is an illustration of a front view of an exemplary extendable compression chain system of the disclosure, where an extendable compression chain assembly is in a fully retracted position.
Figure 5B:
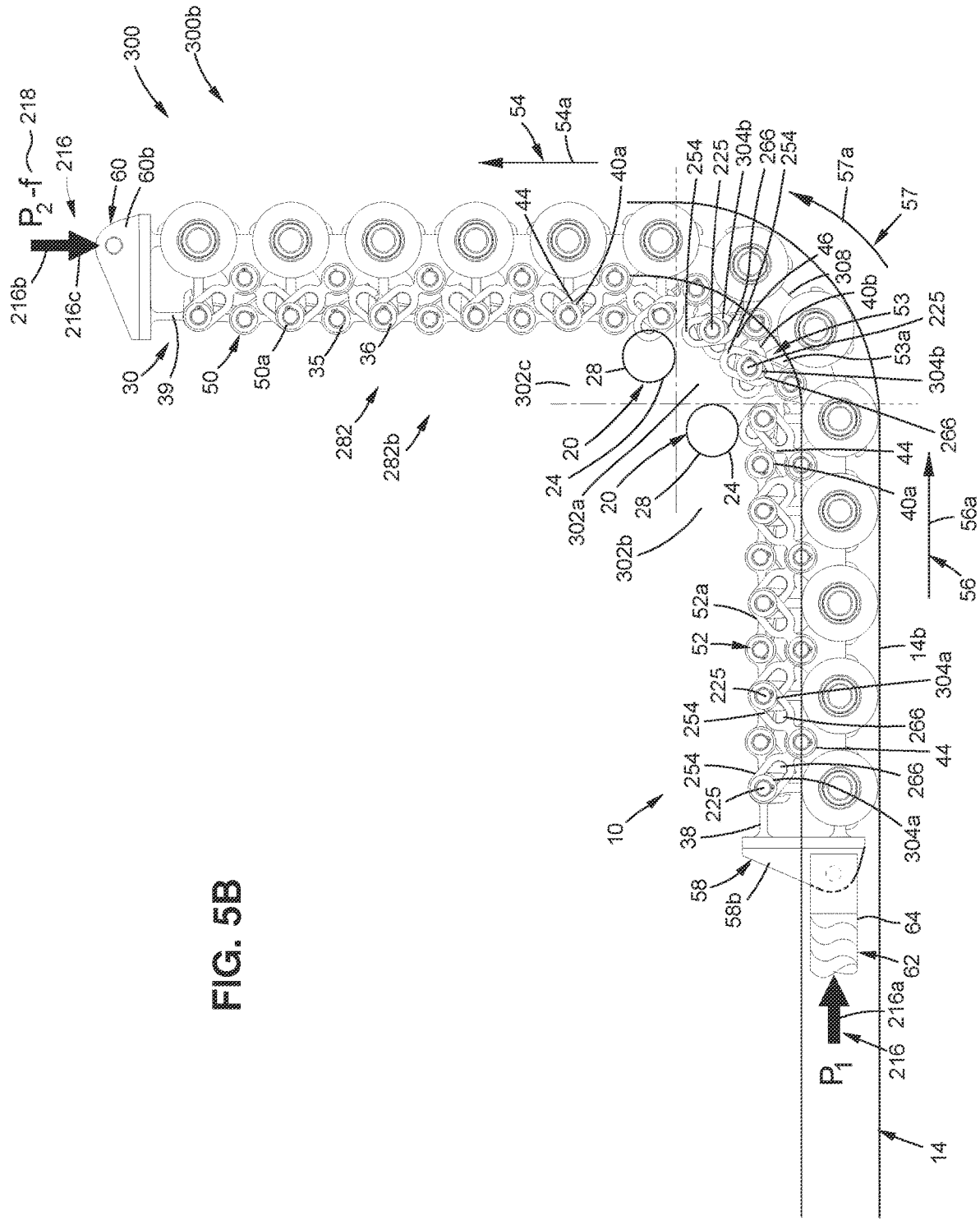
FIG. 5B is an illustration of a front view of the extendable compression chain system of FIG. 5A, where the extendable compression chain assembly is in an intermediate extended position.
Figure 5C:
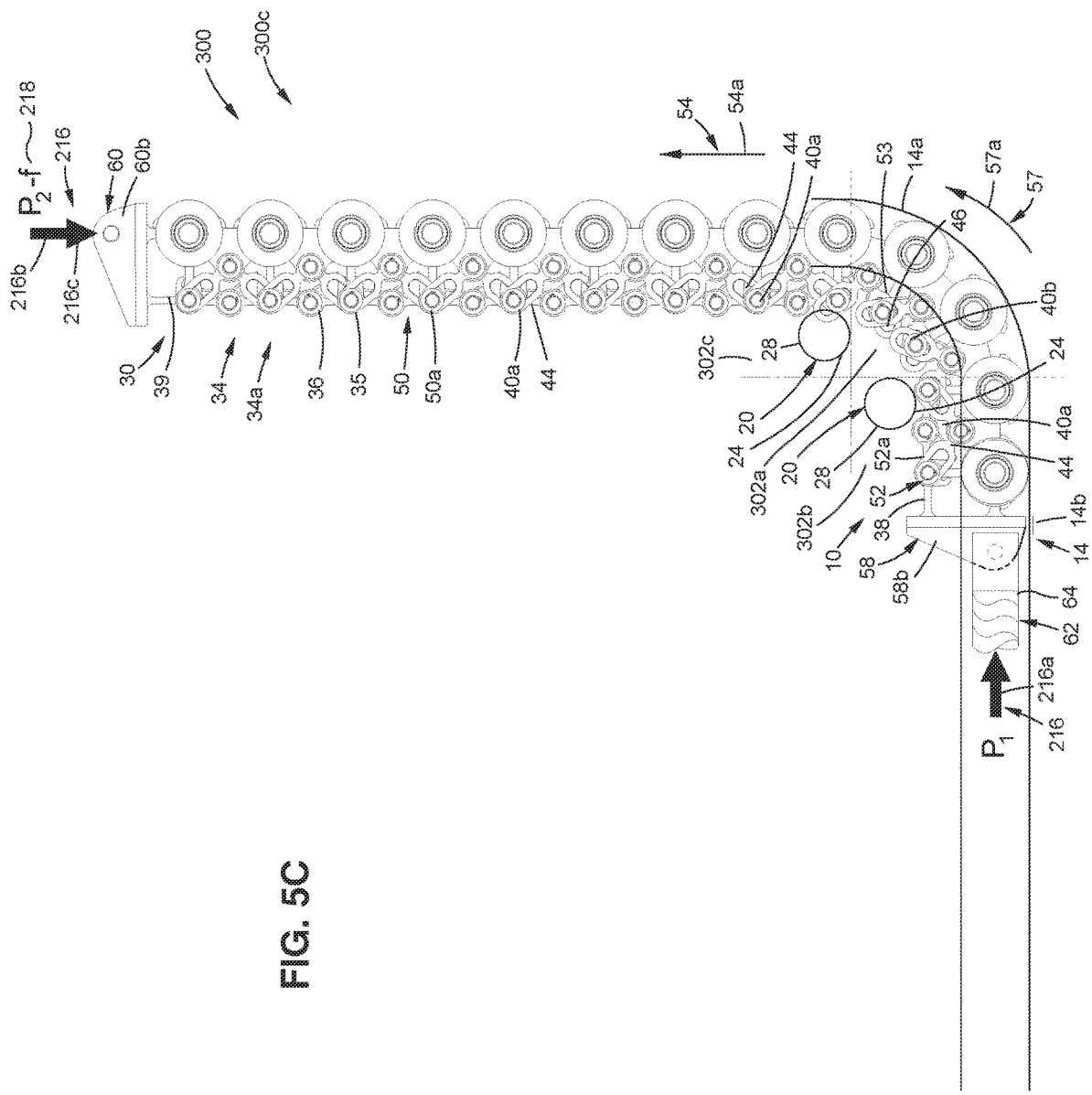
FIG. 5C is an illustration of a front view of the extendable compression chain system of FIG. 5A, where the extendable compression chain assembly is in a fully extended position.
Figure 5D:
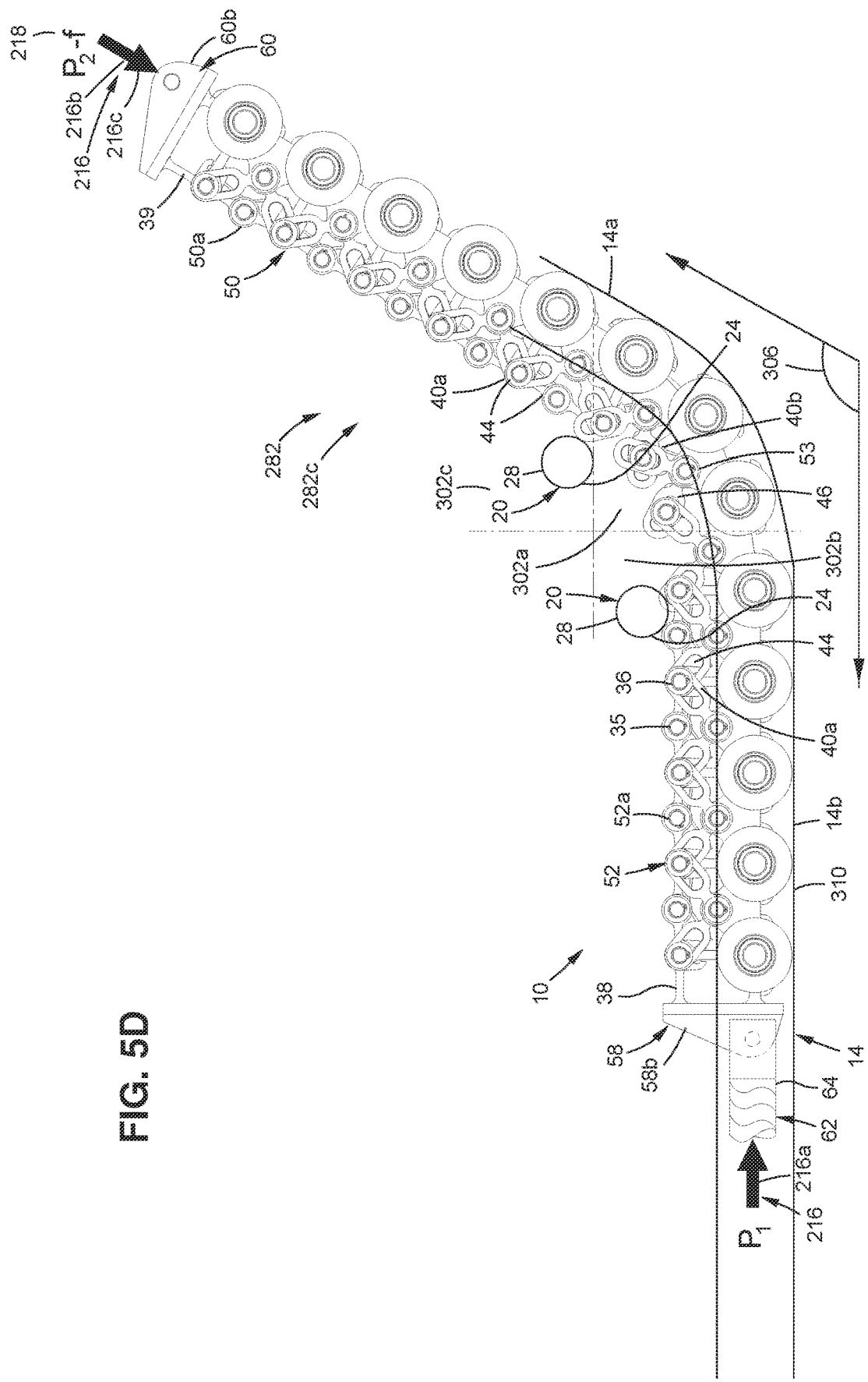
FIG. 5D is an illustration of a front view of the extendable compression chain system of FIG. 5B, where the extendable compression chain assembly is in the intermediate extended position and angled at an obtuse angle.
Figures 5E, 5F:
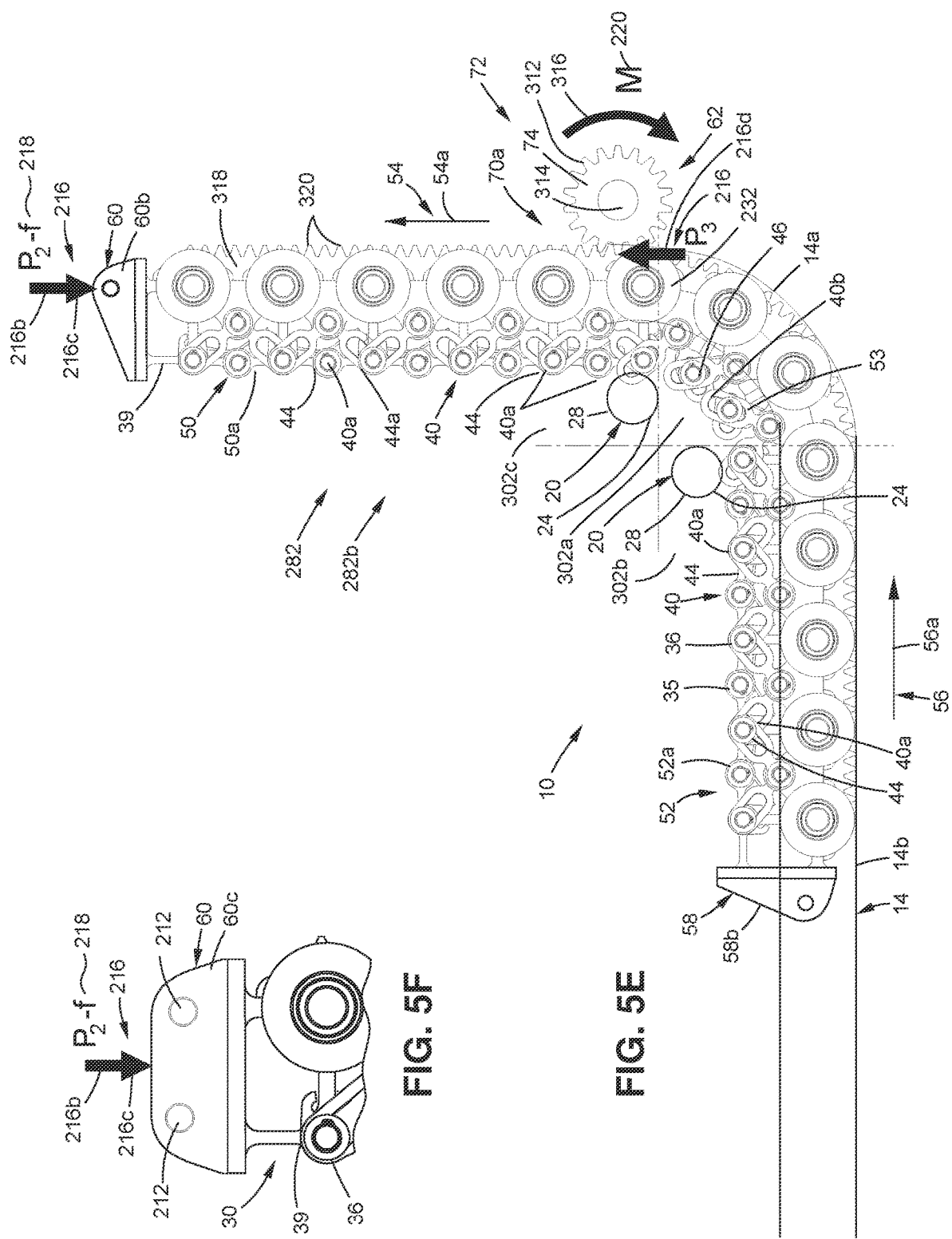
FIG. 5E is an illustration of a front view of another version of an extendable compression chain system with a gear-driven actuation mechanism, where the extendable compression chain assembly is in the intermediate extended position.
FIG. 5F is an illustration of another version of a structure interface end fitting of the extendable compression chain assembly.

In another version, as shown in FIG. 5E, and discussed in further detail below, the actuation mechanism 62 comprises the gear-driven actuation mechanism 72 comprising the gear mechanism 74 and a rack 318 (see FIG. 5E) coupled to the first portion 50, for example, the vertical portion 50a, of the compression chain structure 36, to cause the first portion movement 54, such as the vertical movement 54a, or vertical upward movement, of the first portion 50, for example, the vertical portion 50a, of the compression chain structure 36. In one version, the gear mechanism 74 and the rack 318 comprises a rack-and-pinion system 70a (see FIG. 5E). As shown in FIG. 5E, the first portion movement 54, such as the vertical movement 54a, or vertical upward movement, of the first portion 50, for example, the vertical portion 50a, of the compression chain structure 36, is driven by the gear mechanism 74. As shown in FIG. 5E, a moment (M) 220 applied at the spindle 314 applies an upward load ($P_3$) 216d through the gear mechanism 74, or pinion gear, onto the rack 318.

As shown in FIG. 2A, the extendable compression chain system 10 further comprise the mechanical power apparatus 76 coupled to the actuation mechanism 62, to power the actuation mechanism 62 to move, actuate, or drive the extendable compression chain assembly 30. As shown in FIG. 2A, the mechanical power apparatus 76 comprises a motor 78. The mechanical power apparatus 76, such as the motor 78, may comprise an electric motor powered by electricity, a battery operated motor powered by a battery, a pneumatic operated motor powered by a pneumatic system, or another suitable type of mechanical power apparatus powered by a power source. The mechanical power apparatus 76 may further comprises a hydraulic actuated mechanical power apparatus.

As shown in FIGS. 2A-2C, the extendable compression chain assembly 30 of the extendable compression chain system 10 comprises the compression chain 35 with the compression chain structure 36 comprising the modules 40 in the series configuration 42 (see FIGS. 2B-2C). The modules 40 include one or more rigid modules 40a (see FIGS. 2A-2B, 7A) and one or more non-rigid modules 40b (see FIGS. 2B, 7D), or collapsed modules.

Figure 3A:
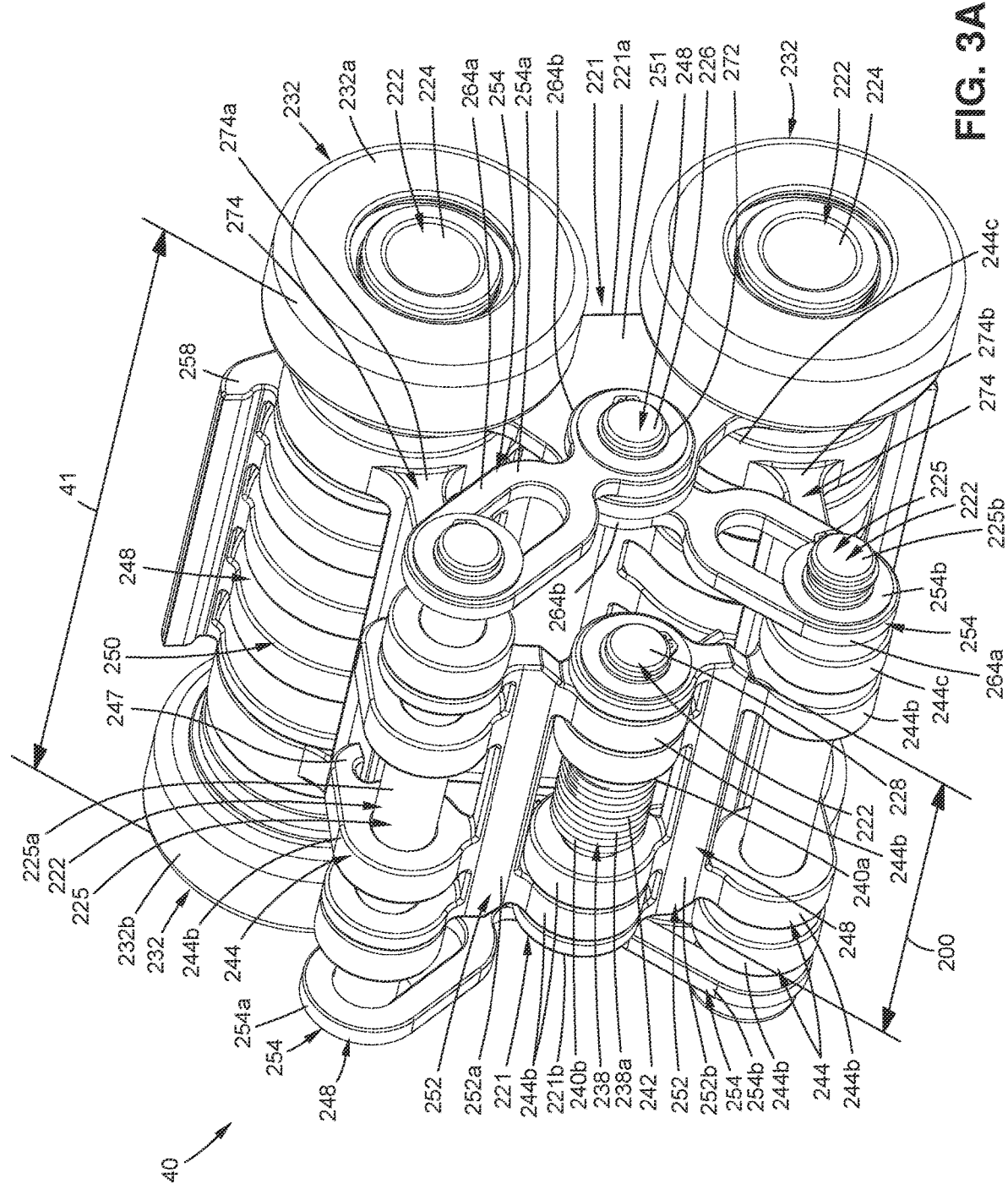
FIG. 3A is an illustration of a front right side perspective view of a module of the extendable compression chain assembly of FIG. 2B.
Figure 3B:
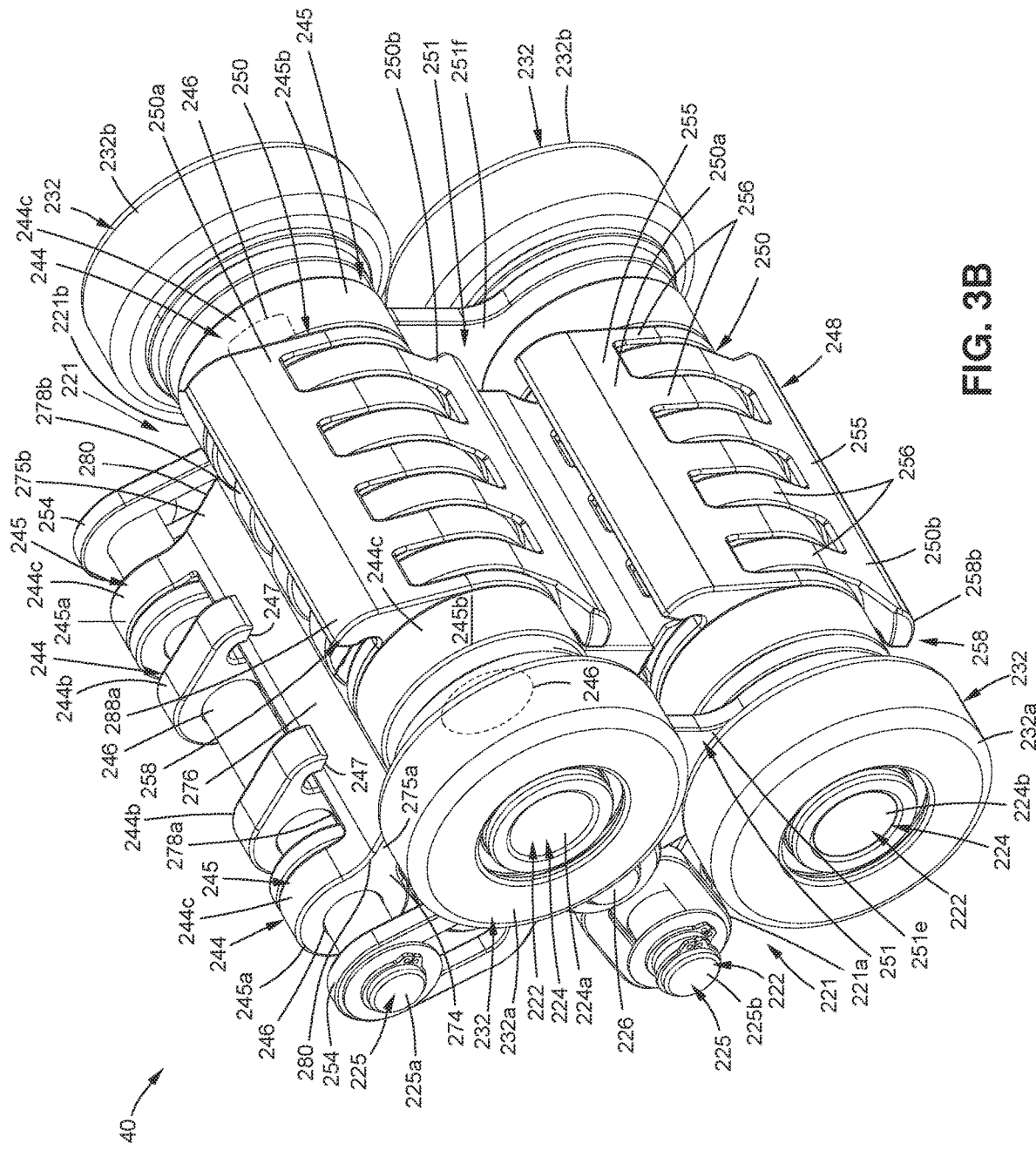
FIG. 3B is an illustration of a front left side perspective view of the module of FIG. 3A.
Figure 3C:
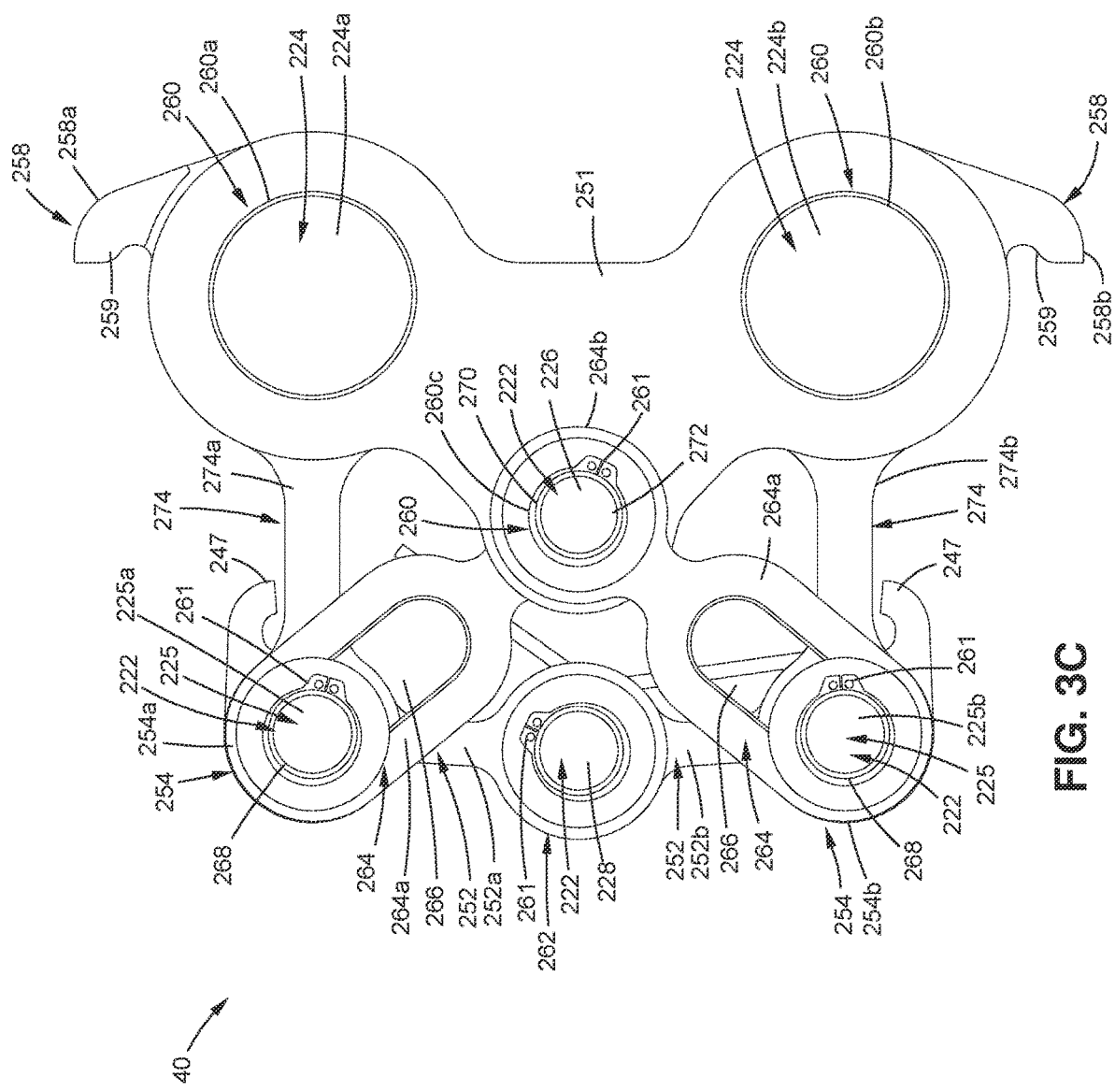
FIG. 3C is an illustration of a front view of the module of FIG. 3A, with roller wheels removed.

FIGS. 3A-3C show an individual module 40. FIG. 3A is an illustration of a front right side perspective view of the module 40, of the compression chain assembly 30 of FIG. 2B. FIG. 3B is an illustration of a front left side perspective view of the module 40 of FIG. 3A. FIG. 3C is an illustration of a front view of the module 40 of FIG. 3A, with roller wheels 232 removed. As shown in FIGS. 3A-3B, the module 40 has ends 221, including a first end 221a and a second end 221b, where the first end 221a is a mirror image of the second end 221b.

As shown in FIGS. 2B-2C, the compression chain structure 36 of the compression chain 35 comprises a plurality of pins 222 comprising outer pins 224, inner pins 225, center pins 226, and articulated edge pins 228. As further shown in FIGS. 2B-2C, 3A-3B, each module 40 of the plurality of modules 40 comprises a plurality of pins 222 comprising a pair of outer pins 224 or two outer pins 224, a pair of inner pins 225 (see FIGS. 3A, 3C) or two inner pins 225, a pair of center pins 226 (see FIGS. 3A, 3C) or two center pins 226 where one center pin 226 is located at each end 221 of the module 40, and an articulated edge pin 228 or one articulated edge pin 228. As shown in FIG. 3A, the outer pins 224, the inner pins 225, and the articulated edge pins 228 extend radially across either a portion of, or substantially all of, a width 41 of the module 40. As shown in FIG. 3A, the inner pins 225, such as a first inner pin 225a and a second inner pin 225b, are parallel to each other in a spaced apart configuration and are positioned on opposite sides of the articulated edge pin 228.

As further shown in FIGS. 3A, 3C, the center pin 226 is aligned below the articulated edge pin 228 and positioned below and between the inner pins 225. As shown in FIG. 2G, the center pins 226, such as a first center pin 226a and a second center pin 226b, are aligned with each other on opposite ends 221 of the module 40. As shown in FIG. 2G, the center pins 226 are short pins that are positioned at each end 221 of the module 40 and do not extend radially across the width 41 (see FIG. 3A) of the module 40. As shown in FIG. 2A, in the second portion 52, such as the horizontal portion 52a, the outer pins 224 extend radially across the base structure 16 between the rails 18, and the length of each outer pin 224 is slightly less than the width 189 of the base plate 192 of the track assembly 14. The pins 222, including the outer pins 224, the inner pins 225, the center pins 226, and the articulated edge pins 228 may be made of a sturdy and strong metal material such as steel, stainless steel, aluminum, or another sturdy and strong metal material, or may be made of a sturdy and strong composite material, a sturdy and strong polymeric material, or another suitably sturdy and strong material.

As shown in FIGS. 2A-2C, the compression chain structure 36 of the compression chain 35 further comprises a plurality of rollers wheels 232 coupled to the outer pins 224. As shown in FIGS. 2C, 3A-3B, each outer pin 224 functions as an axle between two roller wheels 232, such as a first roller wheel 232a and a second roller wheel 232b, and each outer pin 224 is inserted through, and coupled to, two roller wheels 232. As further shown in FIGS. 2A-2C, 3A-3B, each module 40 of the plurality of modules 40 comprises two pairs of roller wheels 232 or four roller wheels 232, coupled to the pair of outer pins 224 or two outer pins 224. As shown in FIG. 2C, each roller wheel 232 comprises a cylindrical body 231 with a central through hole 233 configured to receive a bearing 234 (see FIG. 2E) and the outer pin 224. As shown in FIG. 2E, the bearing 234 is positioned adjacent to a spacer element 235, and the roller wheel 232 has been removed for clarity to show the bearing 234 and the spacer element 235. The spacer element 235 may be in the form of a gasket, an O-ring, a thin collar, or another suitable spacer element structure. The spacer element 235 facilitates positioning of each roller wheel 232 in the correct location against each side link 251 (see FIGS. 2E, 3C) of the compression chain structure 36. As shown in FIG. 2E, the spacer element 235 is positioned between an end of the bearing 234 and a side link 251.

As further shown in FIG. 2C, a first roller wheel 232a is coupled to a first end 236a of a first outer pin 224a, and a second roller wheel 232b is coupled to a second end 236b of the first outer pin 224a. The roller wheels 232 may be made of a sturdy and strong metal material such as steel, stainless steel, aluminum, or another sturdy and strong metal material, or may be made of a sturdy and strong composite material, a sturdy and strong polymeric material, or another suitably sturdy and strong material. The roller wheels 232 may also comprise rubber-coated roller wheels, if it is desired that the roller wheels 232 are quiet and not make noise, or only make a minimal amount of noise, when they move or roll.

As shown in FIG. 2A, roller wheels 232 of the second portion 52, such as the horizontal portion 52a, of the compression chain structure 36, interface with the rails 18 of the track assembly 14 and allow the compression chain structure 36 to travel, or move, along the rails 18 of the track assembly 14, when the first end 38, such as the actuation end 38a, is actuated, or driven, by the actuation mechanism 62. The roller wheels 232 and outer pins 224 provide support to the other components of the compression chain structure 36.

As shown in FIGS. 2A-2C, the compression chain structure 36 of the compression chain 35 may further comprise a plurality of springs 238 coupled to the articulated edge pins 228. As further shown in FIGS. 2A-2C, 3A, each module 40 of the plurality of modules 40 comprises a spring 238, such as one spring 238, coupled to, and around, a portion of the articulated edge pin 228, such as one articulated edge pin 228. As shown in FIG. 3A, the spring 238 is fitted to, and around, the portion of the articulated edge pin 228. As further shown in FIG. 3A, the spring 238 is coupled to inner links 252, such as an upper inner link 252a and a lower inner link 252b, via lugs 244, such as second lugs 244b, of the inner links 252, to provide a moment (M) 220 (see FIG. 5E) that tends to move the articulated edge pin 228 away from a center 262 (see FIG. 3C) of the module 40, and into an over-center position 292 (see FIG. 4A). The spring 238 provides a spring force to change an angle between arm members 274 (see FIG. 3C) and inner links 252 (see FIG. 3C), and the inner links 252 with each other.

As shown in FIG. 3A, the spring 238 preferably comprises a torsional spring 238a. As shown in FIG. 3A, the spring 238, such as the torsional spring 238a, has a first end 240a, a second end 240b, and a spring body 242 formed between the first end 240a and the second end 240b. In other versions, the spring 238 comprises one of, a coil spring, a tension spring, a compression spring, a beam spring, a cantilever spring, a leaf spring, or another suitable type of spring. One skilled in the art may use one or more of these springs or may choose to use another suitable type of spring. In another version, for example, an extensional spring between the outer pins 224 and the articulated edge pins 228 may be used to keep the articulated edge pins 228 in a locked position, so that the module 40 is in rigid position 44, such as a locked position 44a (see FIG. 2C), and can take a compression load 216c (see FIG. 5C). The spring 238 may be made of a spring steel material, stainless steel, aluminum, or another flexible metal material. Alternatively, a rod, or other elongated member, made of a stiff composite material may also be used to perform the spring function.

The spring 238 is optional, and in another version, the spring 238 is not present. In this version, diagonal links 254, such as shown in FIG. 3A, may be modified and machined to be a shorter length, so that they go into tension 128 (see FIG. 1), as the articulated edge pins 228 move away from the center 262 (see FIG. 3C) of the module 40, and into an over-center position 292 (see FIG. 4A). Thus, the modified diagonal links function similar to a stiff spring.

As shown in FIGS. 2A-2C, the compression chain structure 36 of the compression chain 35 further comprise a plurality of lugs 244 coupled to one or more of the plurality of pins 222, including the outer pins 224, the inner pins 225, and the articulated edge pins 228. As further shown in FIGS. 2A-2C, 3A, each module 40 of the plurality of modules 40 comprises the plurality of lugs 244 coupled to the plurality of pins 222, including two outer pins 224, two inner pins 225, and one articulated end pin 228. As used herein, "lug" means a fitting connection between two components of the compression chain structure 36 that serves to support and facilitate movement of components of the compression chain structure 36. Further, the lug 244 is a material of one part surrounding a hole or opening into which a pin 222 is inserted, so that loads can be transferred from the pin 222 to the lug 244. The plurality of lugs 244 may be made of a sturdy and strong metal material such as steel, stainless steel, aluminum, or another sturdy and strong metal material, or may be made of a sturdy and strong composite material, a sturdy and strong polymeric material, or another suitably sturdy and strong material.

As shown in FIG. 2C, for each module 40, the lugs 244 comprise first lugs 244a, such as in the form of second end attachment portions 208b, of the actuation end fitting 58 and the structure interface end fitting 60, coupled to the inner pins 225. As shown in FIGS. 2C, 3A, for each module 40, the lugs 244 further comprise second lugs 244b of inner links 252 coupled to inner pins 225, and coupled to arm members 274. As shown in FIGS. 2C, 3A-3B, for each module 40, the lugs 244 further comprise third lugs 244c of arm members 274 coupled to an outer pin 224 and coupled to an inner pin 225. Each of the lugs 244 comprises a curved fitting portion 245 (see FIG. 3B) with an opening 246 (see FIG. 3B) configured to receive, and receiving, one of the pins 222. As shown in FIG. 3B, some of the lugs 244, for example, the second lug 244b of the inner link 252, has a hook portion 247 (see also FIGS. 2K, 3A, 3C) for hooking to, or attaching to, the arm member 274.

As shown in FIGS. 2A-2C, the compression chain structure 36 of the compression chain 35 further comprises a plurality of links 248 coupled to the plurality of pins 222, including the outer pins 224, the inner pins 225, the center pins 226, and the articulated edge pins 228. As further shown in FIGS. 2A-2C, 3A, each module 40 of the plurality of modules 40 comprises the plurality of links 248 coupled to the plurality of pins 222. The plurality of links 248 comprise outer links 250 (see FIGS. 2C, 2G, 2H, 3B), side links 251 (see FIGS. 2B, 2D, 3B, 3C), inner links 252 (see FIGS. 2C, 2E, 3A), including upper inner links 252a (see FIGS. 2C, 2E, 3A) and lower inner links 252b (see FIGS. 2C, 2E, 3A), and diagonal links 254 (see FIGS. 2A, 2D, 3A, 3B, 3C).

As shown in FIG. 3B, each module 40 comprises two outer links 250 configured to receive, and receiving, the outer pins 224. As shown in FIG. 3B, each outer link 250 comprises an outer link first portion 250a and an outer link second portion 250b. As shown in FIG. 3B, the outer link first portion 250a interlinks with the outer link second portion 250b for each outer link 250. Each of the outer link first portion 250a and the outer link second portion 250b comprises a spine portion 255 (see FIG. 3B) with integral loop portions 256 (see FIG. 3B) extending from the spine portion 255. Each integral loop portion 256 (see FIG. 3B) has an opening (not shown) configured to receive the outer pin 224 (see FIG. 3B). As shown in FIG. 2J, the outer link first portion 250a of the outer link 250 has the spine portion 255 and three integral loop portions 256, and the outer link second portion 250b of the outer link 250 has the spine portion 255 and four integral hook portions 256. As shown in FIG. 2J, the integral loop portions 256 of the outer link first portion 250a interlink together with the integral loop portions 256 of the outer link second portions 256 in an interlinking configuration 257, or interlocking configuration. As shown in FIG. 3B, each module 40 comprises two side links 251, including a first side link 251e and a second side link 251f.

As shown in FIGS. 2C, 2G, 2H, the outer links 250 are connected together by the outer pins 224, and form a continuous surface, such as a continuous bottom surface. The outer links 250 carry the primary compression load 216c (see FIG. 5C). The outer pins 224 connect the outer links 250 between adjacent modules 40, and transfer axial load in the outer links 250 from one outer link 250 to the next outer link 250 in the adjacent modules 40, for example, a first adjacent module 40d (see FIG. 2D) and a second adjacent module 40e (see FIG. 2D).

As shown in FIGS. 2D, 2J, 3A-3C, the compression chain structure 36 of the compression chain 35 may further comprise a plurality of rotational stops 258 formed on, or coupled to, the outer links 250. The rotational stops 258 are optional features. Inclusion of the rotational stops 258 provides for additional rotational restraint to the geometry of the module 40 and to the compression chain structure 36.

As shown in FIGS. 3B-3C, each module 40 comprises a pair of rotational stops 258 or two rotational stops 258, formed on, coupled to, or integral with, each pair of the outer links 250 (see FIG. 3A-3B). As shown in FIGS. 3B, 3C, the rotational stops 258 comprise a first rotational stop 258a and a second rotational stop 258b. As shown in FIG. 3B, the first rotational stop 258a extends outwardly from, and is integral with, the spine portion 255 of the outer link first portion 250a, and the first rotational stop 258a extends from one side of the spine portion 255 and the integral loop portions 256 extend from the other side of the spine portion 255 opposite the first rotational stop 258a. As further shown in FIG. 3B, the second rotational stop 258b extends outwardly from, and is integral with, the spine portion 255 of the outer link second portion 250b, and the second rotational stop 258b extends from one side of the spine portion 255 and the integral loop portions 256 extend from the other side of the spine portion 255 opposite the second rotational stop 258b. As shown in FIG. 3C, each of the rotational stops 258 has a hook end 259 with a hook-shaped profile. As shown in FIG. 3C, the rotational stops 258 are aligned opposite each other and the hook ends 259 extend away from, and opposite to, each other.

As shown in FIG. 3B, each module 40 comprises two side links 251 configured to receive, and receiving, the two outer pins 224 that extend across the width 41 (see FIG. 3A) of the module 40, and the two center pins 226 at each end 221 (see FIG. 3A) of the module 40. As shown in FIG. 3C, the side link 251 comprises a plurality of through holes 260, including a first through hole 260a, a second through hole 260b, and a third through hole 260c. In an individual module 40, the first through hole 260a is configured to receive, and receives, a first outer pin 224*a* (see FIGS. 3B, 3C), and the second through hole 260*b* is configured to receive, and receives, a second outer pin 224*b* (see FIGS. 3B, 3C). Each module 40 (see FIG. 2B) is configured to overlap with one adjacent module 40, if positioned at the first end 38 (see FIG. 2B) or the second end 39 (see FIG. 2B) end of the compression chain structure 36. Each module 40 (see FIG. 2B) is configured to overlap with two adjacent modules 40, if positioned at a non-end position 43 (see FIGS. 2B, 2D), a middle position, or another position along the compression chain structure 36 other than at the first end 38 or the second end 39. In one exemplary version, as shown in FIG. 2D, a middle module 40*c* is positioned at the non-end position 43, and the first through hole 260*a* (see FIG. 3C) of a side link 251 (see FIGS. 2B, 3C) of the module 40, such as the middle module 40*c*, is configured to overlap with a second through hole 260*b* (see FIG. 3C) of a first adjacent side link 251*b* of a first adjacent module 40*d*, and the second through hole 260*b* (see FIG. 3C) of the side link 251 of the middle module 40*c*, is configured to overlap with a first through hole 260*a* of a second adjacent side link 251*c* of a second adjacent module 40*e*. In the exemplary version, the middle module 40*c* is positioned in front of, or exterior, to the first adjacent module 40*d* (see FIG. 2D) and to the second adjacent module 40*e*.

As shown in FIG. 2D, the plurality of side links 251 are joined together in an overlapping series with the outer pins 224, along the length of the compression chain structure 36, to form a continuous side link 251*a* on each side of the compression chain structure 36. With the continuous side link 251*a* (see FIG. 2D), there are a series of modules 40 in a front position, or exterior position, and a series of first adjacent modules 40*d* and second adjacent modules 40*e*, attached on one or either side of each of the series of modules 40, via the outer pins 224 and the center pins 226, that are in a back position, or interior position, relative to the modules 40.

As shown in FIG. 3C, the third through hole 260*b* in the side link 251 is configured to receive, and receives, the center pin 226. As shown in FIG. 3C, a snap ring 261 is coupled to the center pin 226 at the third through hole 260*c*, to secure the center pin 226 to the third through hole 260*c*, so that the center pin 226 does not fall out or release from the third through hole 260*c*. As further shown in FIG. 3C, a snap ring 261 is coupled to the inner pins 225 and the articulated edge pin 228, to secure the inner pins 225 and the articulated edge pin 228, so that the inner pins 225 and the articulated edge pin 228 do not fall out or release from their positions. The snap ring 261 is an optional feature, and other suitable devices may be used to secure the center pin 226, the inner pins 225, and the articulated edge pin 228.

As shown in FIGS. 3A, 3C, the module 40 comprises one upper inner link 252*a* and one lower inner link 252*b*. As shown in FIGS. 3A, 3C, the upper inner link 252*a* is coupled between a first inner pin 225*a* and the articulated edge pin 228, and the lower inner link 252*b* is coupled between the articulated edge pin 228 and a second inner pin 225*b*. The articulated edge pin 228 connects the upper inner link 252*a* and the lower inner link 252*b* at the center 262 (see FIG. 3C) of the module 40. The articulated edge pin 228 allows the upper inner link 252*a* and the lower inner link 252*b* to rotate, such that the articulated edge pin 228 moves towards the center 262 (see FIG. 3C) of the module 40. The upper inner link 252*a* and the lower inner link 252*b* are functionally mirror images of each other. Together, the upper inner link 252*a* and the lower inner link 252*b* carry axial load, when the module 40 is in the rigid position 44 (see FIG. 2C). As shown in FIG. 2B, the inner links 252 alternate between the upper inner link 252*a* and the lower inner link 252*b*. As shown in FIG. 2B, the upper inner link 252*a* is on the side of the articulated edge pin 228 and on the side of the center pin 226 closer to the structural interface end fitting 60, and the lower inner link 252*b* is on the side of the articulated edge pin 228 and on the side of the center pin 226 closer to the actuation end fitting 58. The inner pins 225 connect the inner links 252 between adjacent modules 40, and transfer the axial load in the inner links 252 from one inner link 252 to the next inner link 252 in the adjacent modules 40. The inner links 252 (see FIG. 2B) comprise collapsible inner links 252*c* (see FIG. 2B) to prevent buckling.

As shown in FIG. 3A, the upper inner link 252*a* includes second lugs 244*b* coupled, or attached, to the inner pin 225, such as the first inner pin 225*a*, and second lugs 244*b* coupled, or attached, to the articulated edge pin 228 with the spring 238 positioned between the second lugs 244*b*. As further shown in FIG. 3A, the lower inner link 252*b* includes second lugs 244*b* coupled, or attached, to the inner pin 225, such as the second inner pin 225*b*, and second lugs 244*b* coupled, or attached, to the articulated edge pin 228 with the spring 238 positioned between the second lugs 244*b*. The second lugs 244*b* are configured to join the inner links 252 to the inner pins 225 and the articulated edge pin 228.

As shown in FIG. 3A, the module 40 comprises two pairs of diagonal links 254, with one pair of diagonal links 254 at the first end 221*a* of the module 40 and one pair of diagonal links 254 at the second end 221*b* of the module 40. As shown in FIGS. 3A, 3C, the pair of diagonal links 254 includes a first diagonal link 254*a* and a second diagonal link 254*b*, each positioned diagonally with respect to each other and angled with respect to each other. As shown in FIG. 3C, each diagonal link 254, such as the first diagonal link 254*a* and the second diagonal link 254*b*, has a body 264 with a first body portion 264*a* and a second body portion 264*b* (see also FIG. 3A). As shown in FIG. 3C, the first body portion 264*a* of each diagonal link 254 has a slot opening 266 configured to receive, and receiving, an end portion 268 of each inner pin 225, such as the first inner pin 225*a*. The end portions 268 of the inner pins 225 are configured to move up and down the lengths of the slot openings 266, when the module 40 moves between the rigid position 44 (see FIG. 7A) and the collapsed position 46 (see FIG. 7D). As the module 40 moves, or wraps, around the curved guide assembly 20, for example, the curved surface 24 (see FIG. 2A) of each curved guide member 22 (see FIG. 2A), the curved guide assembly 20 pushes the inner links 252 (see FIGS. 2A, 3A) inward, causing the articulated edge pin 228 (see FIG. 3A) to move inward to an over-center reversed position 296 (see FIG. 4D), and causing the inner pins 225 to move along the slot openings 266, allowing the module 40 to collapse into approximately a trapezoid shape 298 (see FIG. 4E). As the module 40 (see FIGS. 2A, 3A) moves past the curved guide assembly 20, for example, past the curved surface 24 (see FIG. 2A) of each curved guide member 22 (see FIG. 2A) of the curved guide assembly 20, the spring 238 (see FIGS. 2A, 3A), such as the torsional spring 238*a* (see FIGS. 2A, 3A), on the articulated edge pin 228, pops the inner links 252 back out, and the module 40 becomes rigid again in the rigid position 44, and can take compression load 216*c* (see FIG. 4A). The slot openings 266 of the diagonal links 254 allow the inner pins 225 (see FIG. 3A) to move diagonally downward from the top of the slot opening 266 to the bottom of the slot opening 266, and along the interior of the slot opening 266, when the modules 40 move from the rigid position 44 (see FIG. 2A) to the collapsed position 46 (see FIG. 2A). As the modules 40 move, or wrap, around the curved guide assembly 20, for example, around the curved surface 24 of each curved guide member 22 of the curved guide assembly 20, the inner pins 225 need to be able to move along the slot openings 266.

As further shown in FIG. 3C, the second body portion 264*b* of each diagonal link 254 has a circular opening 270 configured to receive, and receiving, an end 272 of the center pin 226. The circular opening 270 of each of the second body portions 264*b* of the first diagonal link 254*a* and the second diagonal link 254*b* is configured to snugly fit around the diameter of the center pin 226 to fix the center pin 226 in the circular opening 270 of the second body portions 264*b*. The plurality of links 248 including the outer links 250, the inner links 252, and diagonal links 254 may be made of a sturdy and strong metal material such as steel, stainless steel, aluminum, or another sturdy and strong metal material, or may be made of a sturdy and strong composite material, a sturdy and strong polymeric material, or another suitably sturdy and strong material.

As shown in FIGS. 2B-2C, the compression chain structure 36 of the compression chain 35 further comprises a plurality of arm members 274 coupled to one or more of the plurality of links 248. As further shown in FIGS. 3A, 3C, the module 40 comprises a pair of arm members 274 or two arm members 274, such as a first arm member 274*a* (see FIGS. 3A, 3C) and a second arm member 274*b* (see FIGS. 3A, 3C), coupled to one or more of the plurality of links 248. As shown in FIG. 3A, the arm members 274 connect the outer links 250 to the inner links 252 by means of the outer pins 224 and the inner pins 225, and the arm members 274 connect the diagonal links 254 together in a diagonal direction.

As shown in FIG. 3B, each arm member 274 has a first end 275*a*, a second end 275*b*, and an elongated body 276 formed between the first end 275*a* and the second end 275*b*. The elongated body 276 has a top surface 278*a* (see FIG. 3B), a bottom surface 278*b* (see FIG. 3B), and sides 280 (see FIG. 3B). As shown in FIG. 3B, the arm member 274 further has two third lugs 244*c*, such as in the form of two curved fitting portions 245, such as two curved fitting portions 245*a*, each with an opening 246 configured to receive the inner pin 225. The two third lugs 244*c*, such as the two curved fitting portions 245*a*, extend from the top surface 278*a* of the elongated body 276 at the first end 275*a* and at the second end 275*b* respectively, and are coupled, or attached, to the inner pin 225. As shown in FIG. 3B, the top surface 278*a* of the arm member 274 is positioned under, and in proximity to, the inner pin 225. FIG. 3B shows the arm member 274 having two third lugs 244*c*, such as the two curved fitting portions 245*a* extending from the top surface 278*a*. However, each arm member 274 may have three, four, five, or more curved fitting portions 245*a*. As shown in FIG. 3B, the third lugs 244*c*, such as the curved fitting portions 245*a*, are positioned next to second lugs 244*b* of the upper inner link 252*a* (see FIG. 3A), which are also coupled, or attached, to the inner pin 225. As shown in FIG. 3B, the hook portions 247 (see also FIG. 2K) of the second lugs 244*b* (see also FIG. 2K) are hooked to, or attached to, the arm member 274.

As shown in FIG. 3B, the arm member 274 further has two third lugs 244*c*, such as in the form of two curved fitting portions 245*b* each with an opening 246 configured to receive the outer pin 224, extending from the bottom surface 278*b* of the elongated body 276 at the first end 275*a* and at the second end 275*b* respectively, and are coupled, or attached, to the outer pin 224. The curved fitting portions 245*b* extending from the bottom surface 278*b* are larger in size and diameter than the curved fitting portions 245*a* extending from the top surface 278*a*. As shown in FIG. 3B, the bottom surface 278*b* of the arm member 274 is positioned above, and in proximity to, the outer link 250 which is also coupled to the outer pin 224. FIG. 3B shows the arm member 274 having two third lugs 244*c*, such as the two curved fitting portions 245*b* extending from the bottom surface 278*b*. However, each arm member 274 may have three, four, or more curved fitting portions 245*b*, depending on the size of the curved fitting portions 245*b* and the size of the outer link 250. As shown in FIG. 3B, the third lugs 244*c*, such as the curved fitting portions 245*b*, and are positioned adjacent to the outer link 250, including the outer link first portion 250*a* and the outer link second portion 250*b*, which are also coupled, or attached, to the outer pin 224.

As shown in FIG. 3C, the center pin 226 and the articulated edge pin 228 are positioned between, and extend parallel to the arm members 274. The arm members 274 may be in the form of supports, braces, or other suitable structural arm members. As shown in FIG. 3B, the arm members 274 connect the outer links 250 to the inner links 252 by means of the outer pins 224 and the inner pins 225. The arm members 274 may be made of a sturdy and strong metal material such as steel, stainless steel, aluminum, or another sturdy and strong metal material, or may be made of a sturdy and strong composite material, a sturdy and strong polymeric material, or another suitably sturdy and strong material.

As shown in FIGS. 2A-2D, the modules 40 are connected together by common elements, such as the arm members 274, the inner pins 225, and the outer pins 224, which are shared by two adjacent modules 40. FIG. 2A shows the extendable compression chain assembly 30 in an intermediate extended position 282, such as intermediate extended position 282*a*. As shown in FIGS. 2A, 2C, the plurality of links 248 are connected to the plurality of pins 222, the springs 238 hold the modules 40 in their rigid position 44, the curved guide assembly 20 (see FIG. 2A) collapses the module 40, such as the non-rigid module 40*b*, for example, the collapsed module, and the diagonal links 254 provide shear stiffness to a beam-column comprised of the first portion 50 of the compression chain 35. FIG. 2D further shows the actuation end fitting 58, or drive end fitting, such as the actuation end fitting 58*a*, and the structure interface end fitting 60, such as the structure interface end fitting 60*b*.

FIGS. 2E-2F show the compression chain structure 36 of the compression chain 35, the actuation end fitting 58, and the structure interface end fitting 60 of the extendable compression chain assembly 30. FIGS. 2E-2F further show the outer pins 224, the inner pins 225, the center pins 226, and the articulated edge pins 228. FIGS. 2E-2F further show the roller wheels 232, the springs 238, the lugs 244, including the first lugs 244*a* (see FIG. 2F), the side links 251 (see FIG. 2E), the inner links 252, and the diagonal links 254.

FIGS. 2G-2H show the compression chain structure 36 of the compression chain 35, the actuation end fitting 58 (see FIG. 2G), and the structure interface end fitting 60 (see FIG. 2H) of the extendable compression chain assembly 30. FIGS. 2G-2H further show the outer pins 224, the center pins 226, the roller wheels 232, the third lugs 244*c*, and the outer links 250, including the outer link first portion 250*a* and the outer link second portion 250*b*.

FIGS. 2I-2K show enlarged first portions 50, for example, vertical portions 50*a*, of the compression chain 35 with the compression chain structure 36 of the extendable compression chain assembly 30, of FIG. 2B. FIGS. 2I-2K show the structure interface end fitting 60, such as the structure interface end fitting 60a, attached to the second end 39, such as the push-pull end 39a, of the compression chain structure 36. FIGS. 2I-2K further show the pins 222, such as the outer pins 224, the inner pins 225, the center pins 226 (see FIGS. 2I, 2K), and the articulated edge pins 228 (see FIGS. 2I, 2K). FIGS. 2I-2K further show the roller wheels 232, the springs 238 (see FIG. 3I), the lugs 244, the arm members 274 (see FIGS. 2I, 2K), and the rotational stops 258. FIGS. 2I-2K further show the links 248, such as the outer links 250 (see FIG. 2J) with the rotational stops 258 (see FIGS. 2J, 2K), the side links 251, the inner links 252 (see FIG. 2I), such as the upper inner links 252a (see FIGS. 2I, 2K) and the lower inner links 252b (see FIGS. 2I, 2K), and the diagonal links 254.

Now referring to FIGS. 4A-4E, FIGS. 4A-4E show various geometric shapes 284 representative of a module 40, as the module 40 changes from a rigid module 40a in a rigid position 44 to a non-rigid module 40b in a collapsed position 46, for example, when the compression chain 35 (see FIG. 2A) with the compression chain structure 36 (see FIG. 2A), moves from the second portion movement 56 (see FIG. 2A), such as the horizontal movement 56a (see FIG. 2A), in the rigid position 44 (see FIG. 2A), to the third portion movement 57 (see FIG. 2A), such as the curved movement 57a (see FIG. 2A), in the collapsed position 46, around the curved portion 14a (see FIG. 2A) of the track assembly 14, or when the compression chain 35 with the compression chain structure 36 retracts from the first portion 50 (see FIG. 2A), such as the vertical portion 50a (see FIG. 2A), in the rigid position 44, to the third portion movement 57 (see FIG. 2A), such as the curved movement 57a (see FIG. 2A), in the collapsed position 46.

Figure 4A:
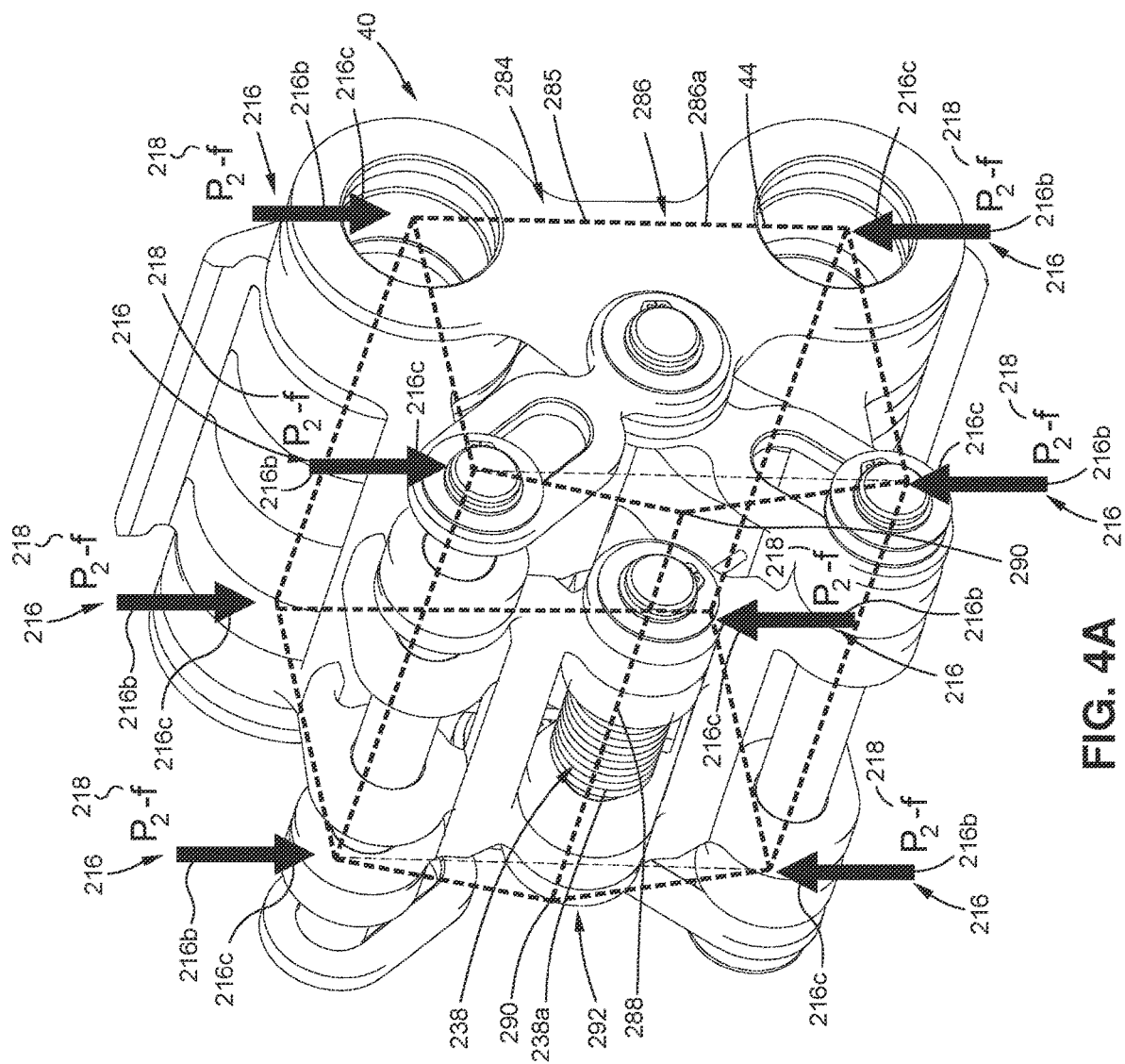
FIG. 4A is an illustration of a front right side perspective view of the module of FIG. 3A, with a schematic diagram showing a geometric shape overlaid over the module, the geometric shape having a joint with points in an over-center position.
Figure 4B:
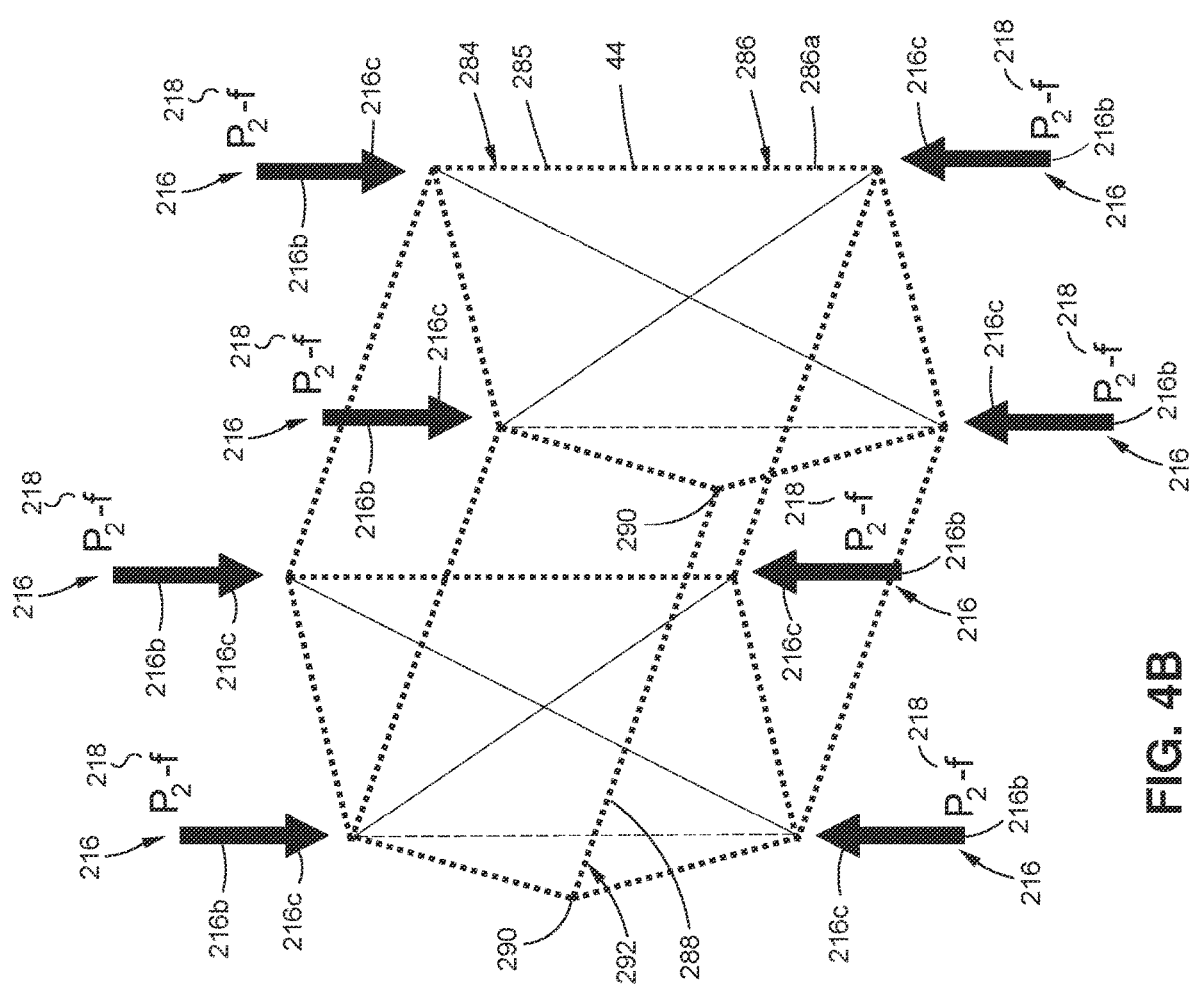
FIG. 4B is an illustration of a front perspective view of the geometric shape of FIG. 4A, having the joint with points in the over-center position, and with the module removed.

FIG. 4A is an illustration of a front right side perspective view of the module 40 of FIG. 3A, with a schematic diagram showing a geometric shape 284 comprising a rectangular prism 285 overlaid over, and representative of, the module 40. FIG. 4B is an illustration of a front perspective view of the geometric shape 284, such as the rectangular prism 285, of FIG. 4A, where the module 40 has been removed for clarity. As shown in FIGS. 4A-4B, the geometric shape 284 comprising the rectangular prism 285 is in the rigid position 44 and carries loads ($P_2$) 216, such as applied loads 216b, for example, compression loads 216c, minus the friction force (f) 218, in a position 286, such as a vertical position 286a. The friction force (f) 218 is the difference between the actuation load 216a ($P_1$) (see FIG. 2A), or actuation force, which is the load or force applied by the end-driven actuation mechanism 64 (see FIG. 2A), minus the applied load 216b ($P_2$) (see FIGS. 4A-4B), which is applied to the first portion 50 (see FIG. 5C), such as the vertical portion 50a (see FIG. 5C), of the compression chain structure 36 (see FIG. 5C) of the compression chain 35 (see FIG. 5C). The friction force (f) 218 (see FIGS. 4A-4B) is caused by the compression chain 35 moving along the track assembly 14 against the curved guide assembly 20. For a well-oiled mechanism, the actuation load 216a and the applied load 216b are substantially similar. As shown in FIGS. 4A-4B, the rectangular prism 285 has a joint 288 with points 290 in an over-center position 292. The joint 288 at points 290 are kept in the over-center position 292 by the spring 238 (see FIG. 4A), such as the torsional spring 238a (see FIG. 4A).

Figure 4C:
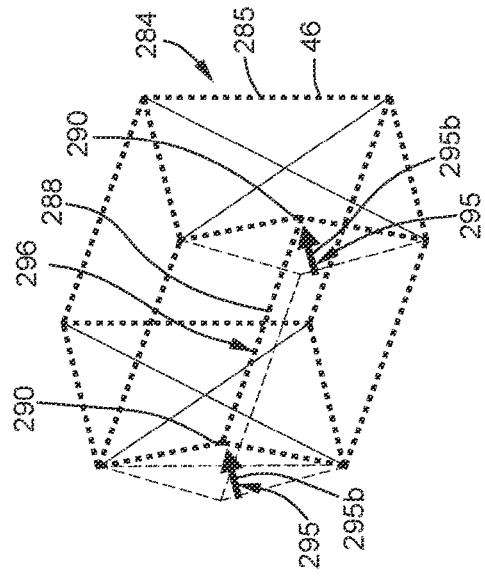
FIG. 4C is an illustration of a front perspective view of the geometric shape of FIG. 4A, changed to the joint with points in a center position.

FIG. 4C is an illustration of a front perspective view of the geometric shape 284 comprising the rectangular prism 285, of FIG. 4A, changed to the joint 288 with points 290 in a centered position 294. The points 290 of the joint 288 are moved by a force 295 (see FIG. 4C), such as a first force 295a, from the over-center position 292 in FIG. 4B to the centered position 294 in FIG. 4C. The rectangular prism 285 is still in the rigid position 44.

Figure 4D:
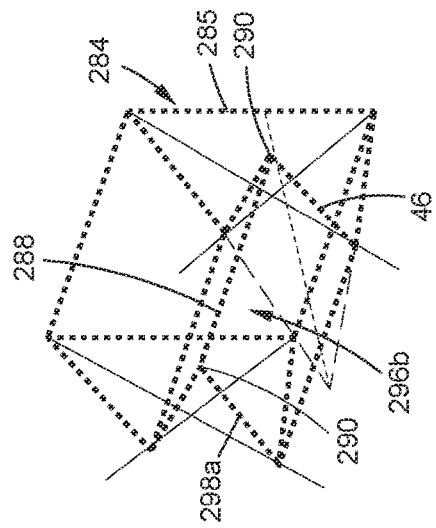
FIG. 4D is an illustration of a front perspective view of the geometric shape of FIG. 4A, changed to the joint with points in over-center reversed position.

FIG. 4D is an illustration of a front perspective view of the geometric shape 284 comprising the rectangular prism 285, of FIG. 4A, changed to the joint 288 with points 290 in an over-center reversed position 296. The points 290 of the joint 288 are moved by a force 295 (see FIG. 4C), such as a second force 295b, from the centered position 294 in FIG. 4C to the over-center reversed position 296 in FIG. 4D. The rectangular prism 285 is now in the collapsed position 46 and is substantially non-rigid. The curved surface 24 (see FIG. 2A) of the curved guide member 22 (see FIG. 2A), such as the guide roller 28 (see FIG. 1), pushes the inner links 252 (see FIGS. 2A, 3A) inward, causing the articulated edge pin 228 to move inward to the over-center reversed position 296. The rectangular prism 285 can no longer take substantial compression load 216c (see FIG. 4B), and the structure of the rectangular prism 285 buckles. As the module 40 (see FIGS. 2A, 4A) moves past the curved guide assembly 20, for example, the curved surface 24 (see FIG. 2A) of each curved guide member 22 (see FIG. 2A) of the curved guide assembly 20, the spring 238 (see FIGS. 2A, 4A), such as the torsional spring 238a (see FIGS. 2A, 4A), on the articulated edge pin 228, pops the inner links 252 back out, and the module 40 becomes rigid again in the rigid position 44 and in the rectangular prism 285 (see FIG. 4B), and the rectangular prism 285 can take compression load 216c (see FIG. 4B).

Figure 4E:
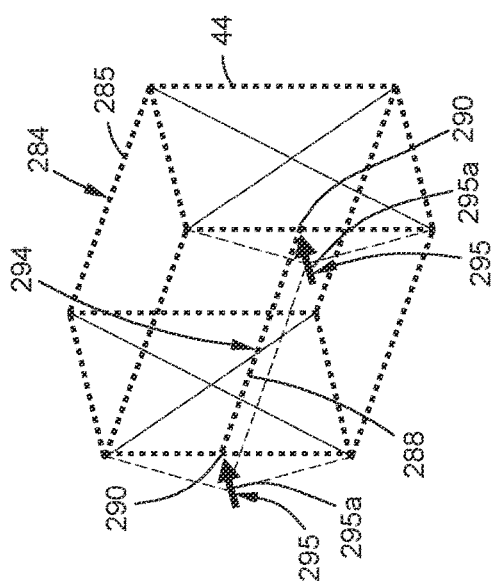
FIG. 4E is an illustration of a front perspective view of the geometric shape of FIG. 4A, changed to a trapezoid shape.

FIG. 4E is an illustration of a front perspective view of the geometric shape 284 comprising the rectangular prism 285 of FIG. 4A, changed to a trapezoid shape 298. The trapezoid shape 298 allows the compression chain 35 (see FIG. 2A) with the compression chain structure 36 (see FIG. 2A) to follow the curved portion 14a (see FIG. 2A) of the track assembly 14 (see FIG. 14). FIG. 4E shows the joint 288 and the points 290 in an over-center reversed position 296a that is more extreme than the over-center reversed position 296 shown in FIG. 2D. The rectangular prism 285 in the trapezoid shape 298 is in the collapsed position 46 and is non-rigid.

Figure 4F:
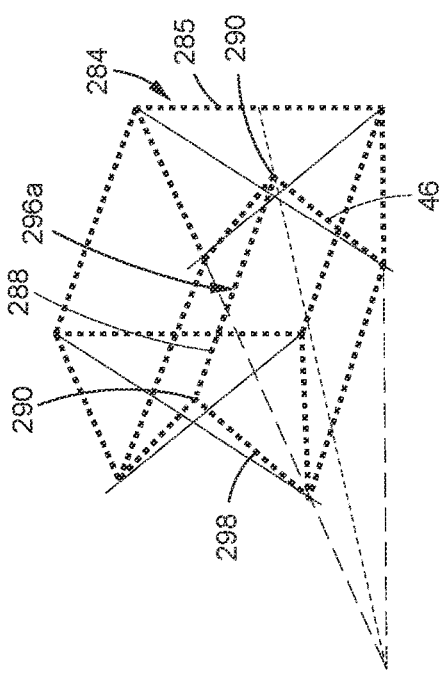
FIG. 4F is an illustration of a front perspective view of the geometric shape of FIG. 4A, changed to a more acute trapezoid shape.

FIG. 4F is an illustration of a front perspective view of the geometric shape 284 comprising the rectangular prism 285 of FIG. 4A, changed to a more acute trapezoid shape 298a. The more acute trapezoid shape 298a allows the compression chain 35 (see FIG. 2A) with the compression chain structure 36 (see FIG. 2A) to follow the curved portion 14a (see FIG. 2A) of the track assembly 14 (see FIG. 2A). FIG. 4F shows the joint 288 and the points 290 in an over-center reversed position 296b that is more extreme than the over-center reversed position 296 shown in FIG. 4D and that is more extreme that the over-center reversed position 296a shown in FIG. 4E. The rectangular prism 285 in the more acute trapezoid shape 298a is in the collapsed position 46 and is non-rigid.

Now referring to FIGS. 5A-5C, FIGS. 5A-5C show an end-driven extension sequence 300 of the extendable compression chain assembly 30 of the extendable compression chain system 10. FIG. 5A is an illustration of a front view of an exemplary extendable compression chain system 10 of the disclosure, where the extendable compression chain assembly 30 is in a retracted position 32, such as a fully retracted position 32a, in a first position 300a of the end-driven extension sequence 300. As shown in FIG. 5A, the extendable compression chain system 10 comprises the extendable compression chain assembly 30 with the compression chain 35 having the compression chain structure 36 coupled to another version of the actuation end fitting 58, such as an actuation end fitting 58b, at the first end 38, such as the actuation end 38a, or drive end, and coupled to another version of the structure interface end fitting 60, such as a structure interface end fitting 60b, at the second end 39, such as the push-pull end 39a. As shown in FIGS. 5A-5C, the extendable compression chain system 10 further comprises the actuation mechanism 62 in the form of an end-driven actuation mechanism 64 comprising an actuator 66 (see FIG. 5A). As shown in FIG. 5A, the actuation mechanism 62, such as the end-driven actuation mechanism 64, is about to apply the load ($P_1$) 216 (see FIG. 5A), such as the actuation load ($P_1$) 216a, to the first end 38, such as the actuation end 38a, or drive end, of the compression chain structure 36, in order to move, actuate, advance, or drive the compression chain structure 36, such as the second portion 52, for example, the horizontal portion 52a, toward the curved portion 14a of the track assembly 14, to follow the curved portion 14a of the track assembly 14 toward a structure 12 (see FIGS. 1, 2A, 9A). As shown in FIG. 5A, the load ($P_2$) 216, such as the applied load ($P_2$) 216b, for example, the compression load 216c, minus the friction force (f) 218, is also being applied to the structure interface end fitting 60b at the second end 39, such as the push-pull end 39a. As shown in FIG. 5A, the extendable compression chain system 10 further comprises the straight portion 14b of the track assembly 14, and a substantial number of the roller wheels 232 of the compression chain structure 36 are in contact with the straight portion 14b of the track assembly 14. In the retracted position 32, such as the fully retracted position 32a, the second portion 52, for example, the horizontal portion 52a, is substantially positioned on the straight portion 14b length of the track assembly 14 before the compression chain structure 36 is actuated by the actuation mechanism 62, to move along the track assembly 14.

As shown in FIG. 5A, the extendable compression chain system 10 further comprises the curved guide assembly 20 having guide rollers 28, such as cylindrical guide rollers, each having the curved surface 24 in contact with a non-rigid module 40b of the compression chain structure 36. FIG. 5A shows the guide rollers 28 and areas around the guide rollers 28 divided into quadrants 302. As shown in FIG. 5A, the non-rigid module 40b inside a first quadrant 302a is in the collapsed position 46, and the rigid module 40a inside a second quadrant 302b is in the rigid position 44. FIG. 5A further shows a third quadrant 302c. FIG. 5A shows the second portion 52, for example, the horizontal portion 52a, of the compression chain structure 36 having rigid modules 40a in the rigid position 44.

FIG. 5B is an illustration of a front view of the extendable compression chain system 10 of FIG. 5A, where the extendable compression chain assembly 30 is in an intermediate extended position 282, such as an intermediate extended position 282b, in a second position 300b of the end-driven extension sequence 300. FIG. 5B shows the second portion 52, for example, the horizontal portion 52a, of the compression chain structure 36 of the compression chain 35 having rigid modules 40a in the rigid position 44. FIG. 5B further shows the first portion 50, for example, the vertical portion 50a, of the compression chain structure 36 having rigid modules 40a in the rigid position 44. As shown in FIG. 5B, the second portion 52 of the compression chain structure 36 is actuated by the actuation mechanism 62, such as the end-driven actuation mechanism 64, to move along the straight portion 14b of the track assembly 14 in the second portion movement 56, for example, the horizontal movement 56a, and causes the first portion 50 of the compression chain structure 36, to move in the first portion movement 54, for example, the vertical movement 54a, such as a vertical upward movement, to follow the curved portion 14a of the track assembly 14, and causes the third portion 53, for example, the curved portion 53a, positioned between the first portion 50 and the second portion 52 to move in the third portion movement 57, for example, the curved movement 57a. As shown in FIG. 5B, the actuation mechanism 62 applies the load ($P_1$) 216, such as the actuation load ($P_1$) 216a, to the first end 38 of the compression chain structure 36. FIG. 5B further shows the actuation end fitting 58b and the structure interface end fitting 60b.

As shown in FIG. 5B, the non-rigid module 40b inside the first quadrant 302a is in the collapsed position 46, the rigid module 40a inside the second quadrant 302b is in the rigid position 44, and the rigid module 40a inside the third quadrant 302c is in the rigid position 44. The non-rigid module 40b inside the first quadrant 302a follows the curved portion 14a of the track assembly 14. The inner links 252 (see FIG. 3A) of the rigid module 40a contact the curved surfaces 24 of the guide rollers 28 of the curved guide assembly 20, as the compression chain structure 36 follows the curved portion 14a of the track assembly 14, and the inner links 252 move inward and collapse causing the rigid module 40a to collapse and go from the rigid position 44 to the collapsed position 46 and become the non-rigid module 40b. As shown in FIG. 5B, in the rigid position 44, the inner pins 225 are positioned in the slot openings 266 of the diagonal links 254, in a first position 304a, where each inner pin 225 is positioned adjacent, or against, a top end of the slot opening 266 of the diagonal link 254. As shown in FIG. 5B, in the collapsed position 46, the inner pins 225 are positioned in the slot openings 266 of the diagonal links 254, in a second position 304b, where each inner pin 225 is positioned in a middle portion or lower portion of the slot opening 266 of the diagonal link 254. Preferably, the inner pin 225 does not contact a bottom end of the slot opening 266 of the diagonal link 254, to allow clearance between the inner pin 225 and the bottom end of the slot opening 266, so as to allow free collapsing of the rigid module 40a into the trapezoid shape 298 (see FIG. 4E) mandated by the curved portion 14a of the track assembly 14. As the rigid module 40a transitions to the non-rigid module 40b in the first quadrant 302a against the curved surface 24, the inner links 252 (see FIG. 3A) move inward, and the inner pins 225 move in the slot openings 266 of the diagonal links 254 from the top end of the slot openings 266 to a middle portion or lower portion of the slot openings 266. As shown in FIG. 5B, the load ($P_2$) 216, such as the applied load ($P_2$) 216b, for example, the compression load 216c, minus the friction force (f) 218, is applied to the structure interface end fitting 60b at the second end 39 of the compression chain 35.

FIG. 5C is an illustration of a front view of the extendable compression chain system 10 of FIG. 5A, where the extendable compression chain assembly 30 is in an extended position 34, such as a fully extended position 34a, in a third position 300c of the end-driven extension sequence 300. FIG. 5C shows the second portion 52, for example, the horizontal portion 52a, of the compression chain structure 36 of the compression chain 35 having a rigid module 40a in the rigid position 44, and having moved farther along the straight portion 14b of the track assembly 14, as compared to the second portion 52 in FIG. 5B, by the load ($P_1$) 216, such as the actuation load ($P_1$) 216a, applied to the compression chain structure 36 by the actuation mechanism 62, such as the end-driven actuation mechanism 64. FIG. 5C further shows the first portion 50, for example, the vertical portion 50*a*, of the compression chain structure 36 having multiple rigid modules 40*a* in the rigid position 44, and the first portion 50 is longer than the first portion 50 of FIG. 5C. As shown in FIG. 5C, the first portion 50 of the compression chain structure 36 has moved farther upward moving in the first portion movement 54, such as the vertical movement 54*a*, and the compression chain structure 36 is substantially rigid and the modules 40 are in a locked position 44*a*, and can take load (P$_2$) 216, such as applied load (P$_2$) 216*b*, for example, compression load 216*c*. As further shown in FIG. 5C, the third portion 53 of the compression chain structure 36 moves in the third portion movement 57, for example, the curved movement 57*a*. As shown in FIG. 5C, the actuation mechanism 62 applies the load (P$_1$) 216, such as the actuation load (P$_1$) 216*a*, to the first end 38 of the compression chain structure 36. FIG. 5C further shows the actuation end fitting 58*b* and the structure interface end fitting 60*b*.

As shown in FIG. 5C, the non-rigid module 40*b* inside the first quadrant 302*a* is in the collapsed position 46, the rigid module 40*a* inside the second quadrant 302*b* is in the rigid position 44, and the rigid module 40*a* inside the third quadrant 302*c* is in the rigid position 44. The non-rigid module 40*b* inside the first quadrant 302*a* follows the curved portion 14*a* of the track assembly 14. The inner links 252 (see FIG. 3A) of the rigid module 40*a* contact the curved surfaces 24 of the guide rollers 28 of the curved guide assembly 20, as the compression chain structure 36 follows the curved portion 14*a* of the track assembly 14, and the inner links 252 move inward and collapse causing the rigid module 40*a* to collapse and go from the rigid position 44 to the collapsed position 46 and become the non-rigid module 40*b* in the first quadrant 302*a*. As shown in FIG. 5C, the load (P$_2$) 216, such as the applied load (P$_2$) 216*b*, for example, the compression load 216*c*, minus the friction force (f) 218, is applied to the structure interface end fitting 60*b* at the second end 39 of the compression chain 35.

FIG. 5D is an illustration of a front view of the extendable compression chain system 10 of FIG. 5B, where the extendable compression chain assembly 30 is in the intermediate extended position 282, such as an intermediate extended position 282*c*, and angled at an obtuse angle 306. In one version, as shown in FIGS. 5A-5C, the compression chain 35 with the compression chain structure 36 is actuated and positioned at a 90 degree angle 308 (see FIG. 5B), or right angle, as the modules 40 of the compression chain structure 36 follow the curved portion 14*a* of the track assembly 14. In another version, as shown in FIG. 5D, the compression chain structure 36 is actuated and positioned at an obtuse angle 306, greater than 90 degrees, as the modules 40 of the compression chain structure 36 follow the curved portion 14*a* of the track assembly 14. As shown in FIG. 5D, in this version, the curved portion 14*a* of the track assembly 14 extends beyond a linear position 310 of the straight portion 14*b* of the track assembly 14 to follow the curved portion 14*a* of the track assembly 14, and extend upwardly at the same obtuse angle 306 as the compression chain structure 36. As shown in FIG. 5D, the actuation mechanism 62 applies the load (P$_1$) 216, such as the actuation load (P$_1$) 216*a*, to the first end 38 of the compression chain structure 36. As further shown in FIG. 5D, the load (P$_2$) 216, such as the applied load (P$_2$) 216*b*, for example, the compression load 216*c*, minus the friction force (f) 218, is applied to the structure interface end fitting 60*b* at the second end 39 of the compression chain 35.

FIG. 5D shows the third portion 53 having the non-rigid module 40*b* in the collapsed position 46 in the first quadrant 302*a*. FIG. 5D further shows the second portion 52, for example, the horizontal portion 52*a*, of the compression chain structure 36 having rigid modules 40*a* in the rigid position 44 in the second quadrant 302*b*. FIG. 5D further shows the first portion 50, for example, the vertical portion 50*a*, of the compression chain structure 36 having rigid modules 40*a* in the rigid position 44 in the third quadrant 302*c*. FIG. 5D further shows the actuation end fitting 58*b* and the structure interface end fitting 60*b*. FIG. 5D further shows the curved guide assembly 20 with the guide rollers 28 each having the curved surface 24.

FIG. 5E is an illustration of a front view of another version of an extendable compression chain system 10 with the actuation mechanism 62 in the form of a gear-driven actuation mechanism 72, where the extendable compression chain assembly 30 is in the intermediate extended position 282, such as the intermediate extended position 282*b*. As shown in FIG. 5E, the gear-driven actuation mechanism 72 comprises the gear mechanism 74 with gear teeth 312 that rotates about a spindle 314 in a rotational direction 316. As shown in FIG. 5E, the gear-driven actuation mechanism 72 further comprises a rack 318 with rack teeth 320. The combination of the gear mechanism 74 and the rack 318 comprises a rack-and-pinion system 70*a* (see FIG. 5E) or rack-and-pinion arrangement.

As shown in FIG. 5E, the rack 318 is coupled to the outer links 250 (see FIG. 2C) of the compression chain structure 36, along the length of the compression chain 35 with the compression chain structure 36, and the rack 318 is positioned between the outer links 250 (see FIG. 2C) of the compression chain structure 36 and the track assembly 14, where the track assembly 14 is present. The gear mechanism 74 provides upward displacement to the outer links 250 by means of the rack-and-pinion system 70*a*. The rack-and-pinion system 70*a* may optionally have a locking or ratchet mechanism (not shown) attached to the gear mechanism 74 and/or to the rack 318 as an added reversal prevention feature.

As shown in FIG. 5E, the gear teeth 312 of the gear mechanism 74 mesh with the rack teeth 320 of the rack 318, as the gear mechanism 74 rotates up and down the rack 318 on the first portion 50, for example, the vertical portion 50*a*, of the compression chain structure 36, to cause the first portion movement 54, such as the vertical movement 54*a*, or vertical upward movement, of the first portion 50, for example, the vertical portion 50*a*, of the compression chain structure 36. As shown in FIG. 5E, the gear mechanism 74 rotates in the rotational direction 316, pushing the rack 318 upward. The one or more outer links 250 (see FIG. 2C) of the compression chain structure 36 at the gear mechanism 74 accepts or accept an upward load (P$_3$) 216*d* applied by the gear mechanism 74 through the meshing of the gear teeth 312 and the rack teeth 320. Further, as shown in FIG. 5E, as the gear mechanism 74 rotates and pushes the rack 318 upward, the first portion 50, for example, the vertical portion 50*a*, of the compression chain structure 36, moves upward in the first portion movement 54, such as the vertical movement 54*a*, or vertical upward movement, and the upward load (P$_3$) 216*d* pushes the first portion 50 of the compression chain structure 36 upward.

The gear-driven actuation mechanism 72 further causes the compression chain structure 36 to follow the curved portion 14*a* of the track assembly 14, so that the modules 40 move past the curved guide assembly 20, such as the guide rollers 28 each with the curved surface 24. The first portion movement 54, such as the vertical movement 54*a*, or vertical upward movement, of the first portion 50, for example, the vertical portion 50a, of the compression chain structure 36, is driven by the gear mechanism 74. As shown in FIG. 5E, the load (P$_2$) 216, such as the applied load (P$_2$) 216b, for example, the compression load 216c, minus the friction force (f) 218, is applied to the structure interface end fitting 60b at the second end 39 of the compression chain 35.

FIG. 5E further shows the third portion 53 having the non-rigid module 40b in the collapsed position 46 in the first quadrant 302a. FIG. 5E further shows the second portion 52, for example, the horizontal portion 52a, of the compression chain structure 36 having rigid modules 40a in the rigid position 44 in the second quadrant 302b. FIG. 5E further shows the first portion 50, for example, the vertical portion 50a, of the compression chain structure 36 having rigid modules 40a in the rigid position 44 in the third quadrant 302c. As shown in FIG. 5E, the first portion 50 of the compression chain structure 36 is substantially rigid and the modules 40 are in a locked position 44a, and can take load (P$_2$) 216, such as applied load (P$_2$) 216b, for example, compression load 216c. FIG. 5E further shows the actuation end fitting 58b and the structure interface end fitting 60b.

The extendable compression chain system 10 of FIG. 2A is shown with an end-driven actuation mechanism 64. Alternatively, the extendable compression chain system 10 of FIG. 2A may be used with the gear-driven actuation mechanism 72, as show in FIG. 5E, so the gear mechanism 74 and rack 318 would be used instead of the actuator 66 (see FIG. 2A).

FIG. 5F is an illustration of another version of the structure interface end fitting 60, such as in the form of a structure interface end fitting 60c, of the extendable compression chain assembly 30. FIG. 5F shows the structure interface end fitting 60c two through holes 212 instead of one through hole 212, as shown in the structure interface end fitting 66b of FIG. 5A. Two through holes 212 allow the structure 12 (see FIGS. 1, 2A) being moved by the compression chain 35 (see FIGS. 1, 2A) to provide moment restraint to the second end 39 (see FIG. 5F) of the compression chain structure 36. This version of the structure interface end fitting 60c improves the buckling load of the column comprised of the first portion 50 (see FIG. 5C) of the compression chain 35 (see FIG. 5C), thus allowing a longer length for identically sized compression chain hardware.

Now referring to FIGS. 6A-6C, FIGS. 6A-6C show an end-driven extension sequence 322 of another version of the extendable compression chain system 10 with the extendable compression chain assembly 30 enclosed within an oil enclosure structure 80. FIG. 6A is an illustration of a front view of an exemplary extendable compression chain assembly 30 of the disclosure, in a retracted position 32, such as a fully retracted position 32a, attached within the oil enclosure structure 80, in a first position 322a of the end-driven extension sequence 322. FIG. 6B is an illustration of a front view of the extendable compression chain assembly 30 of FIG. 6A, in an intermediate extended position 282, such as an intermediate extended positions 282a, attached within the oil enclosure structure 80, in a second position 322b of the end-driven extension sequence 322. FIG. 6C is an illustration of a front view of the extendable compression chain assembly 30 of FIG. 6A, in an extended position 34, such as a fully extended position 34a, attached within the oil enclosure structure 80, in a third position 322c of the end-driven extension sequence 322.

As shown in FIGS. 6A-6C, the oil enclosure structure 80 comprises a first telescoping oil enclosure portion 82, such as a vertical telescoping oil enclosure portion 82a, a fixed oil enclosure portion 84, and a second telescoping oil enclosure portion 86, such as a horizontal telescoping oil enclosure portion 86a. The oil enclosure structure 80 encloses the compression chain structure 36 (see FIGS. 6A-6C) and the track assembly 14 (see FIGS. 6A-6C) and surrounds them with oil 88 (see FIGS. 6A-6C) filling an interior 324 (see FIG. 6A) of the oil enclosure structure 80. The oil enclosure structure 80 is sealed to keep the oil 88 enclosed within the interior 324 of the structure.

The movable parts in the extendable compression chain system 10 with the extendable compression chain assembly 30 may be susceptible to corrosion from environmental effects such as moisture combined with temperature. It is advantageous to surround the compression chain structure 36 (see FIGS. 6A-6C) and the track assembly 14 (see FIGS. 6A-6C) with oil 88 (see FIGS. 6A-6C). Lubricated parts have less friction, and the sealed oil enclosure structure 80 can protect against damage from moisture and dirt. In addition the oil 88 can be used to regulate temperature of the compression chain assembly 30 and the track assembly 14, if necessary.

As shown in FIG. 6B, the first telescoping oil enclosure portion 82, such as the vertical telescoping oil enclosure portion 82a, has a first end 325a, a second end 325b, and a series of telescoping segments 326a configured to telescope from a retracted position 328 (see FIG. 6A) to an extended position 330 (see FIG. 6B), as the compression chain structure 36 extends from the fully retracted position 32a to the fully extended position 34a, and the first portion 50 moves upward. As shown in FIG. 6B, the fixed oil enclosure portion 84 has a first end 332a, a second end 332b, and a corner joint segment body 334 having a substantially pie-shaped configuration. The fixed oil enclosure portion 84 has no telescoping segments, and is configured to contain the third portion 53 (see FIG. 6B) of the compression chain structure 36 with the non-rigid module 40b in the collapsed position 46, and is configured to contain all, or substantially all, of the curved guide assembly 20 (see FIGS. 6A-6C). As shown in FIG. 6B, the first end 332a of the fixed oil enclosure portion 84 is coupled to the second end 325b of the first telescoping oil enclosure portion 82.

As further shown in FIG. 6B, the second telescoping oil enclosure portion 86, such as the horizontal telescoping oil enclosure portion 86a, has a first end 335a, a second end 335b, and a series of telescoping segments 326b configured to telescope from an extended position 330a (see FIG. 6A) to a retracted position 328a (see FIG. 6C), as the compression chain structure 36 extends from the fully retracted position 32a (see FIG. 6A) to the fully extended position 34a (see FIG. 6C), and the second portion 52 moves toward the curved guide assembly 20. As shown in FIG. 6B, the second end 332b of the fixed oil enclosure portion 84 is coupled to the second end 335b of the first telescoping oil enclosure portion 82.

The entire oil enclosure structure 80 has a constant volume, and as the first telescoping oil enclosure portion 82 expands, the second telescoping oil enclosure portion 86 retracts, and as the second telescoping oil enclosure portion 86 retracts, the first telescoping oil enclosure portion 82 expands. The oil enclosure structure 80 uses a telescoping arrangement for the first telescoping oil enclosure portion 82 and the second telescoping oil enclosure portion 86, which are both variable in length but have the same volumes when expanded. The oil 88 flows between the second telescoping oil enclosure portion 86, the fixed oil enclosure portion 84, and the first telescoping oil enclosure portion 82. The oil enclosure structure 80 may be made of a metal material, such as aluminum, steel, stainless steel, or another suitable metal material. The oil enclosure structure 80 may also be made of a flexible plastic material, such as in the form of a rubber accordion tube, or another suitable plastic material.

As shown in FIGS. 6A-6C, the extendable compression chain system 10 comprises the extendable compression chain assembly 30 with the compression chain 35 having the compression chain structure 36 coupled to the actuation end fitting 58 at the first end 38 (see FIG. 6A), such as the actuation end 38a (see FIG. 6A), or drive end, and coupled to the structure interface end fitting 60 at the second end 39 (see FIG. 6A), such as the push-pull end 39a (see FIG. 6A). The first end 38 of the compression chain structure 36 is actuated by the end-driven actuation mechanism 64 (see FIGS. 2A, 5A), which applies the load ($P_1$) 216 (see FIGS. 6A-6C), such as the actuation load 216a (see FIGS. 6A-6C), to the first end 38, in order to move, actuate, or drive the compression chain structure 36, such as the second portion 52, for example, the horizontal portion 52a, toward the curved guide assembly 20 (see FIGS. 6A-6C) having the guide rollers 28 (see FIGS. 6A-6C) each with the curved surface 24 (see FIGS. 6A-6C), and toward a structure 12 (see FIGS. 1, 2A, 9A). As shown in FIGS. 6A-6C, the load ($P_2$) 216, such as the applied load ($P_2$) 216b, for example, the compression load 216c, minus the friction force (f) 218, is also being applied to the structure interface end fitting 60 at the second end 39 (see FIGS. 6A-6C).

As shown in FIGS. 6A-6C, the extendable compression chain system 10 further comprises the track assembly 14 contained in the oil enclosure structure 83. In this version, as shown in FIGS. 6A-6C, the track assembly 14 moves with the compression chain structure 36, and extends and retracts coextensively with the compression chain structure 36, as the compression chain structure 36 extends and retracts. As shown in FIGS. 6A-6C, the track assembly 14 curves around the curved guide assembly 20. FIG. 6A shows the curved portion 14a and the straight portion 14b of the track assembly 14.

As shown in FIG. 6A, the extendable compression chain system 10 further comprises the curved guide assembly 20 in the form of guide rollers 28 each having the curved surface 24 in contact with the non-rigid module 40b in the collapsed position 46. FIG. 6B shows the second portion 52, for example, the horizontal portion 52a, and the first portion 50, for example, the vertical portion 50a, both having rigid modules 40a in the rigid position 44.

Figure 7B:
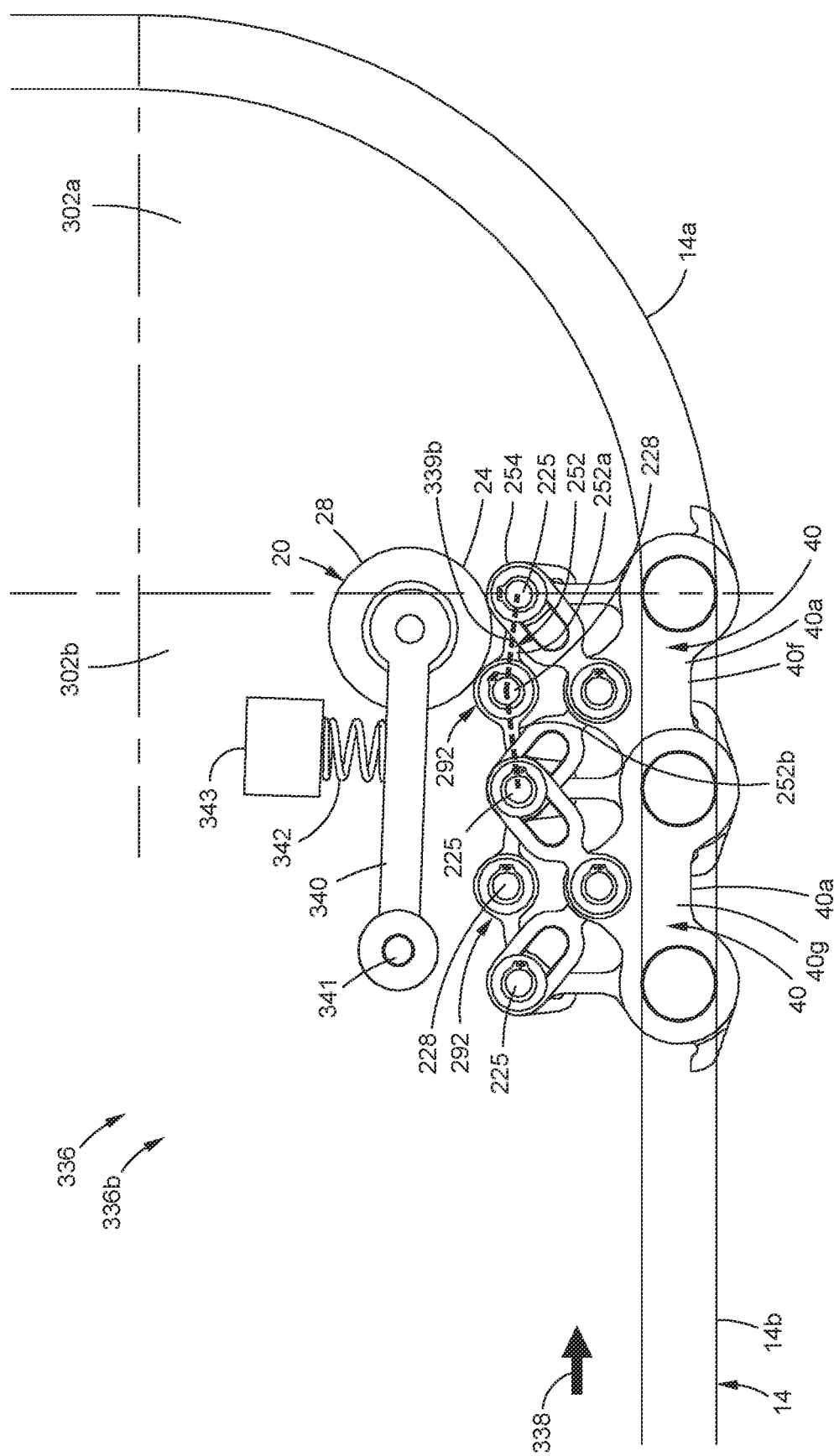
FIG. 7B is an illustration of a front view of the pair of modules of FIG. 7A, in a second position of the module sequence.
Figure 7D:
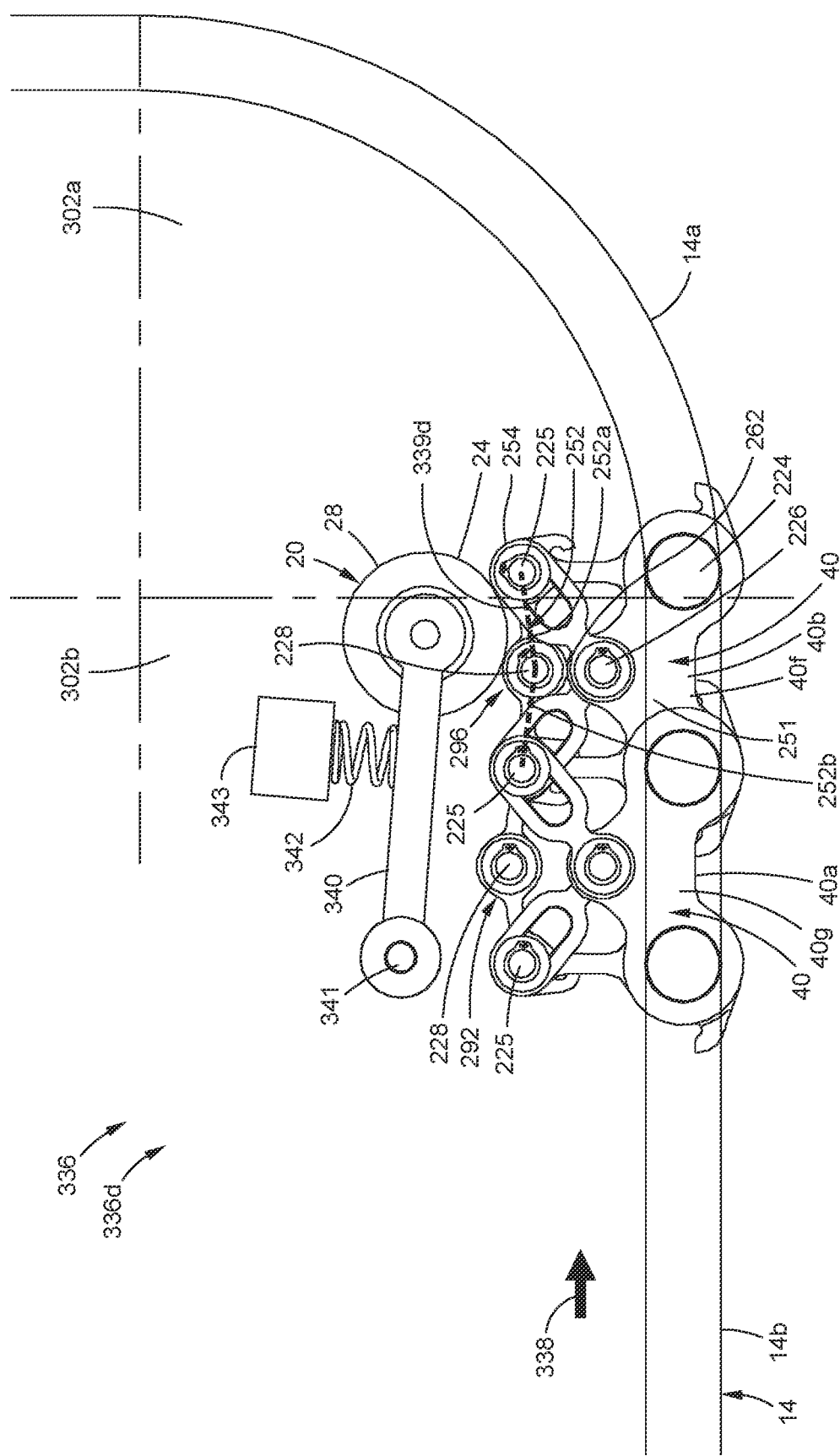
FIG. 7D is an illustration of a front view of the pair of modules of FIG. 7A, in a fourth position of the module sequence.
Figure 7E:
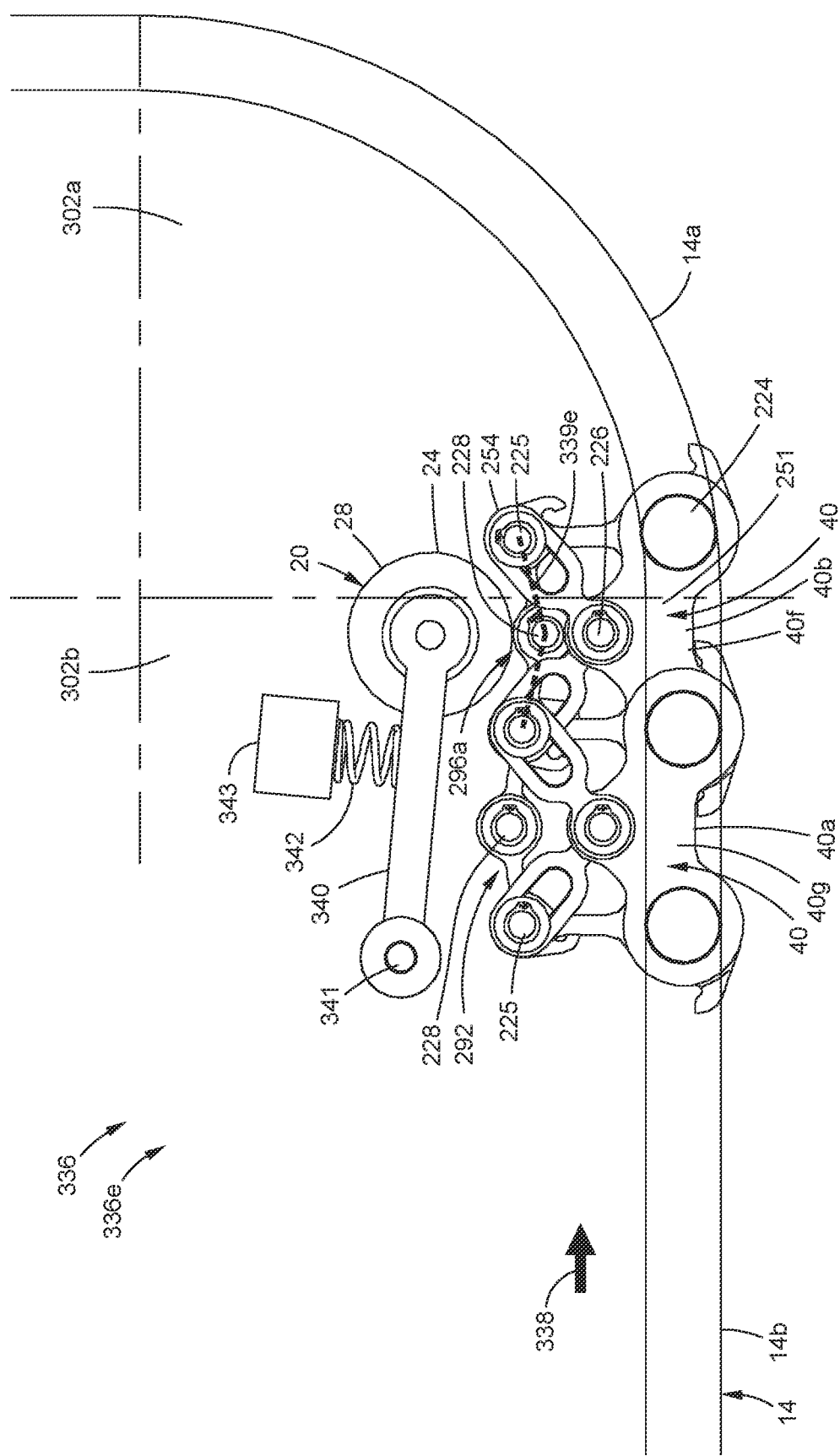
FIG. 7E is an illustration of a front view of the pair of modules of FIG. 7A, in a fifth position of the module sequence.
Figure 7F:
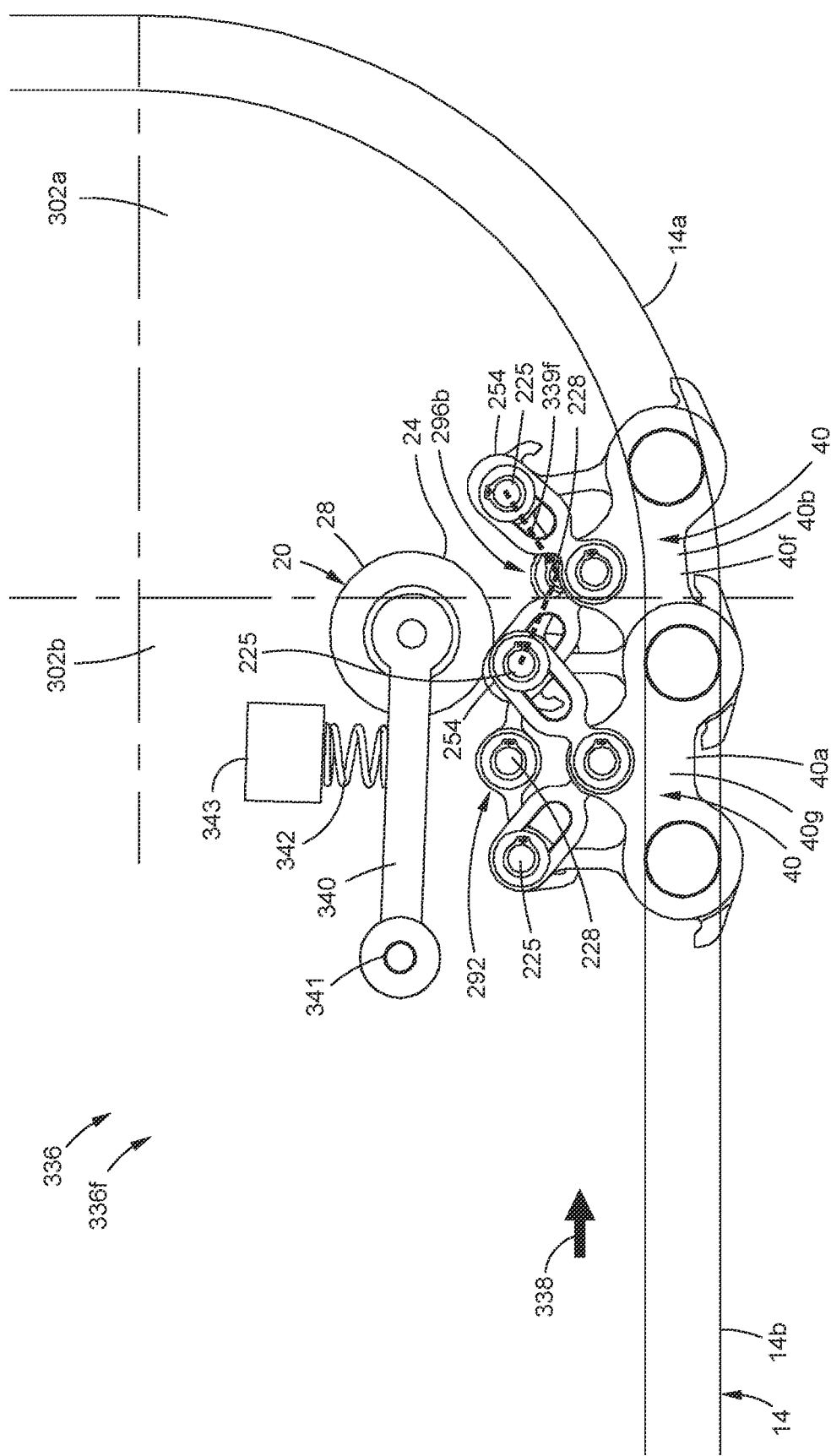
FIG. 7F is an illustration of a front view of the pair of modules of FIG. 7A, in a sixth position of the module sequence.

Now referring to FIGS. 7A-7F, FIGS. 7A-7F show a module sequence 336 of a pair of modules 40, including a first module 40f and a second module 40g, encountering a curved guide assembly 20 comprising a guide roller 28 having a curved surface 24. FIG. 7A is an illustration of a front view of a pair of modules 40, of a compression chain 35 (see FIGS. 2A-2C) having the compression chain structure 36 (see FIGS. 2A-2C), in a first position 336a of the module sequence 336. FIG. 7B is an illustration of a front view of the pair of modules 40 of FIG. 7A, in a second position 336b of the module sequence 336. FIG. 7C is an illustration of a front view of the pair of modules 40 of FIG. 7A, in a third position 336c of the module sequence 336. FIG. 7D is an illustration of a front view of the pair of modules 40 of FIG. 7A, in a fourth position 336d of the module sequence 336. FIG. 7E is an illustration of a front view of the pair of modules 40 of FIG. 7A, in a fifth position 336e of the module sequence 336. FIG. 7F is an illustration of a front view of the pair of modules 40 of FIG. 7A, in a sixth position 336f of the module sequence 336.

FIGS. 7A-7F show the pair of modules 40, including the first module 40f and the second module 40g, where the first module 40f and the second module 40g overlap and share common features including, as shown in FIG. 7A, a shared outer pin 224c, a shared inner pin 225c, shared side links 251d, shared diagonal links 254c, shared rotational stops 258c, and a shared arm member 274c. The roller wheels 232 (see FIGS. 2A, 3A) of the modules 40 are removed for clarity. FIGS. 7A-7F further show the track assembly 14 with the curved portion 14a and the straight portion 14b, the first quadrant 302a and the second quadrant 302b, and the modules 40 moving forward in a forward direction 338, and actuated by either the end-driven actuation mechanism 64 (see FIG. 2A) or the gear-driven actuation mechanism 72 (see FIG. 5E).

FIGS. 7A-7F further show the curved guide assembly 20 comprising the guide roller 28 with the curved surface 24. As shown in FIGS. 7A-7F, the guide roller 28 is coupled to, or integral with, a roller arm 340, or axle, extending, and positioned, above one or both of the modules 40, depending on the position in the module sequence 336. As shown in FIGS. 7A-7F, one end of the roller arm 340 is coupled to, or integral with, the guide roller 28 and the other end of the roller arm 340 is coupled to, or integral with, a roller pivot point 341. As further shown in FIGS. 7A-7F, a roller spring 342 is coupled, or attached, to the roller arm 340. As shown in FIGS. 7A-7F, one end of the roller spring 342 is coupled, or attached, to the roller arm 340, and the other end of the roller spring 342 is coupled, or attached, to a roller spring support 343. The roller spring 342 may comprise a compression spring or another suitable type of spring. The roller spring 342 may comprise one roller spring 342, two roller springs 342, or more than two roller springs 342. FIGS. 7A-7F show, in one version, the roller spring 342 supported by the roller spring support 343. However, in other versions, the roller spring 342 may be supported with other suitable structures.

As shown in FIG. 7A, the pair of modules 40 are in the first position 336a of the module sequence 336, and the pair of modules 40 move in the forward direction 338 along the track assembly 14 toward the curved guide assembly 20, such as the guide roller 28. FIG. 7A shows the curved surface 24 of the guide roller 28 bearing against the diagonal link 254 and the inner pin 225 and the curved surface 24 has not yet contacted the articulated edge pin 228. The angle of the inner links 252 (see FIG. 7A) of the first module 40f is −15 (minus fifteen) degrees. FIG. 7A further shows the inner pins 225 and the diagonal links 254 of the first module 40f within the second quadrant 302b. As further shown in FIG. 7A, the inner pins 225 and the articulated edge pins 228 of the pair of modules 40 are in the over-center position 292. Although FIG. 7A shows the angle of the inner links 252 of the first module 40f in the −15 degrees position, depending on the material properties, e.g., stiffness, of the hardware and the kinematics of the design, the magnitude of the angle may be less than 15 degrees, e.g., 5 degrees or less.

As shown in FIG. 7A, the first module 40f and the second module 40g are rigid modules 40a. In this position, the upper inner link 252a (see FIG. 7B) and the lower inner link 252b (see FIG. 7B) have not yet contacted the guide roller 28. FIG. 7A further shows a center pin 226 of the modules 40.

FIG. 7A further shows a full module length 337 of the first module 40f and shows a half module length 337a of half of one module 40, such as the first module 40f. The full module length 337 shown in FIG. 7A is a typical length over which the module 40, such as the first module 40f, transitions from the first position 336a (see FIG. 7A) of the module sequence 336 to the sixth position 336f (see FIG. 7F) of the module sequence 336. Over this full module length 337, the guide roller 28 pushes the articulated edge pin 228 (see FIG. 7A) of the first module 40f, so that it is in position for the curved portion 14a (see FIG. 7A) of the track assembly 14 (see FIG. 7A) to take over and make the articulated edge pin 228 pull away even further. This same movement occurs on the vertical side. FIG. 7A further shows a first position line 339a relating to the positioning and movement of the inner pins 225, the inner links 252, including the upper inner link 252a and the lower inner link 252b, and the articulated edge pin 228, of the first module 40f, relative to each other.

As shown in FIG. 7B, the pair of modules 40 are in the second position 336b of the module sequence 336, and the pair of modules 40 move in the forward direction 338 further along the track assembly 14 toward the curved guide assembly 20, such as toward the guide roller 28. FIG. 7B shows the curved surface 24 of the guide roller 28 bearing against the diagonal link 254, the inner pin 225, and now bearing against the articulated edge pin 228 of the first module 40f. As shown in FIG. 7B, the guide roller 28 has just made contact with the articulated edge pin 228 but has not pushed it in yet. The angle of the inner links 252 (see FIG. 7B), such as the upper inner link 252a (see FIG. 7B) and the lower inner link 252b (see FIG. 7B), of the first module 40f, is still −15 (minus fifteen) degrees. FIG. 7B shows one inner pin 225 and one diagonal link 254 of the first module 40f partially within the first quadrant 302a and partially within the second quadrant 302b. FIG. 7B further shows the inner links 252, such as the upper inner link 252a and the lower inner link 252b, and the articulated edge pin 228 of the first module 40f in the second quadrant 302b. As shown in FIG. 7B, the inner pins 225 and the articulated edge pins 228 of the pair of modules 40 are still in the over-center position 292. As shown in FIG. 7B, the first module 40f and the second module 40g are rigid modules 40a. FIG. 7B shows the parts at exactly the point of contact of the inner links 252 and the curved guide assembly 20, thus no inward movement of the inner links 252 and the articulated edge pin 228 of the first module 40f has occurred. The position of the first module 40f shown in FIG. 7B corresponds to the rectangular prism 285 in the over-center position 292 shown in FIG. 4B.

FIG. 7B further shows a second position line 339b relating to the positioning and movement of the inner pins 225, the inner links 252, including the upper inner link 252a and the lower inner link 252b, and the articulated edge pin 228, of the first module 40f, relative to each other. The first position line 339a (see FIG. 7A) and the second position line 339b (see FIG. 7B) are the same and are at −15 (minus fifteen) degrees, with the articulated edge pin 228 is positioned above the inner pins 225 and the inner links 252.

As shown in FIG. 7C, the pair of modules 40 are in the third position 336c of the module sequence 336, and the pair of modules 40 move in the forward direction 338 further along the track assembly 14 toward the curved guide assembly 20, such as the guide roller 28. FIG. 7C shows the curved surface 24 of the guide roller 28 bearing against the articulated edge pin 228 of the first module 40f. As shown in FIG. 7C, the guide roller 28 has pushed the articulated edge pin 228 down so that the angle of the inner links 252, such as the upper inner link 252a and the lower inner link 252b, of the first module 40f, is now zero, and the inner pins 225 and the articulated edge pin 228 of the first module 40f are in-line. FIG. 7C shows one inner pin 225 of the first module 40f within the first quadrant 302a, and shows one diagonal link 254 of the first module 40f partially within the first quadrant 302a and partially within the second quadrant 302b. FIG. 7C further shows the inner links 252, such as the upper inner link 252a and the lower inner link 252b, and the articulated edge pin 228 of the first module 40f in the second quadrant 302b. As shown in FIG. 7C, the inner pins 225 and the articulated edge pins 228 of the first module 40f are now in the centered position 294, and the inner pins 225 and the articulated edge pins 228 of the second module 40g are still in the over-center position 292. As shown in FIG. 7C, the first module 40f and the second module 40g are rigid modules 40a. The centered position 294 of the first module 40f puts some pre-stress in the first module 40f. As the curved guide assembly 20 forces the inner pin 225 of the first module 40f to move, it is resisted by the moment of the spring 238 (see FIGS. 2B, 3A), such as the torsional spring 238a (see FIGS. 2B, 3A), coupled to the articulated edge pin 228. The stiffness of the spring 238 (see FIGS. 2B, 3A), such as the torsional spring 238a (see FIGS. 2B, 3A), is designed such that it is adequate to enforce the over-center position 292 (see FIGS. 7A-7D) for the rigid modules 40a (see FIGS. 7A-7D), but not so stiff to impede the forward or rightward movement of the modules 40.

FIG. 7C further shows a third position line 339c relating to the positioning and movement of the inner pins 225, the inner links 252, including the upper inner link 252a and the lower inner link 252b, and the articulated edge pin 228, of the first module 40f, relative to each other. The third position line 339c (see FIG. 7C) shows a straight line with the inner pins 225, the inner links 252, and the articulated edge pin 228 of the first module 40f aligned.

As shown in FIG. 7D, the pair of modules 40 are in the fourth position 336d of the module sequence 336, and the pair of modules 40 move in the forward direction 338 further along the track assembly 14 toward the curved guide assembly 20, such as the guide roller 28. FIG. 7D shows the curved surface 24 of the guide roller 28 bearing against the articulated edge pin 228 of the first module 40f. As shown in FIG. 7D, the guide roller 28 has pushed the articulated edge pin 228 down so that the angle of the inner links 252, such as the upper inner link 252a and the lower inner link 252b, of the first module 40f, is now +15 (plus fifteen) degrees. At this point, the first module 40f is not yet in the trapezoid shape 298 (see FIG. 4E), but the first module 40f is not stiff since the inner links 252 are not in-line as in FIG. 7C, and not in the locked −15 degrees position as in FIG. 7A. At this point, one outer pin 224 (see FIG. 7D) of the first module 40f is at the boundary of the straight portion 14b of the track assembly 14 and the curved portion 14a of the track assembly 14.

FIG. 7D shows one inner pin 225 of the first module 40f within the first quadrant 302a, and shows one diagonal link 254 of the first module 40f partially within the first quadrant 302a and partially within the second quadrant 302b. FIG. 7D further shows the inner links 252, such as the upper inner link 252a and the lower inner link 252b, and the articulated edge pin 228 of the first module 40f in the second quadrant 302b.

As the first module 40f further contacts and encounters the curved guide assembly 20, the curved guide assembly 20 forces or pushes the upper inner link 252a toward the center 262 (see FIG. 7D) of the first module 40f, and toward the side link 251 (see FIG. 7D), the center pin 226 (see FIG. 7D), and the outer pins 224 (see FIG. 7D) of the first module 40f, and forces the upper inner link 252a and the lower inner link 252b of the first module 40f to rotate about the inner pins 225 of the first module 40f.

As shown in FIG. 7D, the inner pins 225 and the articulated edge pin 228 of the first module 40f are now in the over-center reversed position 296, and the inner pins 225 and the articulated edge pin 228 of the second module 40g are still in the over-center position 292. As shown in FIG.

7D, the second module 40g is a rigid module 40a, and the first module 40f is a non-rigid module 40b. The position of the first module 40f shown in FIG. 7D corresponds to the rectangular prism 285 in the over-center reversed position 296 shown in FIG. 4D. The force 295 shown in FIG. 4D is caused by the curved guide assembly 20.

FIG. 7D further shows a fourth position line 339d relating to the positioning and movement of the inner pins 225, the inner links 252, including the upper inner link 252a and the lower inner link 252b, and the articulated edge pin 228, of the first module 40f, relative to each other. The fourth position line 339d shows a +15 (plus fifteen) degrees angled line with the inner pins 225, the inner links 252, and the articulated edge pin 228 of the first module 40f.

As shown in FIG. 7E, the pair of modules 40 are in the fifth position 336e of the module sequence 336, and the pair of modules 40 move in the forward direction 338 further along the track assembly 14 toward the curved portion 14a of the track assembly 14, and the curved guide assembly 20, for example, toward the guide roller 28. FIG. 7E shows the first module 40f has entered the curved portion 14a of the track assembly 14 a sufficient distance so as to force the first module 40f to become a trapezoid shape 298 (see FIG. 4E). This forces the articulated edge pin 228 of the first module 40f to move inward even more. The inward force of the guide roller 28 helps this motion. After the first module 40f continues to move in the forward direction 338 (see FIG. 7E), the articulated edge pin 228 of the first module 40f moves even further inward, and at this point, the articulated edge pin 228 can pull away from the curved surface 24 of the guide roller 28. FIG. 7E shows one outer pin 224 of the first module 40f in the first quadrant 302a and one outer pin 224 of the first module 40f in the second quadrant 302b. FIG. 7E further shows one inner pin 225 and one diagonal link 254 of the first module 40f within the first quadrant 302a and shows one inner pin 225 and one diagonal link 254 of the first module 40f within the second quadrant 302b. FIG. 7E further shows the articulated edge pin 228 and the center pin 226 of the first module 40f in the second quadrant 302b.

As shown in FIG. 7E, the second module 40g is a rigid module 40a and the first module 40f is a non-rigid module 40b. The position of the first module 40f shown in FIG. 7E corresponds to the trapezoid shape 298 in the over-center reversed position 296a shown in FIG. 4E. As shown in FIG. 7E, the inner pins 225 and the articulated edge pin 228 of the first module 40f are not in alignment, and the articulated edge pin 228 is positioned below the inner pins 225, and the first module 40f is in the over-center reversed position 296a. As the first module 40f further contacts and encounters the curved guide assembly 20, the curved guide assembly 20 forces, or pushes, the upper inner link 252a even further to the over-centered reversed position 296a (see FIGS. 4E, 7E) of the first module 40f, and toward the side link 251, the center pin 226, and the outer pins 224 of the first module 40f, and forces the upper inner link 252a (see FIG. 7D) and the lower inner link 252b (see FIG. 7D) of the first module 40f to rotate about the inner pins 225 of the first module 40f.

FIG. 7E further shows a fifth position line 339e relating to the positioning and movement of the inner pins 225, the inner links 252, including the upper inner link 252a (see FIG. 7D) and the lower inner link 252b (see FIG. 7D), and the articulated edge pin 228, of the first module 40f, relative to each other.

As shown in FIG. 7F, the pair of modules 40 are in the sixth position 336f of the module sequence 336, and the pair of modules 40 move in the forward direction 338 further along the curved portion 14a of the track assembly 14. FIG. 7F shows one outer pin 224 of the first module 40f in the first quadrant 302a and well into the curved portion 14a of the track assembly 14.

FIG. 7F shows one inner pin 225, one diagonal link 254, the articulated edge pin 228, and the center pin 226 of the first module 40f within the first quadrant 302a. FIG. 7F further shows the second module 40g in the second quadrant 302b and in contact with the curved surface 24 of the guide roller 28. In particular, the guide roller 28 bears against one diagonal link 254 and one inner pin 225 of the second module 40g in FIG. 7F. The second module 40g shown in FIG. 7F is now in the same position as the first module 40f shown in FIG. 7A. As shown in FIG. 7F, the second module 40g is a rigid module 40a in the over-center position 292, and the first module 40f is a non-rigid module 40b. The position of the first module 40f shown in FIG. 7F is in the over-center reversed position 296b, as the first module 40f follows the curved portion 14a of the track assembly 14, and the first module 40f corresponds to the more acute trapezoid shape 298a in the over-center reversed position 296b shown in FIG. 4F.

FIG. 7F further shows a sixth position line 339f relating to the positioning and movement of the inner pins 225, the inner links 252, including the upper inner link 252a (see FIG. 7D) and the lower inner link 252b (see FIG. 7D), and the articulated edge pin 228, of the first module 40f, relative to each other. The sixth position line 339f (see FIG. 7F) shows the articulated edge pin 228 positioned below the inner pins 225 and the inner links 252 of the first module 40f.

In use, the one or more roller springs 342 of FIGS. 7A-7F function to pull the guide roller 28 down, and the roller spring support 343 (see FIGS. 7A-7F) and the roller pivot point 341 (see FIGS. 7A-7F) may be positioned on each side of a compression chain 35 (see FIGS. 2C, 9B, 10B). The roller springs 342 are in tension and function to pull the guide roller 28 (see FIGS. 7A-7F) down. This arrangement enables a more compact assembly which in some applications may be advantageous.

Figure 8A:
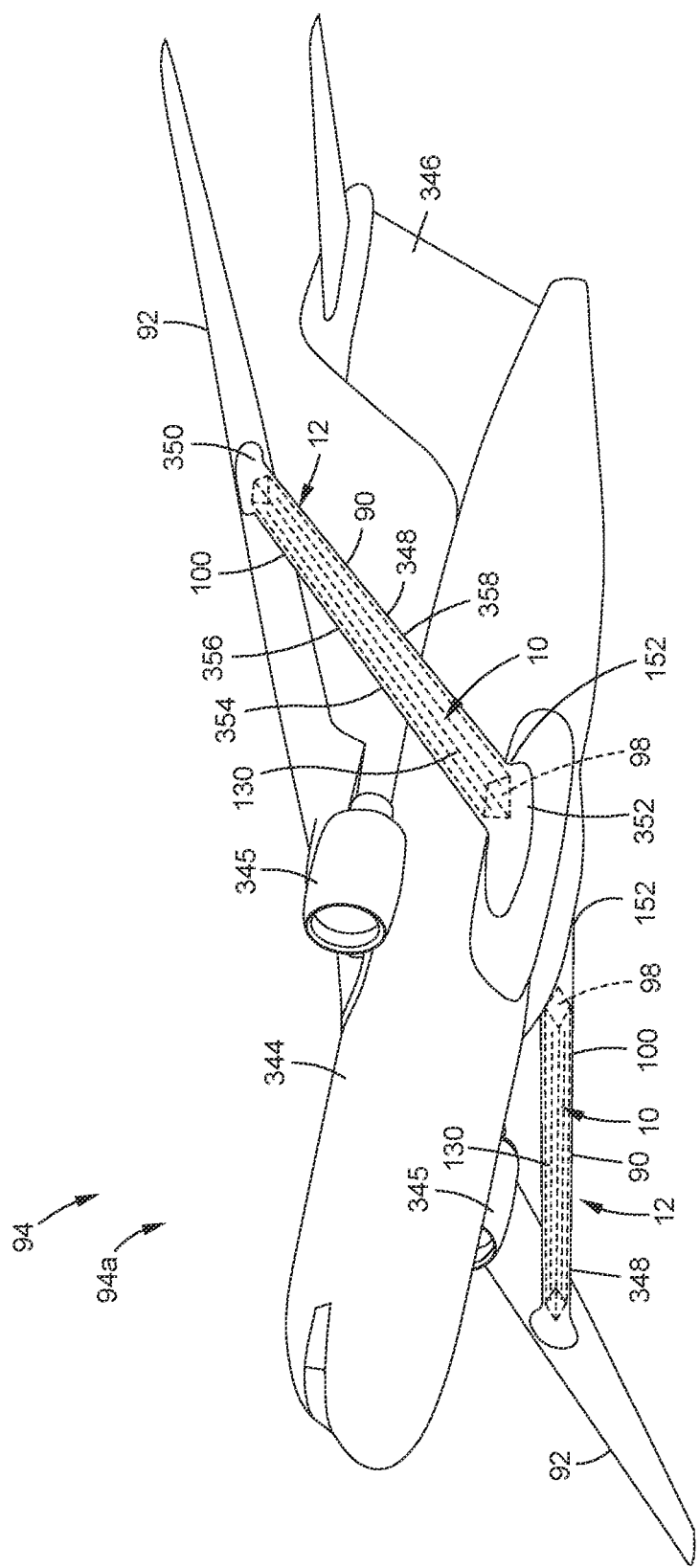
FIG. 8A is an illustration of a front perspective view of an exemplary aircraft having wing struts with exemplary extendable compression chain systems of the disclosure.
Figure 8B:
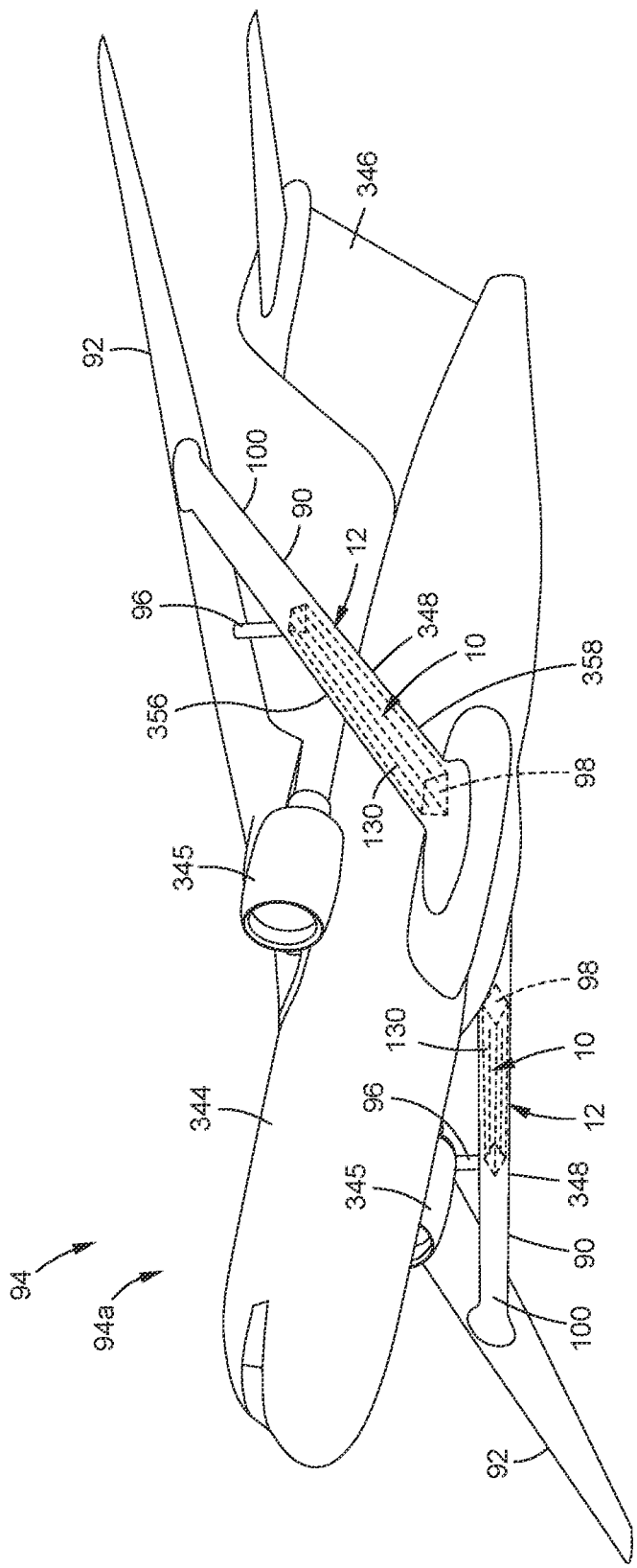
FIG. 8B is an illustration of a front perspective view of the aircraft of FIG. 8A, with wing struts and extendable compression chain systems, and further including jury struts.

Now referring to FIGS. 8A-8B, FIGS. 8A-8B show structures 12, such as wing struts 90 for wings 92 of a vehicle 94, such as an aircraft 94a, that the extendable compression chain system 10, discussed above, can be coupled to, and used with. FIG. 8A is an illustration of a front perspective view of an exemplary vehicle 94, such as an aircraft 94a having wing struts 90 with exemplary extendable compression chain systems 10 of the disclosure. FIG. 8B is an illustration of a front perspective view of the vehicle 94, such as the aircraft 94a, of FIG. 8A, with wing struts 90 and extendable compression chain assemblies 30, and further including jury struts 96 positioned between the wings 92 and the wing struts 90.

The extendable compression chain system 10 coupled to the wing strut 90 may be used with any aircraft, such as aircraft 94a (see FIGS. 8A-8B), having strut-braced wings, including small jet aircraft, large jet aircraft, commercial aircraft, military aircraft, cargo aircraft, and other types of aircraft. The extendable compression chain system 10 coupled to the wing strut 90 is particularly suitable for large jet aircraft with high Mach numbers in a subsonic range, since low aerodynamic drag in the subsonic range is desirable.

As shown in FIGS. 8A-8B, the vehicle 94, such as the aircraft 94a, comprises wings 92, a fuselage 344, engines 345, and a tail 346. Each wing 92 comprises a strut-braced wing and is in the form of a fixed wing. The fuselage 344, also referred to as the body, includes fuselage structures in the interior of the fuselage 344. The fuselage structures may include one or more of, the mechanical power apparatus 76 (see FIG. 2A), such as the motor 78 (see FIG. 2A), a rack-and-pinion system 70 (see FIG. 1), or other suitable fuselage structures within the interior of the fuselage 344, or coupled to the fuselage 344.

As shown in FIGS. 8A-8B, each wing strut 90 has an interior 98 and an exterior 100. As shown in FIGS. 8A-8B, each wing strut 90 has a strut structure 348. The strut structure 348 has an outboard end 350 (see FIG. 8A), an inboard end 352 (see FIG. 8A) opposite the outboard end 350, and an elongate body 354 (see FIG. 8A) formed between the inboard end 352 and the outboard end 350. The outboard end 350 of the strut structure 348 is coupled, or attached, to the wing 92 of the vehicle 94, such as the aircraft 94a (see FIG. 8A). The inboard end 352 of the strut structure 348 is coupled, or attached, to the fuselage 344. The strut structure 348 may further comprise structures such as strut spars, ribs, strut fittings, or other suitable structures or parts, in the interior 98 of the wing strut 90.

FIG. 8A further shows the strut root 152 of each wing strut 90. As shown in FIGS. 8A-8B, each wing strut 90 has a leading edge 356 and a trailing edge 358. The wing strut 90 may comprise one or more of, a composite material, including a carbon composite material, or a metal material, including an aluminum material, a steel material, a titanium material, a combination of the composite material and the metal material, or another suitable material.

As shown in FIGS. 8A-8B, the extendable compression chain system 10 coupled to the wing strut 90, is further coupled to at least one shape transition assembly 130, or to one or more shape transition assemblies 130, connected to the interior 98 of the wing strut 90. Each shape transition assembly 130 is configured to transition the wing strut 90 between the contracted position 110 (see FIG. 10A) and the extended position 112 (see FIG. 10C), and is configured to transition a strut cross section 102 (see FIGS. 10A, 10C) between a contracted airfoil shape 106 (see FIG. 10A) and an extended airfoil shape 108 (see FIG. 10C).

Now referring to FIGS. 9A-9B, FIGS. 9A-9B show a structure 12 comprising a wing strut 90 (see FIG. 9A) with a shape transition assembly 130 having exemplary extendable compression chain systems 10 with extendable compression chain assemblies 30. FIG. 9A is an illustration of a top perspective view of the structure 12 such as the wing strut 90 with two shape transition assemblies 130, each having exemplary extendable compression chain systems 10 with extendable compression chain assemblies 30 of the disclosure. As shown in FIG. 9A, the two shape transition assemblies 130 are both installed in the interior 98 of the wing strut 90, with one shape transition assembly 130 positioned forward of the other shape transition assembly 130. The two shape transition assemblies may be separated as shown in FIG. 9A, and individually driven by their respective actuation mechanisms 62 and activation mechanisms 142 (see FIG. 1). Alternatively, the shape transition assemblies 130 may be connected together, via one or more connector members (not shown). The two shape transition assemblies 130 are mechanically and structurally the same.

As shown in FIG. 9A, each shape transition assembly 130 comprises a shape transition mechanism 132 comprising an expandable structure 134 with a plurality of fixed length structural members 136, such as spars, or other suitable fixed length structural members. As shown in FIG. 9A, the expandable structure 134 has a rhombus shape 360. As shown in FIG. 9A, each shape transition assembly 130 further comprises a drive mechanism 138 comprising a plurality of variable length structural members 140 in the form of extendable compression chain assemblies 30 with compression chains 35. As shown in FIG. 9A two compression chain assemblies 30 are positioned at each expandable structure 134, to extend each expandable structure 134 and to retract each expandable structure 134.

As shown in FIG. 9A, each shape transition assembly 130 further comprises the actuation mechanism 62 coupled to the extendable compression chain assemblies 30, for example, an end-driven actuation mechanism 64. The actuation mechanism 62 includes spine members 68 (see FIG. 9A), such as a first spine member 68a and a second spine member 66b.

As shown in FIG. 9A, the wing strut 90 has an interior 98 and an exterior 100 and a thickness 91. As further shown in FIG. 9A, the wing strut 90 has the strut cross section 102 with the airfoil shape 104. FIG. 9A further shows the strut structure 348 with the outboard end 350 and the inboard end 352, and the leading edge 356. FIG. 9A further shows a center tube 362 extending out of the inboard end 352 and out of the outboard end 350 of the wing strut 90 through the interior 98 of the wing strut 90, along a length of the wing strut 90.

FIG. 9B is an illustration of a top perspective view of one of the shape transition assemblies 130 of the structure 12 of FIG. 9A, showing a cut-away view of exemplary extendable compression chain systems 10 with extendable compression chain assemblies 30. FIG. 9B shows the shape transition assembly 130 comprising the shape transition mechanism 132 with the fixed length structural members 136, such as spars, forming the expandable structure 134 having the rhombus shape 360.

FIG. 9B shows the drive mechanism 138 comprising the variable length structural members 140 in the form of extendable compression chain assemblies 30, such as a first extendable compression chain assembly 30a and a second extendable compression chain assembly 30b, each coupled to a rack-and-pinion system 70b having a gear mechanism 74 and a rack 318 and another gear mechanism 74a and another rack 318a (see FIG. 10B). The actuation mechanism 62 of FIG. 9A is not shown in FIG. 9B. FIG. 9B further shows the center tube 362.

As shown in FIG. 9B two extendable compression chain assemblies 30, such as the first extendable compression chain assembly 30a and the second extendable compression chain assembly 30b, are positioned at each expandable structure 134, to extend each expandable structure 134 upward and downward. An end of a compression chain 35 (see FIG. 9B), such as a first compression chain 35a, of the first extendable compression chain assembly 30a is configured to contact a top end 364a (see FIG. 9B) of the expandable structure 134 of the shape transition mechanism 132, to push the top end 364a upwardly, when the first compression chain 35a of the first extendable compression chain assembly 30a moves upwardly, via actuation by the second spine member 68b (see FIG. 9A). An end of a compression chain 35 (see FIG. 9B), such as a second compression chain 35b, of the second extendable compression chain assembly 30b is configured to contact a bottom end 364b (see FIG. 9B) of the expandable structure 134 of the shape transition mechanism 132, to push the bottom end 364b downwardly, when the second compression chain 35b of the second extendable compression chain assembly 30b moves downwardly, via actuation by the first spine member 68a. FIG. 9B shows two extendable compression chain assemblies 30 and two compression chains 35 at each expandable structure 134. However, four extendable compression chain assemblies 30 with four compression chains 35, six extendable compression chain assemblies 30 with six compression chains 35, or more than six extendable compression chain assemblies 30 with more than six compression chains 35 may be used, depending on the size and configuration of the structure 12, such as the wing strut 90 and the shape transition assembly 130. In one version, four compression chains 35 are used with one compression chain 35 at a forward end, one compression chain 35 at an aft end, one compression chain at a top end, and one compression chain at a bottom end of the wing strut 90 (see FIGS. 8A, 9A) of the aircraft 94a (see FIG. 8A).

Now referring to FIGS. 10A-10D, FIGS. 10A-10D show a structure 12 such as a wing strut 90, with a shape transition assembly 130 having exemplary extendable compression chain systems 10 with extendable compression chain assemblies 30. FIG. 10A is an illustration of a left outboard side view of a schematic diagram of the structure 12, such as the wing strut 90, with a shape transition assembly 130 and having exemplary extendable compression chain systems 10 with extendable compression chain assemblies 30 of the disclosure, where the wing strut 90 is in the contracted position 110, such as the fully contracted position 110a and the strut cross section 102 with the airfoil shape 104 is in the contracted airfoil shape 106, such as the fully contracted airfoil shape 106a.

As shown in FIG. 10A, the shape transition mechanism 132 comprises the plurality of fixed length structural members 136 forming the expandable structure 134 having the rhombus shape 360, and further comprising the drive mechanism 138 with the plurality of variable length structural members 140 in the form of the extendable compression chain systems 10 with the extendable compression chain assemblies 30. As shown in FIG. 10A, the shape transition assembly 130 further comprises the actuation mechanism 62 comprising the spine members 68, such as the first spine member 68a and the second spine member 68b. FIG. 10A further shows the strut structure 348 with the leading edge 356 and the trailing edge 358. FIG. 10A further shows a center box structure 366 instead of the center tube 362 (see FIGS. 9A-9B). FIG. 10A further shows a centerline 368 through the wing strut 90 in a chord-wise direction.

FIG. 10B is an illustration of a front view of a schematic diagram of the extendable compression chain assemblies 30 with compression chains 35, such as the first extendable compression chain assembly 30a with the first compression chain 35a and the second extendable compression chain assembly 30b with the second compression chain 35b, used with the shape transition assembly 130 of FIG. 10A, where the extendable compression chain assemblies 30 are in a retracted position 32, such as a fully retracted position 32a. FIG. 10B shows the spine member 68, such as the second spine member 68b, and the extendable compression chain assemblies 30 coupled to the rack-and-pinion system 70b with the gear mechanism 74 and the rack 318. As shown in FIG. 10B, the rack-and-pinion system 70b comprises the gear mechanism 74 with gear teeth 312 meshed with rack teeth 320 of rack 318. As further shown in FIG. 10B, the rack-and-pinion system 70b comprises another gear mechanism 74a with gear teeth 312a meshed with rack teeth 320a of another rack 318a. The rack 318 is attached at a compression chain attachment point 370. As shown in FIG. 10B, when the wing strut 90 (see FIG. 10A) is in the contracted position 110, such as the fully contracted position 110a, the gear mechanism 74 and the gear mechanism 74a are positioned at a first end 372a of the rack 318, and are positioned at a second end 374b of the rack 318a. FIG. 10B further shows the spindle 314 that connects the two gear mechanisms 74, 74a.

FIG. 10B shows the drive mechanism 138 comprising the variable length structural members 140 in the form of the extendable compression chain assemblies 30. FIG. 10B further shows each compression chain structure 36 adjacent the curved guide assembly 20 having guide rollers 28, to guide the compression chain structure 36, when it is moved or actuated by the spine member 68. The curved guide assembly 20 with guide rollers 28 is notionally shown in FIG. 10B and may have other suitable structures, including those shown in FIGS. 7A-7F. FIG. 10B further shows the spine member 68, such as the second spine member 68b, and the center box structure 366, and each of the extendable compression chain assemblies 30 coupled to a compression chain attachment point 370. FIG. 10B further shows the extendable compression chain assemblies 30 oriented in the wing strut 90 (see FIG. 10A) in a span-wise direction 371.

FIG. 10C is an illustration of a left outboard side view of a schematic diagram of the wing strut 90 and shape transition assembly 130 of FIG. 10A, having extendable compression chain systems 10 with extendable compression chain assemblies 30, where the wing strut 90 is in an extended position 112, such as the fully extended position 112a, and the strut cross section 102 with the airfoil shape 104 is in the extended airfoil shape 108, such as the fully extended airfoil shape 108a.

As shown in FIG. 10C, the shape transition mechanism 132 comprises the plurality of fixed length structural members 136 forming the expandable structure 134 having the rhombus shape 360, and further comprising the drive mechanism 138 with the plurality of variable length structural members 140 in the form of the extendable compression chain systems 10 with the extendable compression chain assemblies 30. As shown in FIG. 10C, the shape transition assembly 130 further comprises the actuation mechanism 62 comprising the spine members 68, such as the first spine member 68a and the second spine member 68b. FIG. 10C further shows the strut structure 348 with the leading edge 356 and the trailing edge 358 having an aft membrane 375 with an aft membrane spring 376. FIG. 10C further shows the center box structure 366, the centerline 368 through the wing strut 90 in the chord-wise direction, and the height 114 of the wing strut 90.

FIG. 10D is an illustration of a front view of a schematic diagram of the extendable compression chain assemblies 30 used with the shape transition assembly 130 of FIG. 10C, where the extendable compression chain assemblies 30 are in an extended position 34, such as a fully extended position 34a. FIG. 10D shows the compression chain assemblies 30 with compression chains 35, such as the first extendable compression chain assembly 30a with the first compression chain 35a and the second extendable compression chain assembly 30b with the second compression chain 35b. FIG. 10D shows the spine member 68, such as the second spine member 68b, and the extendable compression chain assemblies 30 coupled to the rack-and-pinion system 70b. As shown in FIG. 10D, the rack-and-pinion system 70b comprises the gear mechanism 74 with gear teeth 312 meshed with rack teeth 320 of rack 318, and comprises the gear mechanism 74a with gear teeth 312a meshed with rack teeth 320a of rack 318a. The rack 318 is attached at the compression chain attachment point 370. As shown in FIG. 10D, when the wing strut 90 (see FIG. 10C) is in the extended position 112, such as the fully extended position 112a, the gear mechanism 74 and the gear mechanism 74a are positioned at a second end 372b of the rack 318, and are positioned at a first end 374a of the rack 318a. FIG. 10D further shows the spindle 314 that connects the two gear mechanisms 74, 74a.

FIG. 10D shows the drive mechanism 138 comprising the variable length structural members 140 in the form of the extendable compression chain assemblies 30. FIG. 10D further shows each of the compression chain structures 36 adjacent the curved guide assembly 20 having the guide rollers 28, to guide the compression chain structure 36, when it is moved or actuated by the spine member 68. The curved guide assembly 20 with guide rollers 28 is notionally shown in FIG. 10D and may have other suitable structures, including those shown in FIGS. 7A-7F. FIG. 10D further shows the spine member 68, such as the second spine member 68b, and the center box structure 366, and each of the extendable compression chain assemblies 30 coupled to a compression chain attachment point 370.

Now referring to FIGS. 11A-11D, FIGS. 11A-11D show an extension sequence 378 of the extendable compression chain assembly 30 of the extendable compression chain system 10 attached to a structure 12 comprising an object 154 (see FIGS. 11B-11D) that extends from, and is movable from, an underground position 156 (see FIG. 11A), to one or more above ground positions 158 (see FIGS. 11B-11D).

FIG. 11A is an illustration of a front view of an exemplary extendable compression chain system 10 of the disclosure, positioned within an underground structure 168, such as an underground compartment 168a, where an extendable compression chain assembly 30 is in a retracted position 32, such as a fully retracted position 32a, in a first position 378a of the extension sequence 378. FIGS. 11A-11D show the extendable compression chain system 10 with the extendable compression chain assembly 30 positioned on the track assembly 14 comprising the curved portion 14a and the straight portion 14b. FIGS. 11A-11D further show the extendable compression chain assembly 30 comprising the compression chain 35 with the compression chain structure 36 coupled to the actuation end fitting 58, such as in the form of an actuation end fitting 58c, and coupled to the structure interface end fitting 60, such as in the form of a structure interface end fitting 60d, and comprised of the plurality of modules 40. FIGS. 11A-11D further show the curved guide assembly 20. The extendable compression chain assembly 30 may be actuated or driven by a remote controlled actuation mechanism 62a (see FIG. 11A) powered by a mechanical power apparatus 76 (see FIG. 1) or another suitable power apparatus or power source.

As shown in FIGS. 11A-11D, the underground structure 168, such as the underground compartment 168a, is located and hidden from view under, or below a ground surface 380 and within a ground volume 382. Alternatively, the extendable compression chain assembly 30 and track assembly 14 of the extendable compression chain system 10 can be located and hidden below the ground surface 380 in an underground trench, or another underground structure formed in a ground volume. Alternatively, the extendable compression chain assembly 30 and track assembly 14 of the extendable compression chain system 10 can be located in an above ground structure if it does not need to be hidden.

FIG. 11B is an illustration of a front view of the extendable compression chain system 10 of FIG. 11A, where the extendable compression chain assembly 30 is in the retracted position 32, such as the fully retracted position 32a, and is attached to the structure 12 comprising the object 154 that is deployed in a deployed position 384 and extended above the ground surface 380, in a second position 378b of the extension sequence 378. As shown in FIGS. 11B-11D, the object 154 comprises the support structure 160 with a sensor device 162. When desired, the extendable compression chain system 10 can be actuated or driven with the remote controlled actuation mechanism 62a (see FIG. 11A), to initially deploy just the support structure 160 to pop-up and extend vertically above the ground surface 380 at the above ground position 158, such as a first above ground position 158a, and to operate the sensor device 162, or multiple sensor devices 162. As shown in FIG. 11B, the extendable compression chain assembly 30 is still in the retracted position 32, such as the fully retracted position 32a.

FIG. 11C is an illustration of a front view of the extendable compression chain system 10 of FIG. 11B, where the extendable compression chain assembly 30, with the attached structure 12 comprising the object 154, is in an intermediate extended position 282, such as intermediate extended position 282d, and in a third position 378c of the extension sequence 378. As shown in FIG. 11C, the extendable compression chain assembly 30 of the extendable compression chain system 10 is extended and moved by the remote controlled actuation mechanism 62a (see FIG. 11A), to the intermediate extended position 282d, and the object 154 comprising the support structure 160 with the sensor device 162 is extended further to the above ground position 158, such as a second above ground position 158b. As shown in FIG. 11C, the first portion 50, such as the vertical portion 50a, of the compression chain structure 36 of the compression chain 35, followed the curved portion 14a of the track assembly 14, and is above the ground surface 380, and the second portion 52, such as the horizontal portion 50b, of the compression chain structure 36 of the compression chain 35, is still positioned or located in the underground structure 168, such as the underground compartment 168a. As shown in FIG. 11C, the track assembly 14 does not extend above the ground surface 380, as the first portion 50, such as the vertical portion 50a, of the compression chain structure 36 of the compression chain 35 moves above the ground surface 380.

FIG. 11D is an illustration of a front view of the extendable compression chain system 10 of FIG. 11B, where the extendable compression chain assembly 30, with the attached structure 12 comprising the object 154, is in an extended position 34, such as a fully extended position 34a, in a fourth position 378d of the extension sequence 378. As shown in FIG. 11D, the extendable compression chain assembly 30 of the extendable compression chain system 10 is extended and moved by the remote controlled actuation mechanism 62a (see FIG. 11A), to the extended position 34, such as a fully extended position 34a, and the object 154 comprising the support structure 160 with the sensor device 162 is extended further to the above ground position 158, such as a third above ground position 158c. As shown in FIG. 11D, the first portion 50, such as the vertical portion 50a, of the compression chain structure 36 of the compression chain 35, followed the curved portion 14a of the track assembly 14, and is substantially entirely above the ground surface 380, and only a small portion of the second portion 52, such as the horizontal portion 50b, of the compression chain structure 36 of the compression chain 35, is still positioned or located in the underground structure 168, such as the underground compartment 168a. As shown in FIG. 11D, the track assembly 14 still does not extend above the ground surface 380 as the first portion 50, such as the vertical portion 50a, of the compression chain structure 36 of the compression chain 35 moves further above the ground surface 380. Once the sensor device 162 (see FIGS. 11B-11D) has been used, the extendable compression chain system 10 can retract the support structure 160 back into the underground compartment 168a, or underground trench, to disappear out of sight.

Figure 12:
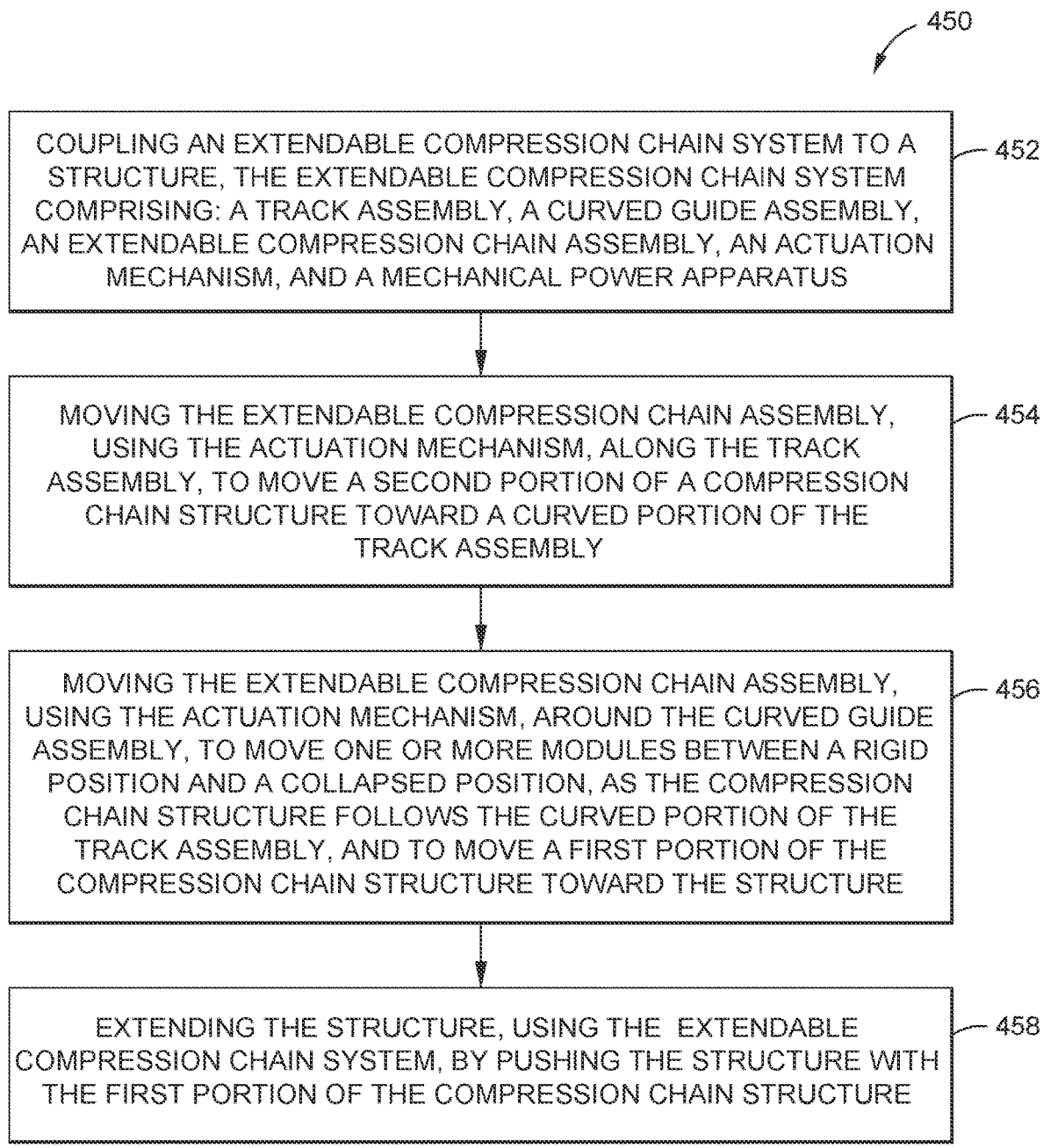
FIG. 12 is an illustration of a flow diagram of an exemplary version of a method of the disclosure.

Now referring to FIG. 12, FIG. 12 is an illustration of a flow diagram of an exemplary version of a method 450 of the disclosure. In another version of the disclosure, there is provided the method 450 (see FIG. 12) of extending a structure 12 (see FIG. 1) using an extendable compression chain system 10 (see FIGS. 1, 2A) of the disclosure.

The blocks in FIG. 12 represent operations and/or portions thereof, or elements, and lines connecting the various blocks do not imply any particular order or dependency of the operations or portions thereof, or elements. FIG. 12 and the disclosure of the steps of the method 450 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 12, the method 450 comprises the step 452 of coupling the extendable compression chain system 10 to the structure 12. The extendable compression chain system 10 comprises a track assembly 14 (see FIG. 2A) with the curved portion 14a (see FIG. 2A) and the straight portion 14b (see FIG. 2A), a curved guide assembly 20 (see FIG. 2A) coupled to the track assembly 14, and an extendable compression chain assembly 30 (see FIGS. 1, 2A). As discussed in detail above, the extendable compression chain assembly 30 comprises a compression chain structure 36 (see FIGS. 1, 2A-2B) having a first end 38 (see FIG. 2B), such as an actuation end 38a (see FIG. 2B), a second end 39 (see FIG. 2B), such as a push-pull end 39a (see FIG. 2B), and a plurality of modules 40 (see FIGS. 1, 2A-2B, 3A-3C) connected together in a series configuration 42 (see FIG. 2C) between the first end 38 and the second end 39. The plurality of modules 40 are movable between the rigid position 44 (see FIGS. 2A, 2C, 5A) and the collapsed position 46 (see FIGS. 2A, 2B, 5D), as the compression chain structure 36 follows the curved portion 14a of the track assembly 14. The compression chain structure 36 carries an axial compression load 48 (see FIG. 1) in the first portion 50 (see FIGS. 1, 2A, 2I-2K), for example, the vertical portion 50a (see FIGS. 2A, 2I-2K), of the compression chain structure 36.

The extendable compression chain assembly 30 further comprises an actuation end fitting 58 (see FIGS. 2A-2B) attached to the first end 38 of the compression chain structure 36. The extendable compression chain assembly 30 further comprises a structure interface end fitting 60 (see FIGS. 2A-2B) attached to the second end 39 of the compression chain structure 36.

The extendable compression chain system 10 further comprises an actuation mechanism 62 (see FIGS. 1, 2A) coupled to the extendable compression chain assembly 30. The extendable compression chain system 10 further comprises a mechanical power apparatus 76 (see FIGS. 1, 2A) coupled to the actuation mechanism 62. The mechanical power apparatus 76 may comprise a motor 78 (see FIGS. 1, 2A), or another suitable mechanical power apparatus.

The step 452 of coupling the extendable compression chain system 10 to the structure, further comprises, coupling the extendable compression chain system 10 comprising the extendable compression chain assembly 30, with each of the plurality of modules 40 of the compression chain structure 36 comprising, as shown in FIG. 3A, a plurality of pins 222, a plurality of roller wheels 232, such as two pairs of roller wheels 232, coupled to one or more of the plurality of pins 222, such as the outer pins 224, a spring 238 coupled to one of the plurality of pins 222, such as the articulated edge pin 228, a plurality of lugs 244 coupled to one or more of the plurality of pins 222, a plurality of links 248 coupled to the plurality of pins 222, a pair of arm members 274 coupled to one or more of the plurality of pins 222, and optionally, a pair of rotational stops 258 formed on one or more of the plurality of links 248. As shown in FIGS. 3A-3C, for each module 40, the plurality of pins 222 comprise a pair of outer pins 224, a pair of inner pins 225, a pair of center pins 226, and an articulated edge pin 228. As further shown in FIGS. 3A-3C, for each module 40, the plurality of links 248 comprise a pair of outer links 250, a pair of side links 251, an upper inner link 252a, a lower inner link 252b, and two pairs of diagonal links 254. The pair of rotational stops 258 (see FIG. 3B) is formed on each pair of outer links 250. As shown in FIGS. 3A-3C, the pair of arm members 274 is coupled to the pair of outer pins 224 and is coupled to the pair of inner pins 225, as discussed in detail above.

The step 452 of coupling the extendable compression chain system 10 to the structure 12, further comprises, coupling the extendable compression chain system 10 within an oil enclosure structure 80 (see FIGS. 1, 5A-5C). The oil enclosure structure 80 comprises a first telescoping oil enclosure portion 82 (see FIGS. 5A-5C), for example, a vertical telescoping oil enclosure portion 82a (see FIGS. 5A-5C), a fixed oil enclosure portion 84 (see FIGS. 5A-5C), and a second telescoping oil enclosure portion 86 (see FIGS. 5A-5C), for example, a horizontal telescoping oil enclosure portion 86a (see FIGS. 5A-5C).

As shown in FIG. 12, the method 450 further comprises the step 454 of moving the extendable compression chain assembly 30, using the actuation mechanism 62 powered by the mechanical power apparatus 76, along the track assembly 14, to move a second portion 52 (see FIGS. 1, 2A), for example, a horizontal portion 52a (see FIG. 2A), of the compression chain structure 36, toward the curved portion 14a of the track assembly 14 (see FIG. 2A).

The step 454 of moving the extendable compression chain assembly 30, using the actuation mechanism 62, along the track assembly 14, further comprises, moving the extendable compression chain assembly 30, using the actuation mechanism 62 (see FIG. 2A) comprising in one version, an end-driven actuation mechanism 64 (see FIGS. 1, 2A) comprising one of, an actuator 66 (see FIGS. 1, 2A), including a mechanical linear actuator 66a (see FIGS. 1, 2A), a rotary actuator 66b (see FIG. 1), or another suitable actuator, one or more spine members 68 (see FIGS. 1, 9A), a rack-and-pinion system 70 (see FIG. 1), a belt mechanism 71 (see FIG. 1), or another suitable end-driven actuation mechanism. The step 454 of moving the extendable compression chain assembly 30, using the actuation mechanism 62, along the track assembly 14, further comprises, moving the extendable compression chain assembly 30, using the actuation mechanism 62 comprising in another version, a gear-driven actuation mechanism 72 (see FIGS. 1, 5E) comprising a gear mechanism 74 (see FIGS. 1, 5E) coupled to a first portion 50 (see FIGS. 1, 5E), for example, a vertical portion 50a (see FIG. 5E), of the compression chain structure 36, to cause a first portion movement 54 (see FIGS. 1, 5E), for example, a vertical movement 54a (see FIG. 5E), or vertical upward movement, of the first portion 50 of the compression chain structure 36, as the compression chain structure 36 follows the curved portion 14a of the track assembly 14.

As shown in FIG. 12, the method 450 further comprises the step 456 of moving the extendable compression chain assembly 30 (see FIGS. 1, 2A), using the actuation mechanism 62 (see FIG. 2A) powered by the mechanical power apparatus 76 (see FIGS. 1, 2A), around the curved guide assembly 20 (see FIG. 2A), for example, the curved surfaces 24 (see FIG. 5A) of the guide rollers 28 (see FIG. 5A), of the curved guide assembly 20, to move one or more of the plurality of modules 40 (see FIG. 2A) between the rigid position 44 (see FIGS. 2A, 5A) and the collapsed position 46 (see FIGS. 2A, 5D), as the compression chain structure 36 follows the curved portion 14a of the track assembly 14, and wraps around the curved guide assembly 20, for example, the curved surfaces 24 (see FIG. 5A) of the guide rollers 28 (see FIG. 5A), of the curved guide assembly 20, and to move the first portion 50 (see FIG. 2A), for example, the vertical portion 50a (see FIG. 2A), of the compression chain structure 36, toward the structure 12, in a first portion movement 54 (see FIGS. 1, 2A), for example, a vertical movement 54a (see FIG. 2A), or vertical upward movement.

As shown in FIG. 12, the method 450 further comprises the step 458 of extending the structure 12 (see FIG. 1), using the extendable compression chain system 10 (see FIG. 1), by pushing the structure 12 with the first portion 50 (see FIG. 2A) of the compression chain structure 36 (see FIG. 2A), wherein the compression chain structure 36 carries the axial compression load 48 (see FIG. 1) in the first portion 50, and the first portion 50 comprises the plurality of modules 40 in the rigid position 44 (see FIG. 2A).

The step 458 of extending the structure 12 (see FIGS. 1, 9A, 11C), using the extendable compression chain system 10 (see FIGS. 1, 2A), further comprises extending the structure 12 comprising one of, a wing strut 90 (see FIGS. 1, 8A-8B, 9A) of an aircraft 94a (see FIGS. 1, 8A-8B); an object 154 (see FIGS. 1, 11B-11D) movable from an underground position 156 (see FIGS. 1, 11A) to one or more above ground positions 158 (see FIGS. 1, 11B-11D), including a support structure 160 (see FIGS. 11C-11D) with one or more of, a sensor device 162 (see FIGS. 1, 11B-11D), a surveillance apparatus 164 (see FIG. 1), and a weapon 166 (see FIG. 1); a variable elevation platform 170 (see FIG. 1), including a stage platform 172 (see FIG. 1); an extendable ladder 174 (see FIG. 1); an extendable mast 176 (see FIG. 1); an extendable pole 178 (see FIG. 1); a periscope 180 (see FIG. 1) of a submarine vehicle 182 (see FIG. 1), or another suitable structure capable of being extended using the extendable compression chain system 10.

The method 450 may further comprise the step of retracting the structure 12, using the extendable compression chain system 10, by pulling the structure 12 with the first portion 50 of the compression chain structure 36, and moving the extendable compression chain assembly 30 from an extended position 34 to a retracted position 32.

Figure 13:
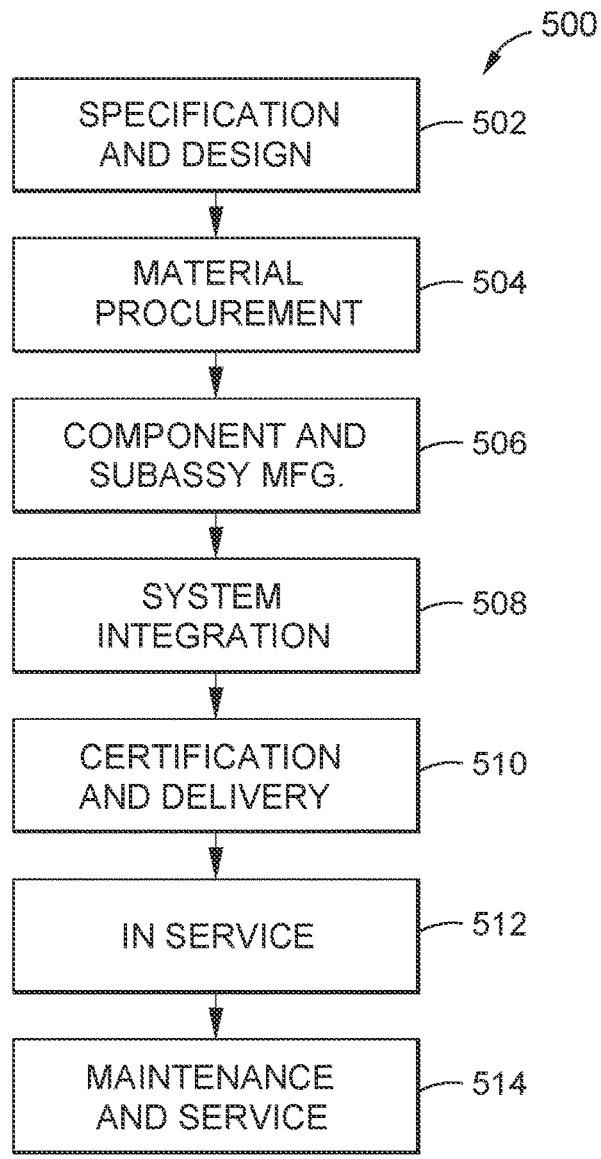
FIG. 13 is an illustration of a flow diagram of an exemplary aircraft manufacturing and service method.
Figure 14:
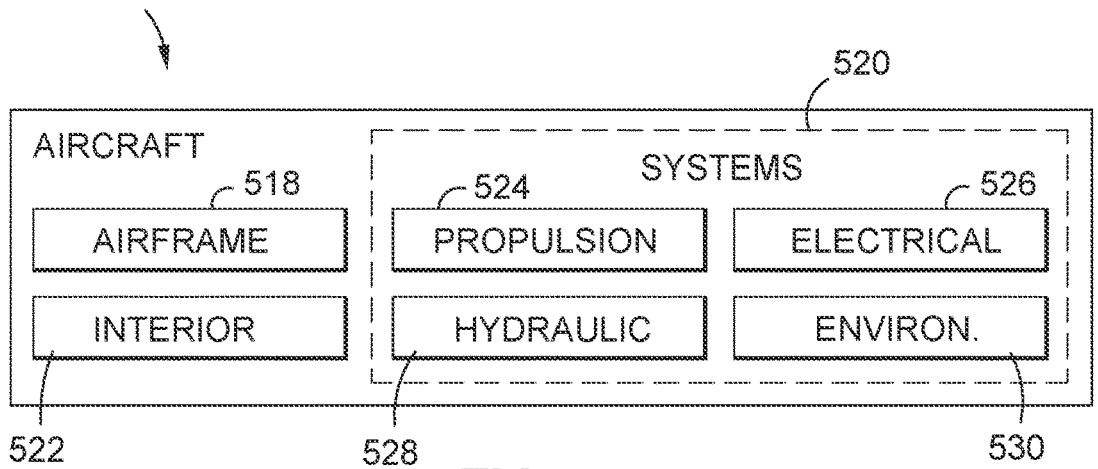
FIG. 14 is an illustration of an exemplary block diagram of an aircraft.

Now referring to FIGS. 13 and 14, FIG. 13 is an illustration of a flow diagram of an exemplary aircraft manufacturing and service method 500, and FIG. 14 is an illustration of an exemplary block diagram of an aircraft 516. Referring to FIGS. 13 and 14, versions of the disclosure may be described in the context of the aircraft manufacturing and service method 500 as shown in FIG. 14, and the aircraft 516 as shown in FIG. 12.

During pre-production, exemplary aircraft manufacturing and service method 500 may include specification and design 502 of the aircraft 516 and material procurement 504. During manufacturing, component and subassembly manufacturing 506 and system integration 508 of the aircraft 516 takes place. Thereafter, the aircraft 516 may go through certification and delivery 510 in order to be placed in service 512. While in service 512 by a customer, the aircraft 516 may be scheduled for routine maintenance and service 514 (which may also include modification, reconfiguration, refurbishment, and other suitable services).

Each of the processes of the aircraft manufacturing and service method 500 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 14, the aircraft 516 produced by the exemplary aircraft manufacturing and service method 500 may include an airframe 518 with a plurality of systems 520 and an interior 522. Examples of the plurality of systems 520 may include one or more of a propulsion system 524, an electrical system 526, a hydraulic system 528, and an environmental system 530. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 500. For example, components or subassemblies corresponding to component and subassembly manufacturing 406 may be fabricated or manufactured in a manner similar to components or subassemblies produced while the aircraft 516 is in service 512. Also, one or more apparatus embodiments, method embodiments, or a combination thereof, may be utilized during component and subassembly manufacturing 506 and system integration 508, for example, by substantially expediting assembly of or reducing the cost of the aircraft 516. Similarly, one or more of apparatus embodiments, method embodiments, or a combination thereof, may be utilized while the aircraft 516 is in service 512, for example and without limitation, to maintenance and service 514.

Disclosed versions of the extendable compression chain system 10 (see FIGS. 1, 2A) with the extendable compression chain assembly 30, the aircraft 94a (see FIGS. 1, 8A-8B) with the wing strut 90 having the extendable compression chain system 10, and the method 450 (see FIG. 12) of extending a structure 12 (see FIGS. 1, 9A, 10A, 11B) using the extendable compression chain system 10 provide a mechanism to extend and retract a structure 12, such as a wing strut 90 (see FIGS. 1, 8A, 9A) of an aircraft 94a (see FIGS. 8A-8B). For the structure 12 comprising the wing strut 90, the extendable compression chain system 10 (see FIGS. 1, 2A) with the extendable compression chain assembly 30 extends from a retracted position 32 (see FIG. 1) to an extended position 34 (see FIG. 1), to extend the thickness 91 (see FIG. 1) of the wing strut 90 (see FIGS. 1, 10A) from a contracted position 110 (see FIG. 10A) to an extended position 112 (see FIG. 10C), and to extend the thickness 103 (see FIG. 1) of the strut cross section 102 (see FIGS. 1, 10A) from a contracted airfoil shape 106 (see FIG. 10A) to an extended airfoil shape 108 (see FIG. 10C). The extendable compression chain system 10 (see FIGS. 1, 2A) with the extendable compression chain assembly 30 enables a more efficient thin or small strut cross section 102 for a cruise flight condition 120 (see FIGS. 1, 10A) of a flight of the aircraft 94a (see FIGS. 8A-8B), allows for a wing strut 90 that is lightweight to carry compression load 216c (see FIGS. 4A, 5C) for a wing down-bending flight condition 125 (see FIG. 1) and a minus 1 g pushover flight condition 124 (see FIG. 1), while preserving a weight-savings aspect for the wing 92 (see FIGS. 1, 8A), that avoids the "scissor jack phenomenon", eliminates cable drooping without adding unwanted weight, avoids excessive tension 128 (see FIG. 1) to the wing 92 to prevent bending stresses, and has a low aerodynamic drag. Moreover, the extendable compression chain system 10 (see FIGS. 1, 2A) with the extendable compression chain assembly 30, can be used with other structures 12 to extend the structures from a retracted position to an extended position, and to retract the structures 12 from an extended position to a retracted position. Other structures 12 include an object 154 (see FIGS. 1, 11B), for example, a support structure 160 (see FIGS. 1, 11B) with a sensor device 162 (see FIGS. 1, 11B), a surveillance apparatus 164 (see FIG. 1), a weapon 166 (see FIG. 1), or another suitable device, or such as a variable elevation platform 170, an extendable ladder 174 (see FIG. 1), an extendable mast 176 (see FIG. 1), a periscope 180 (see FIG. 1) of a submarine vehicle 182 (see FIG. 1), or another suitable structure.

In addition, disclosed versions of the extendable compression chain system 10 (see FIGS. 1, 2A) with the extendable compression chain assembly 30, the aircraft 94a (see FIGS. 1, 8A-8B) with the extendable compression chain system 10, and the method 450 (see FIG. 12) provide a compression chain 35 (see FIGS. 2A-2C) with a compression chain structure 36 (see FIGS. 2A-2C) with a plurality of modules 40 (see FIGS. 2A-2C) that is stored in a certain direction, for example, a horizontal direction, in a retracted position 32 (see FIG. 5A), that follows the curved portion 14a of the track assembly 14, that wraps around or curves around the curved guide assembly 20 (see FIGS. 2A, 5C), such as the guide roller 28 (see FIGS. 5B, 7D), the fixed guide member 26 (see FIG. 1), or another suitable curved guide member with a curved surface 24 (see FIGS. 2A, 5C, 7D), and that carries compression load 216c (see FIGS. 5C, 6C), in a different direction, such as a vertical direction. The compression chain 35 with the compression chain structure 36 has modules 40, such as non-rigid modules 40b (see FIG. 2A), that collapse or deform in a collapsed position 46 (see FIG. 2A), as the compression chain 35 follows the curved portion 14a of the track assembly 14, and wraps around, or curves around, the curved guide assembly 20, for example, the curved surfaces 24 (see FIG. 5A) of the guide rollers 28 (see FIG. 5A), of the curved guide assembly 20, in the third portion 53 (see FIG. 2A), and outside of the third portion 53, such as in the first portion 50 (see FIG. 2A) and the second portion 52 (see FIG. 2A) the compression chain 35 is stiff like a beam-column, and modules 40, such as rigid modules 40a (see FIG. 2A) in the first portion 50 and the second portion 52 are in the rigid position 44 (see FIG. 2A). As modules 40 of the compression chain 35 with the compression chain structure 36 move from the second portion 52 to the third portion 53 and follow the curved portion 14a of the track assembly 14, the curved guide assembly 20 pushes the inner links 252 (see FIG. 3A) inward so that the module 40 collapses to the collapsed position 46, and the module 40 is in the over-center reversed position 296 (see FIG. 4D). When the non-rigid module 40b, such as the collapsed module (see FIG. 2A), wraps past the curved guide assembly 20 and moves from the third portion 53 (see FIG. 2A) to the first portion 50 (see FIG. 2A) of the compression chain structure 36 (see FIG. 2A) of the compression chain 35 (see FIG. 2A), the spring 238 (see FIG. 2A), such as a torsional spring 238a (see FIG. 2A) pops out the inner links 252 back to an over-center position 292 (see FIG. 4A) and the module 40 becomes rigid in the rigid position 44 (see FIG. 2A). The inner links 252 are held in an outer position by the spring 238. When the compression chain 35 with the compression chain structure 36 is in compression 118 (see FIG. 1), it takes load ($P_2$) 216 (see FIG. 5C), such as applied load ($P_2$) 216b (see FIG. 5C), for example, compression load 216c (see FIG. 5C), minus the friction force (f) 218 (see FIG. 5C).

Moreover, disclosed versions of the extendable compression chain system 10 (see FIGS. 1, 2A) with the extendable compression chain assembly 30, the aircraft 94a (see FIGS. 1, 8A-8B) with the extendable compression chain system 10, and the method 450 (see FIG. 12) provide the extendable compression chain system 10 with an actuation mechanism 62 (see FIG. 2A) coupled to the extendable compression chain assembly 30, to move, actuate, advance, or drive, the extendable compression chain assembly 30, including the compression chain 35, along the track assembly 14 (see FIG. 2A) and around the curved guide assembly 20, for example, the curved surfaces 24 (see FIG. 5A) of the guide rollers 28 (see FIG. 5A), of the curved guide assembly 20. In one version, the actuation mechanism 62 comprises an end-driven actuation mechanism 64 (see FIGS. 1, 2A) comprising one or more of, an actuator 66 (see FIG. 1), including a mechanical linear actuator 66a (see FIG. 1), or a rotary actuator 66b (see FIG. 1), or another suitable actuator, one or more spine members 68 (see FIG. 9A), a rack-and-pinion system 70 (see FIG. 1), a belt mechanism 71 (see FIG. 1), or another suitable end-driven actuation mechanism. The actuation mechanism 62, such as the end-driven actuation mechanism 64, applies the load ($P_1$) 216 (see FIG. 2A), such as actuation load ($P_1$) 216a, to the first end 38, such as the actuation end 38a, or drive end, of the compression chain structure 36, in order to move, actuate, advance, or drive the compression chain structure 36 toward the curved guide assembly 20 and toward the structure 12. In another version, the actuation mechanism 62 comprises a gear-driven actuation mechanism 72 (see FIG. 1) comprising one or more gear mechanisms 74 (see also FIGS. 5E, 10B) and one or more racks 318 (see FIGS. 5E, 10B) coupled to one or more outer links 250 (see FIG. 2C) of the compression chain structure 36, to cause the first portion movement 54 (see FIG. 5E), such as the vertical movement 54a (see FIG. 5E), or vertical upward movement, of the first portion 50 (see FIG. 5E), for example, the vertical portion 50a (see FIG. 5E), of the compression chain structure 36. In one version, the gear-driven actuation mechanism 72 comprises the rack-and-pinion system 70a (see FIG. 5E). In another version, the gear-driven actuation mechanism 72 comprises the rack-and-pinion system 70b (see FIGS. 9B, 10B).

In addition, disclosed versions of the extendable compression chain system 10 (see FIGS. 1, 2A) with the extendable compression chain assembly 30, the aircraft 94a (see FIGS. 1, 8A-8B) with the extendable compression chain system 10, and the method 450 (see FIG. 12) provide an extendable compression chain assembly 30 (see FIGS. 2A-3C) with a compression chain 35 (see FIGS. 2A-2C) having a compression chain structure 36 (see FIGS. 2A-2C) with a plurality of modules 40 (see FIGS. 2A-2C) that is coupled within an oil enclosure structure 80 (see also FIGS. 6A-6C) filled with oil 88 (see FIGS. 6A-6C) to keep one or more components of the extendable compression chain assembly 30 and the extendable compression chain system 10 lubricated and clean. The oil enclosure structure 80 includes the first telescoping oil enclosure portion 82 (see FIG. 6A), for example, the vertical telescoping oil enclosure portion 82a (see FIG. 6A), the fixed oil enclosure portion 84 (see FIG. 6A), and the second telescoping oil enclosure portion 86 (see FIG. 6A), such as the horizontal telescoping oil enclosure portion 86a (see FIG. 6A).

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. An aircraft having two wing struts with an extendable compression chain system, the aircraft comprising:
   a fuselage;
   two wings coupled to the fuselage, and extending from the fuselage opposite each other;
   a respective wing strut attached to each of the two wings, the wing strut having a strut cross section with an airfoil shape;
   the extendable compression chain system coupled to an interior of each wing strut, the extendable compression chain system comprising:
      a track assembly having a curved portion and a straight portion;
      a curved guide assembly coupled to the track assembly;
      an extendable compression chain assembly configured to travel along the track assembly and configured to follow the curved portion of the track assembly, the extendable compression chain assembly configured to move from a retracted position to an extended position, to extend the strut cross section between a contracted airfoil shape and an extended airfoil shape, the extendable compression chain assembly comprising:
         a compression chain structure having a first end, a second end, and a plurality of modules connected together in a series configuration between the first end and the second end, the plurality of modules movable between a rigid position and a collapsed position, as the compression chain structure follows the curved portion of the track assembly, and wraps around the curved guide assembly, and the compression chain structure carrying an axial compression load in a first portion of the compression chain structure, where the plurality of modules are in the rigid position;
         an actuation end fitting attached to the first end of the compression chain structure; and
         a structure interface end fitting attached to the second end of the compression chain structure;
      an actuation mechanism coupled to the extendable compression chain assembly, to move the extendable compression chain assembly along the track assembly toward the curved portion of the track assembly; and
      a mechanical power apparatus coupled to the actuation mechanism, to power the actuation mechanism to move the extendable compression chain assembly.

2. The aircraft of claim 1, wherein the extendable compression chain system is coupled within an oil enclosure structure comprising:
   a first telescoping oil enclosure portion;
   a fixed oil enclosure portion; and
   a second telescoping oil enclosure portion.

3. The aircraft of claim 1, wherein the actuation mechanism coupled to the extendable compression chain assembly comprises one of:
   an end-driven actuation mechanism comprising one of an actuator, a rack-and-pinion system, and a belt mechanism; or
   a gear-driven actuation mechanism comprising a gear mechanism coupled to the first portion of the compression chain structure, to cause a first portion movement of the first portion of the compression chain structure, as the compression chain structure wraps around the curved guide assembly.

4. The aircraft of claim 1, wherein each module of the plurality of modules comprises a plurality of pins comprising:
   a pair of outer pins;
   a pair of inner pins;
   a pair of center pins; and
   an articulated edge pin.

5. The aircraft of claim 4, wherein each module of the plurality of modules further comprises:
   a plurality of roller wheels coupled to the pair of outer pins.

6. The aircraft of claim 4, wherein each module of the plurality of modules further comprises:
   a spring coupled to the articulated edge pin.

7. The aircraft of claim 4, wherein each module of the plurality of modules further comprises:
   a plurality of lugs coupled to one or more of the plurality of pins.

8. The aircraft of claim 4, wherein each module of the plurality of modules comprises a plurality of links coupled to the plurality of pins, the plurality of links comprising:
   a pair of outer links;
   a pair of side links;
   an upper inner link;
   a lower inner link; and
   two pairs of diagonal links.

9. The aircraft of claim 8, wherein each module of the plurality of modules further comprises:
   a pair of rotational stops formed on each pair of outer links.

10. The aircraft of claim 4, wherein each module of the plurality of modules further comprises:
    a pair of arm members coupled to the pair of outer pins and coupled to the pair of inner pins.

11. A method of extending a wing strut of an aircraft using an extendable compression chain system, the method comprising the steps of:
    coupling the extendable compression chain system to the wing strut, the extendable compression chain system comprising:
       a track assembly having a curved portion and a straight portion;
       a curved guide assembly coupled to the track assembly;
       an extendable compression chain assembly comprising:
          a compression chain structure having a first end, a second end, and a plurality of modules connected together in a series configuration between the first end and the second end, the plurality of modules movable between a rigid position and a collapsed position, as the compression chain structure follows the curved portion of the track assembly, and wraps around the curved guide assembly, and the compression chain structure carrying an axial compression load in a first portion of the compression chain structure;
an actuation end fitting attached to the first end of the compression chain structure; and
a structure interface end fitting attached to the second end of the compression chain structure;
an actuation mechanism coupled to the extendable compression chain assembly; and
a mechanical power apparatus coupled to the actuation mechanism;
moving the extendable compression chain assembly, using the actuation mechanism powered by the mechanical power apparatus, along the track assembly, to move a second portion of the compression chain structure toward the curved portion of the track assembly;
moving the extendable compression chain assembly, using the actuation mechanism powered by the mechanical power apparatus, around the curved guide assembly, to move one or more of the plurality of modules between the rigid position and the collapsed position, as the compression chain structure follows the curved portion of the track assembly, and to move the first portion of the compression chain structure toward the wing strut; and
extending the wing strut, using the extendable compression chain system, by pushing the wing strut with the first portion of the compression chain structure, wherein the compression chain structure carries the axial compression load in the first portion, and the first portion comprises the plurality of modules in the rigid position.

12. The method of claim 11, further comprising retracting the wing strut, using the extendable compression chain system, by pulling the wing strut with the first portion of the compression chain structure, and moving the extendable compression chain assembly from an extended position to a retracted position.

13. The method of claim 11, wherein the step of coupling the extendable compression chain system to the wing strut further comprises coupling the extendable compression chain system comprising the extendable compression chain assembly coupled within an oil enclosure structure comprising:
a first telescoping oil enclosure portion;
a fixed oil enclosure portion; and
a second telescoping oil enclosure portion.

14. The method of claim 11, wherein the step of moving the extendable compression chain assembly, using the actuation mechanism, along the track assembly, further comprises moving the extendable compression chain assembly, using the actuation mechanism comprising one of:
an end-driven actuation mechanism comprising one of an actuator, a rack-and-pinion system, and a belt mechanism; or
a gear-driven actuation mechanism comprising a gear mechanism coupled to the first portion of the compression chain structure, to cause a first portion movement of the first portion of the compression chain structure, as the compression chain structure wraps around the curved guide assembly.

15. The method of claim 11, wherein the step of coupling the extendable compression chain system to the wing strut further comprises coupling the extendable compression chain system comprising the extendable compression chain assembly, with each module of the plurality of modules comprising a plurality of pins comprising:
a pair of outer pins;
a pair of inner pins;
a pair of center pins; and
an articulated edge pin.

16. The method of claim 15, wherein the step of coupling the extendable compression chain system to the wing strut further comprises coupling the extendable compression chain system comprising the extendable compression chain assembly, with each module of the plurality of modules further comprising:
a plurality of roller wheels coupled to the pair of outer pins.

17. The method of claim 15, wherein the step of coupling the extendable compression chain system to the wing strut further comprises coupling the extendable compression chain system comprising the extendable compression chain assembly, with each module of the plurality of modules further comprising:
a spring coupled to the articulated edge pin.

18. The method of claim 15, wherein the step of coupling the extendable compression chain system to the wing strut further comprises coupling the extendable compression chain system comprising the extendable compression chain assembly, with each module of the plurality of modules further comprising:
a plurality of lugs coupled to one or more of the plurality of pins.

19. The method of claim 15, wherein the step of coupling the extendable compression chain system to the wing strut further comprises coupling the extendable compression chain system comprising the extendable compression chain assembly, with each module of the plurality of modules comprising a plurality of links coupled to the plurality of pins, the plurality of links comprising:
a pair of outer links;
a pair of side links;
an upper inner link;
a lower inner link; and
two pairs of diagonal links.

20. The method of claim 19, wherein the step of coupling the extendable compression chain system to the wing strut further comprises coupling the extendable compression chain system comprising the extendable compression chain assembly, with each module of the plurality of modules further comprising:
a pair of rotational stops formed on each pair of outer links.

* * * * *